United States Patent [19]
Voss

[11] Patent Number: 6,141,958
[45] Date of Patent: Nov. 7, 2000

[54] EXHAUST COOLING SYSTEM FOR VEHICLES

[76] Inventor: Randy E. Voss, E. 4209 Section 11 Rd., Lavalle, Wis. 53941-9263

[21] Appl. No.: 09/224,171

[22] Filed: Dec. 31, 1998

[51] Int. Cl.[7] .................................................. F01N 1/00
[52] U.S. Cl. ........................ 60/272; 60/320; 60/322; 60/324; 60/312; 60/313; 60/302; 138/DIG. 11; 138/177; 138/188; 180/309; 180/64 A; 285/DIG. 22; 285/162; 285/192; 285/194; 181/254; 181/239
[58] Field of Search .................. 60/272, 320, 324, 60/312, 322, 313, 302; 138/DIG. 11, 177, 188; 180/309, 64 A; 285/DIG. 22, 162, 192, 194; 181/254, 239

[56] References Cited

U.S. PATENT DOCUMENTS

| | | |
|---|---|---|
| Re. 31,724 | 11/1984 | Isaka .......................................... 60/313 |
| D. 323,328 | 1/1992 | Craig . |
| 1,226,710 | 5/1917 | Shakespeare, Jr. . |
| 1,671,829 | 5/1928 | Ledwinka . |
| 1,861,449 | 6/1932 | Murray . |
| 2,096,260 | 10/1937 | Pavillion . |
| 2,706,014 | 4/1955 | Carroll . |
| 2,798,695 | 7/1957 | Arleque . |
| 2,806,548 | 9/1957 | Carroll . |
| 3,070,187 | 12/1962 | Deremer . |
| 3,187,834 | 6/1965 | Bryson et al. . |
| 3,656,515 | 4/1972 | Wogerbauer et al. ........... 138/DIG. 11 |
| 3,889,772 | 6/1975 | Kelley .................................... 180/64 A |
| 3,960,232 | 6/1976 | Hubbell, III .......................... 180/64 A |
| 4,154,058 | 5/1979 | Mase et al. ............................... 60/313 |
| 4,832,262 | 5/1989 | Robertson . |
| 4,926,634 | 5/1990 | Putz et al. ................................. 60/313 |
| 4,926,635 | 5/1990 | Sakuma .................................... 60/313 |
| 5,014,817 | 5/1991 | Takato et al. .......................... 181/254 |
| 5,050,378 | 9/1991 | Clemmens ................................ 60/313 |
| 5,144,799 | 9/1992 | Barth ........................................ 60/313 |
| 5,220,789 | 6/1993 | Riley et al. .............................. 60/302 |
| 5,305,824 | 4/1994 | Gasseling . |
| 5,351,481 | 10/1994 | Flugger .................................... 60/313 |
| 5,388,408 | 2/1995 | Lawrence ................................. 60/324 |
| 5,433,075 | 7/1995 | Nakamura et al. ...................... 60/322 |

FOREIGN PATENT DOCUMENTS

| | | | |
|---|---|---|---|
| 404121414 | 4/1992 | Japan ..................................... 60/313 |
| 08121156A | 10/1994 | Japan ..................................... 60/313 |
| 08319825A | 5/1995 | Japan ..................................... 60/313 |

*Primary Examiner*—Thomas Denion
*Assistant Examiner*—Thai-Ba Trieu
*Attorney, Agent, or Firm*—Michael Best & Friedrich LLP

[57] ABSTRACT

An exhaust gas cooling system for a vehicle includes a cooling fin system retrofit and a side exhaust pipe retrofit having an exhaust gas exit pipe having a first portion having a plurality of mixing portions which are either bends or internal mixing fins configured to mix vehicle exhaust gas, but not to restrict exhaust gas flow, a second portion fastened to the first portion and a chrome coated third portion fastened to the second portion and extending along the side of the vehicle. The cooling fin system retrofit includes an adjustable clamp and one or more cooling fins, each cooling fin having a base having a pair of upstanding arms, with one arm of the pair having a lip for engaging an arm of another cooling fin. An exhaust gas cooling system kit, a side exhaust pipe retrofit kit, a cooling fin kit are included.

31 Claims, 31 Drawing Sheets

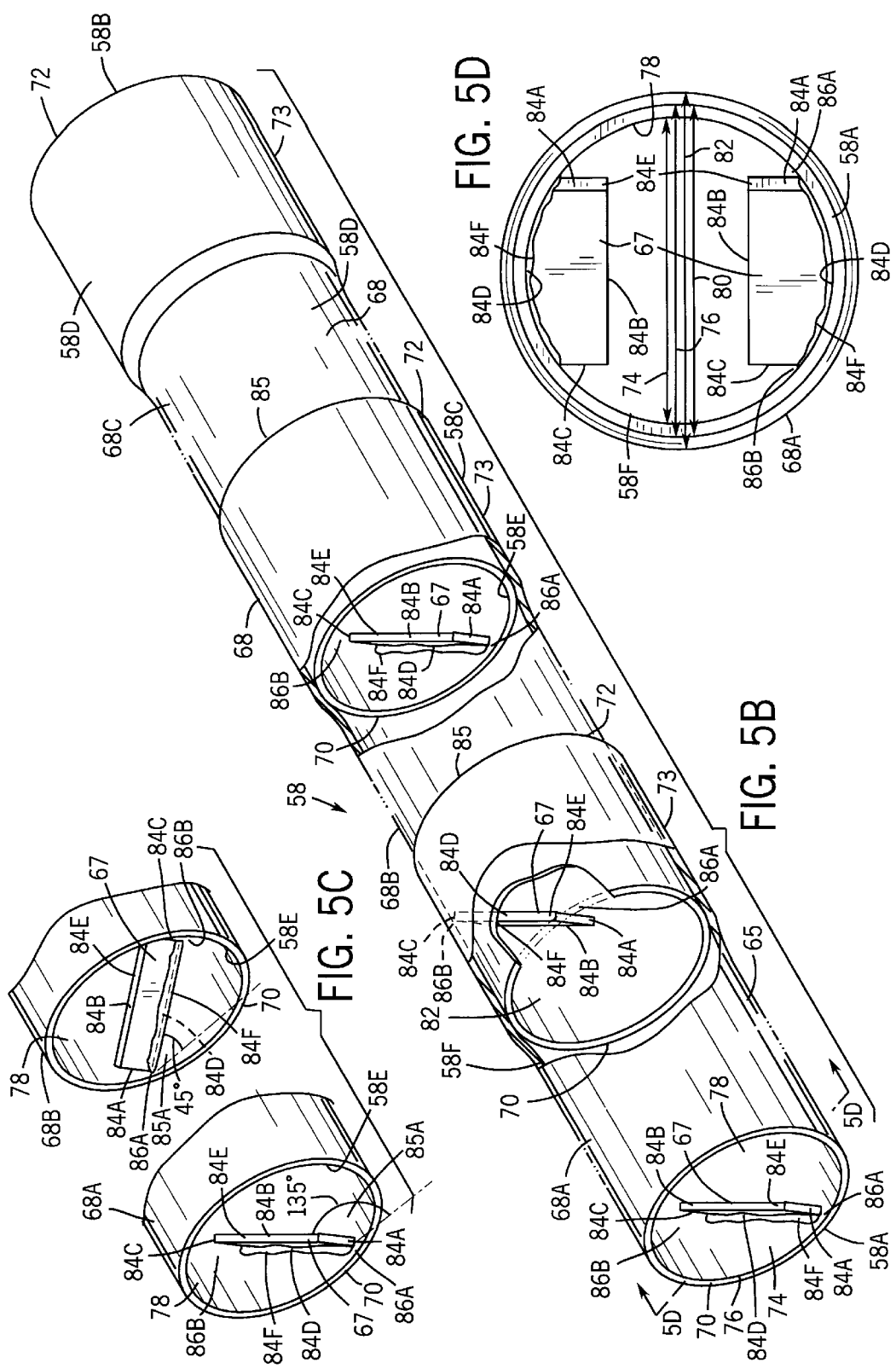

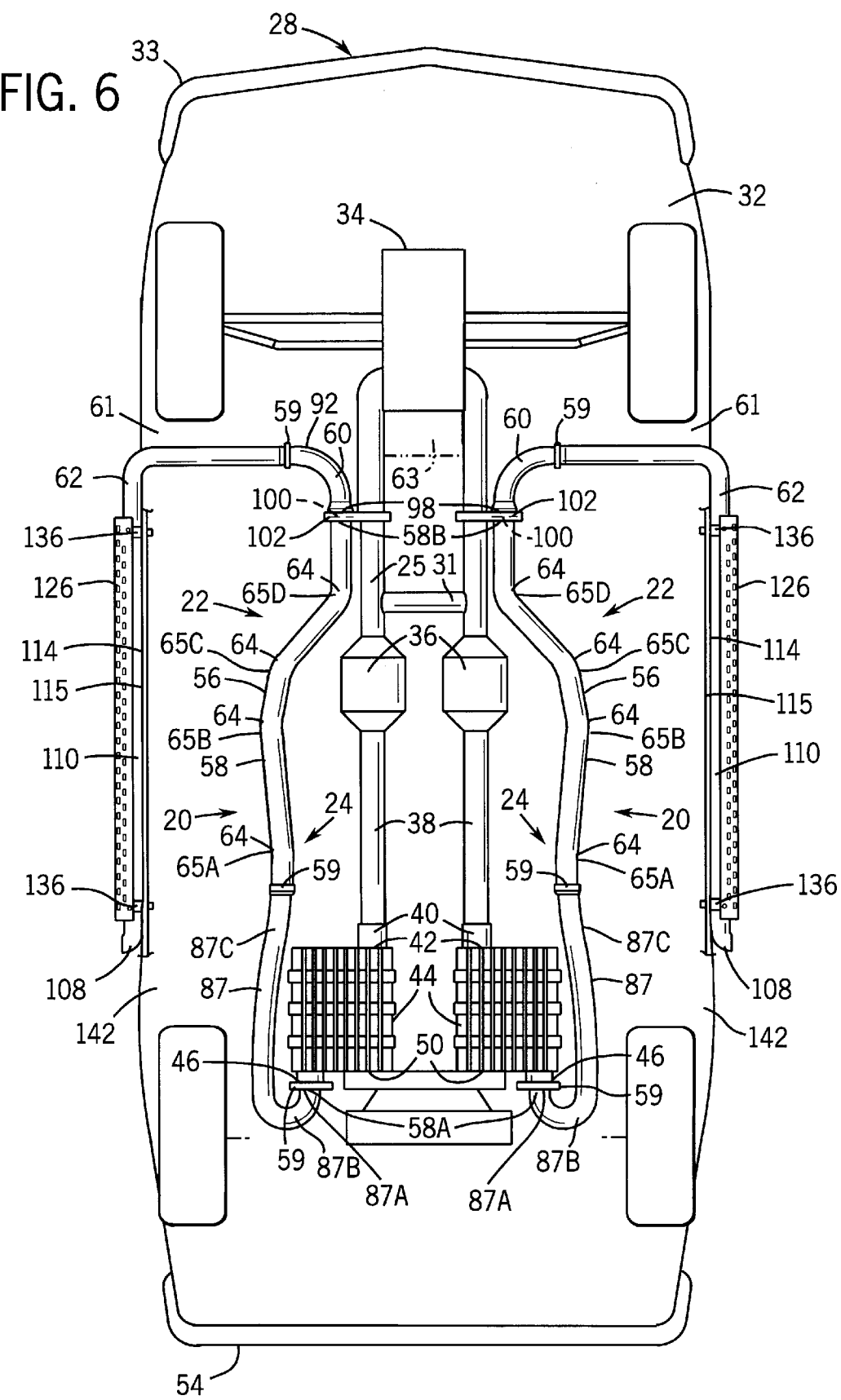

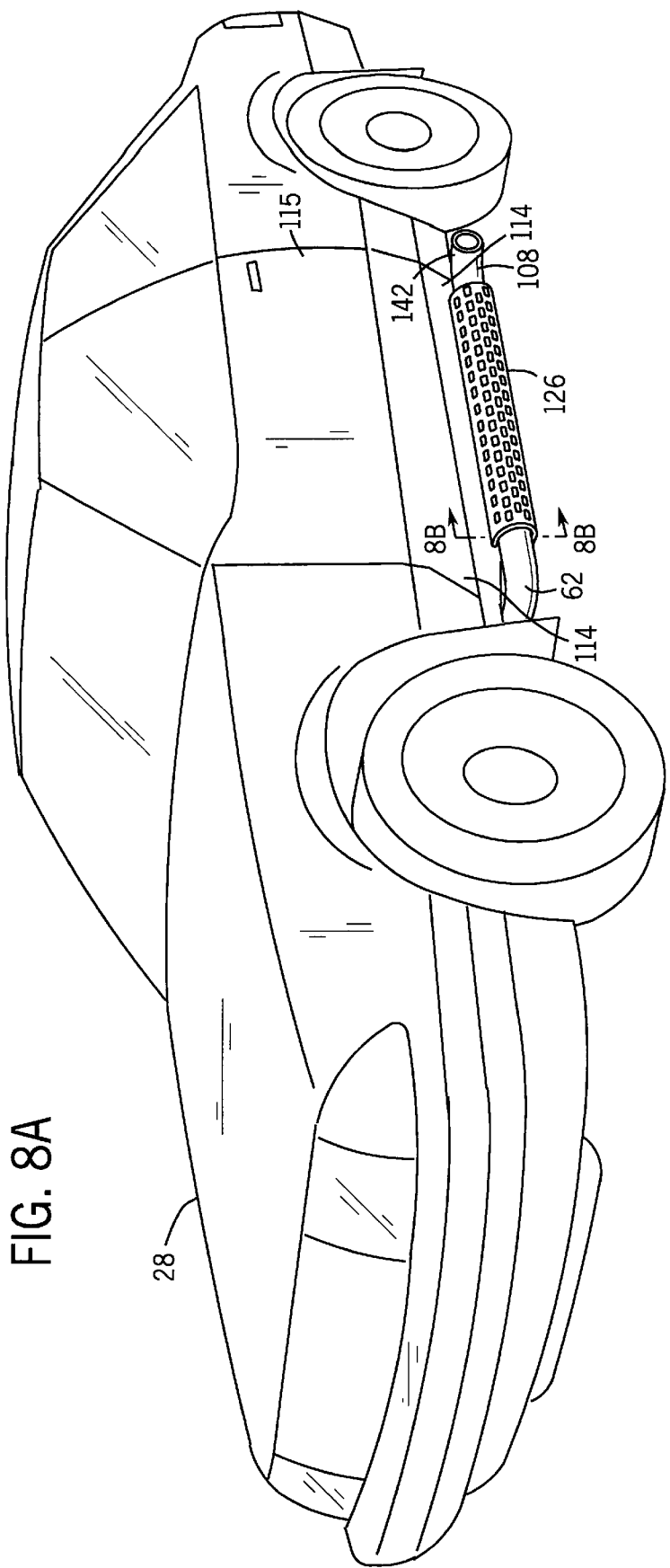

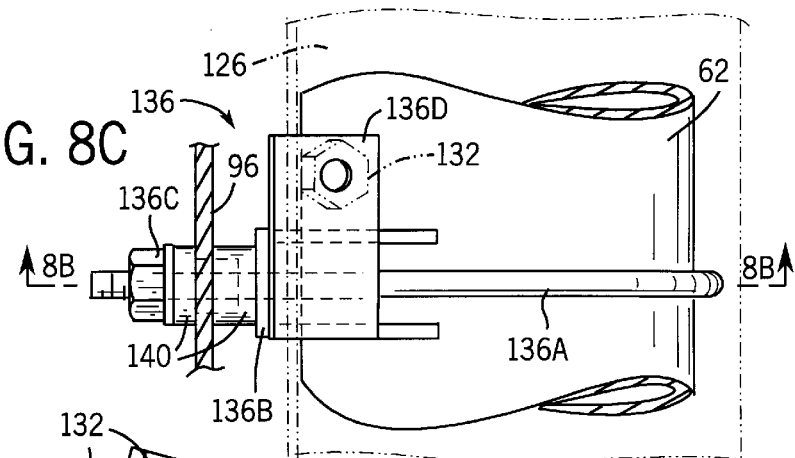
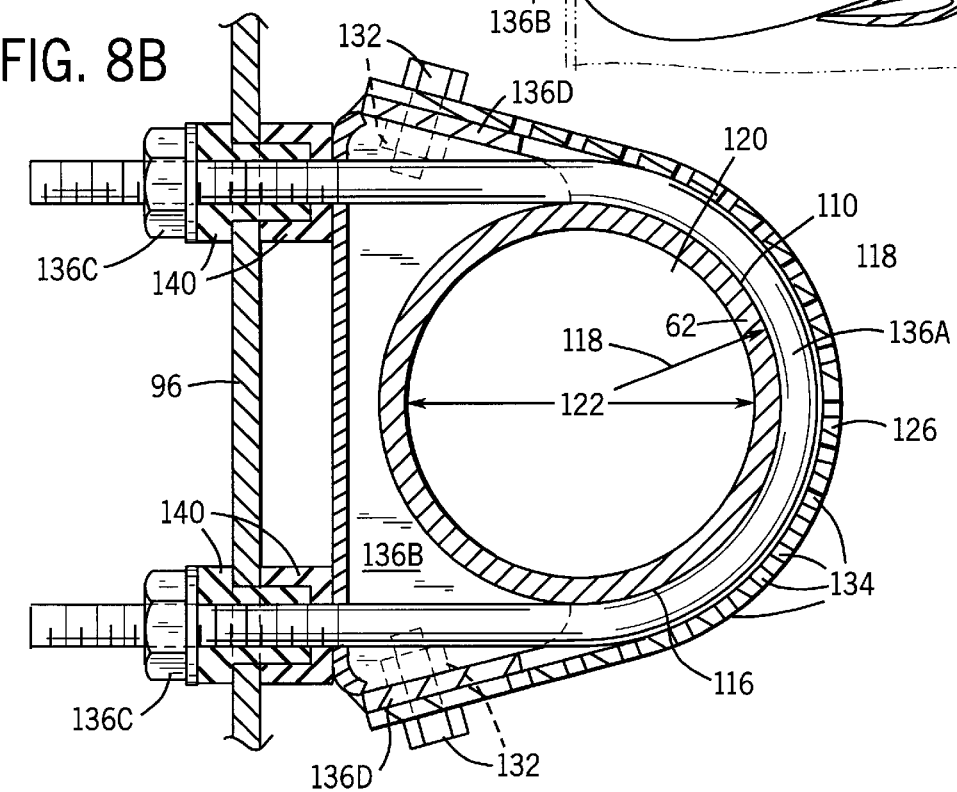
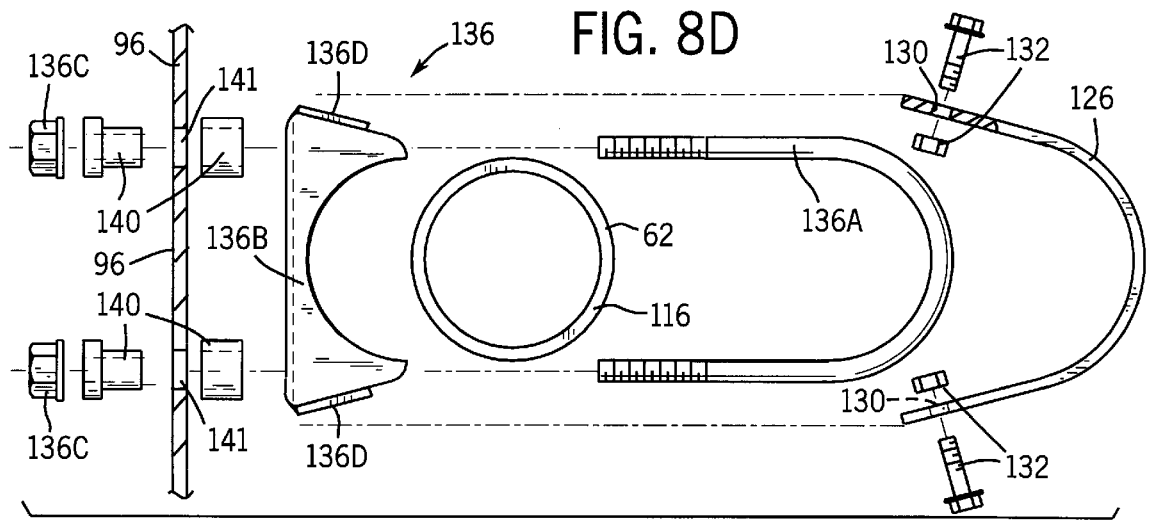

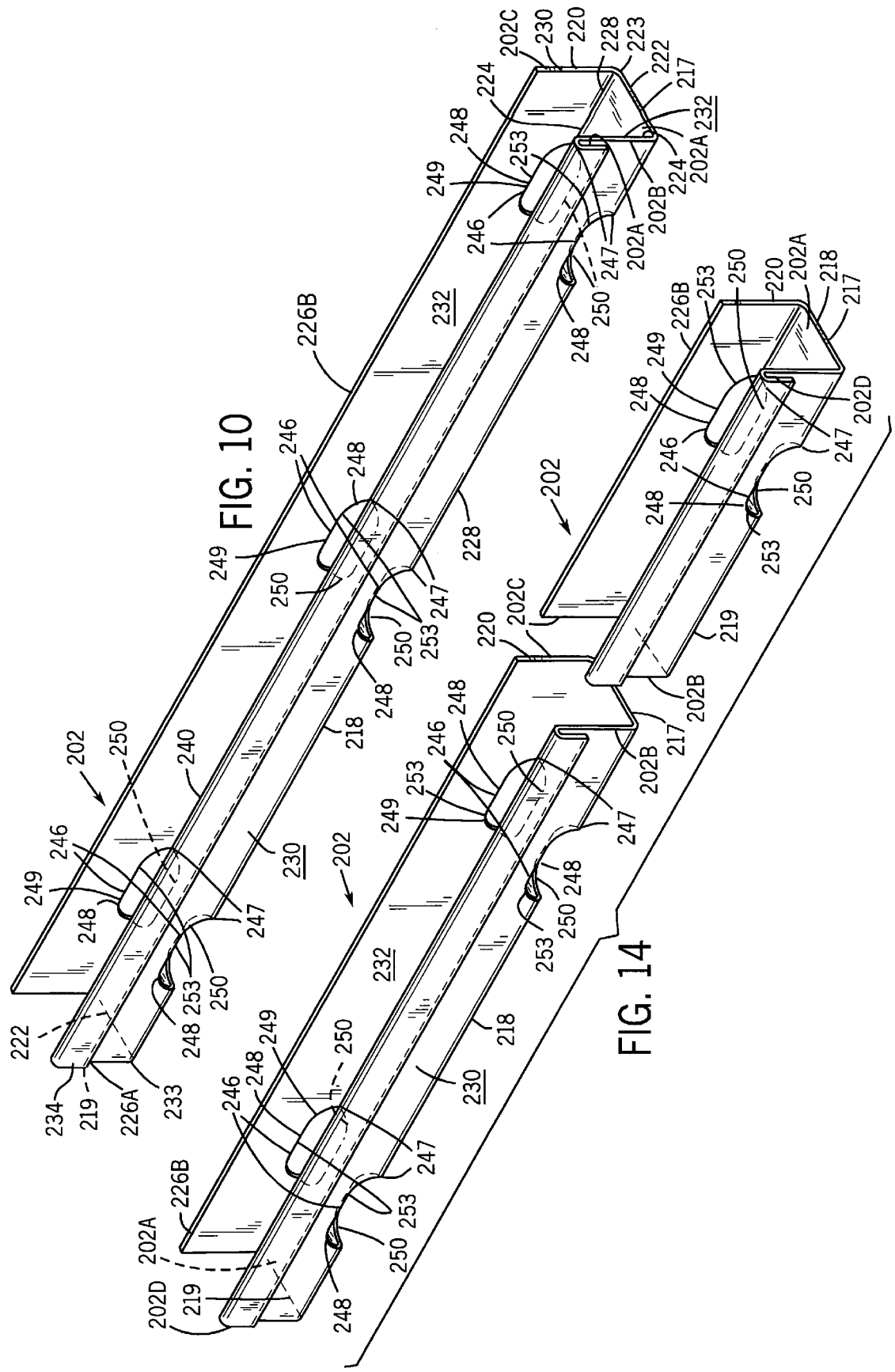

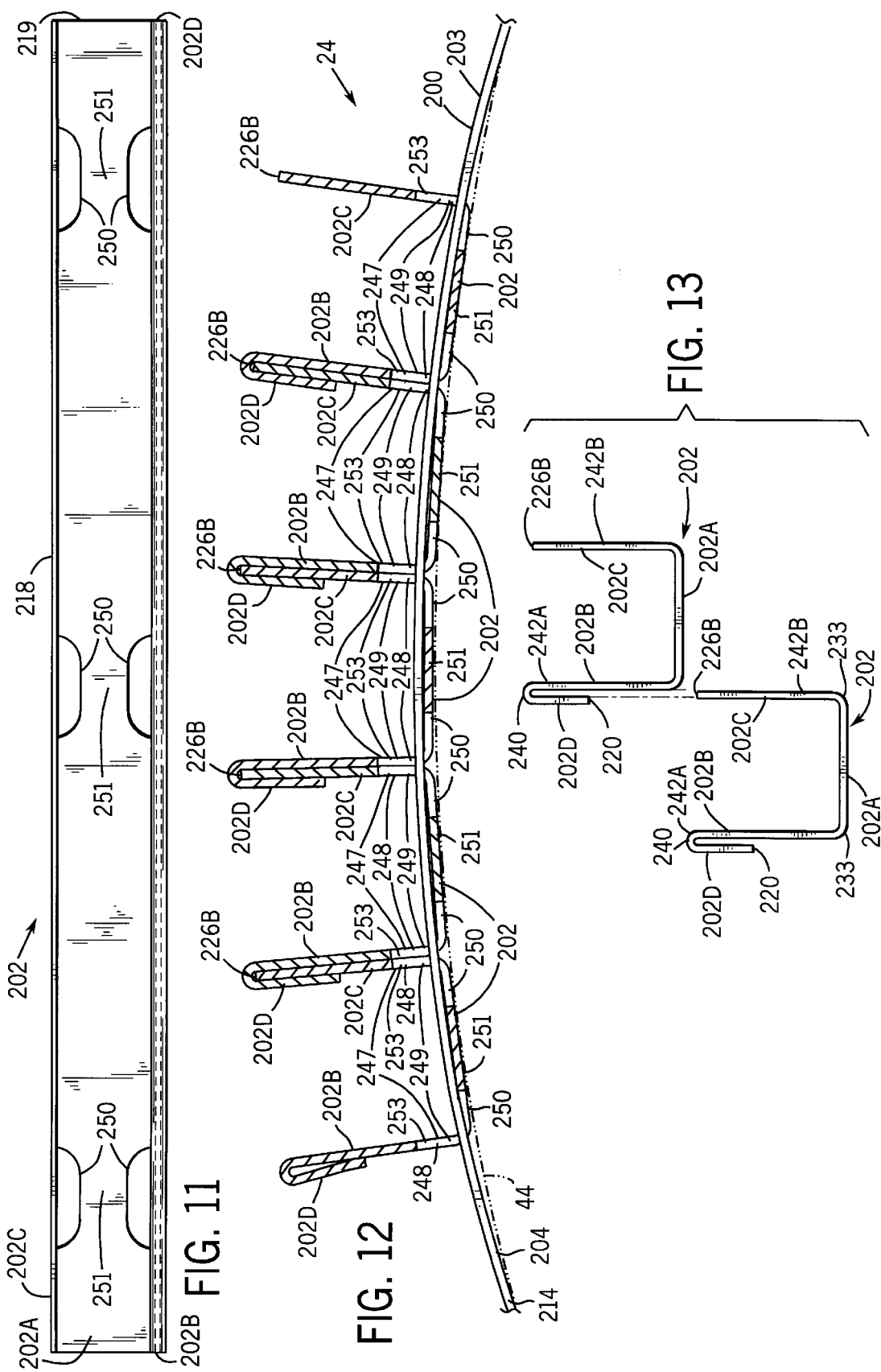

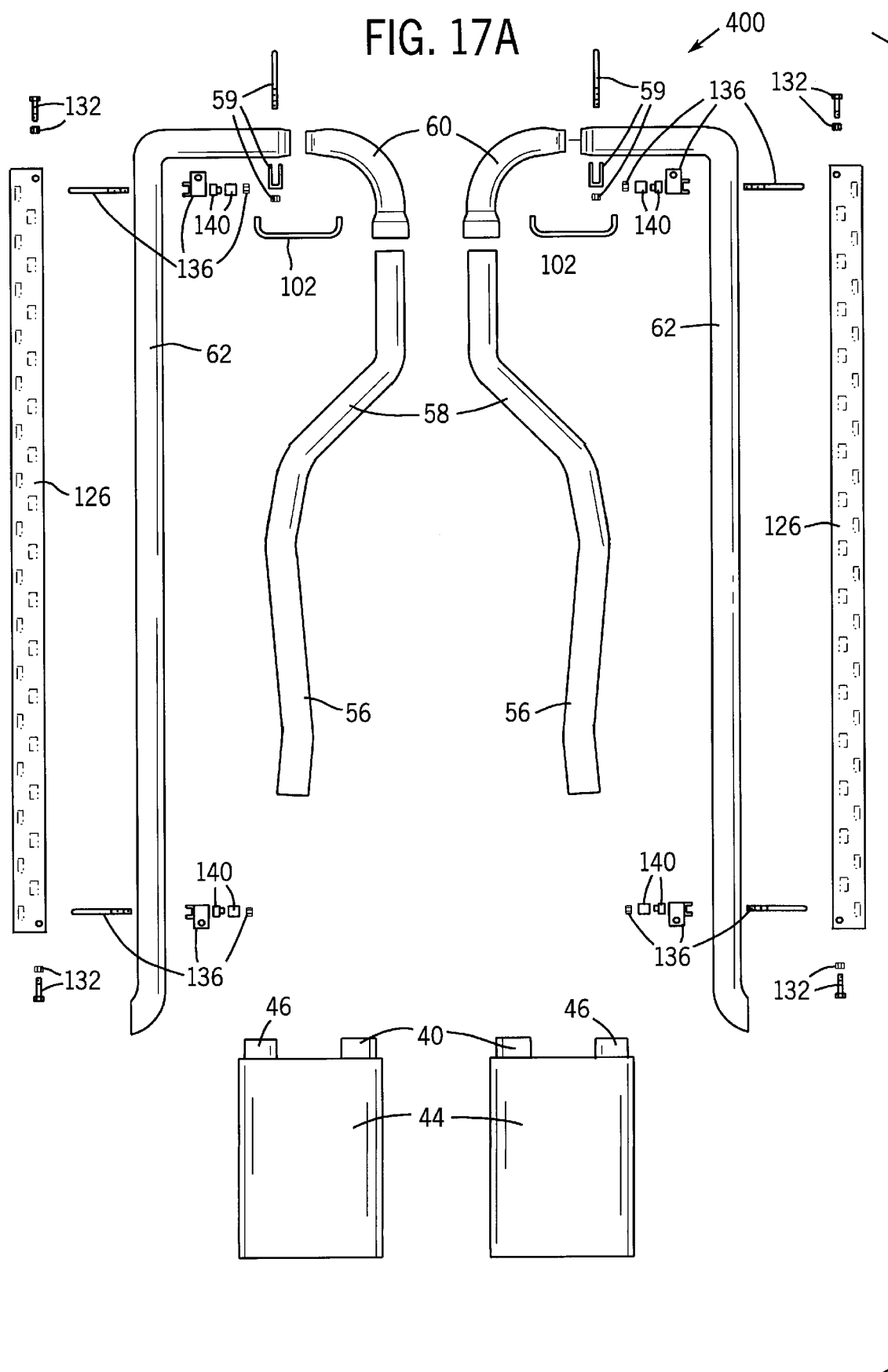

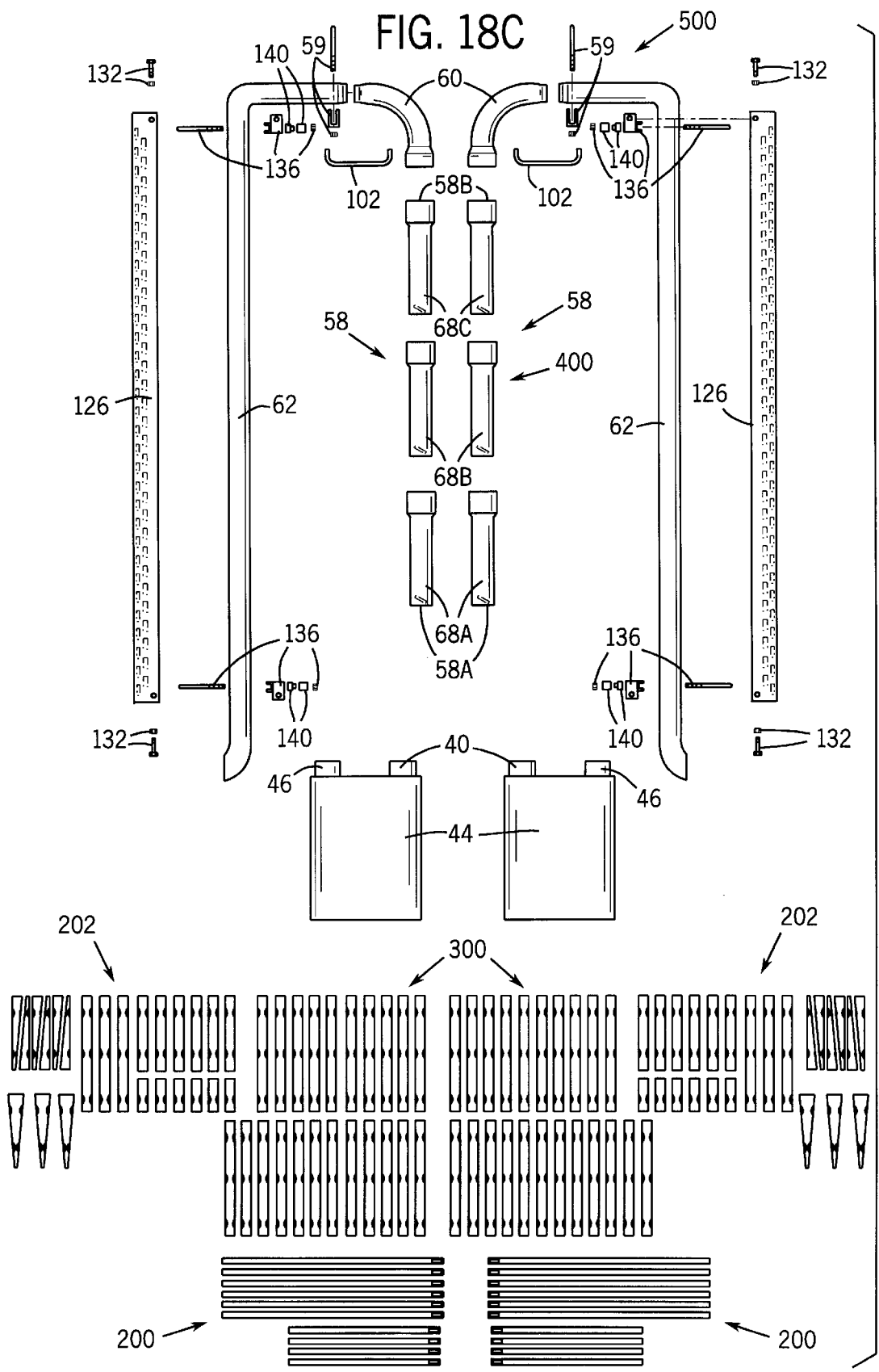

EXHAUST COOLING SYSTEM FOR VEHICLES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to exhaust gas cooling systems for vehicles and in particular, to an exhaust gas exit pipe, to a side exhaust pipe retrofit, to a cooling fin, to a cooling fin system retrofit, to an exhaust gas cooling system kit, to a side exhaust pipe retrofit kit and to a cooling fin kit. The invention is particularly well-suited for retrofitting a side exhaust pipe to a vehicle using the vehicle's original catalytic converters, original Y pipe or H pipe, original headers and manifolds and the original placement of mufflers and for retrofitting a cooling fin system to the vehicle's exhaust system, e.g., the vehicle's muffler, Y pipe or H pipe, inlet tube and outlet tube of the muffler, catalytic converter or engine parts, such as, but not limited to, manifolds, oil pan, engine block, and bell housing.

A most difficult problem is cooling vehicle exhaust gases. Vehicle exhaust gases passing from the engine manifold often reach 900 degrees to 1500 degrees Fahrenheit. Typically the exhaust gases exit from the manifold through the exhaust pipe and enter a muffler with temperatures of 1150–1250 degrees Fahrenheit. Under most circumstances, the muffler temperature (caused by the engine exhaust gases passing through it) in a vehicle does not exceed 1000 degrees Fahrenheit. However during extreme circumstances, such as during hard acceleration of the vehicle, during the climbing of altitude with the vehicle, e.g., going up a steep incline, or mountain, pulling a trailer with the vehicle or driving the vehicle during extreme outdoor temperature, e.g., desert day temperatures, the temperature of the automobile muffler should not exceed 1250 degrees Fahrenheit. The exhaust gases pass through the muffler and then pass out through a tail pipe or through a side exhaust system and then exit from the vehicle. Thus, the exhaust gases also give off their heat to the side exhaust system.

A vexatious problem, largely unattended in the art, is the lack of an exhaust gas cooling system for vehicles which utilizes a side exhaust pipe retrofit on the vehicle and a cooling fin system retrofit. The use of elongate exhaust pipes is known, e.g., see, U.S. Pat. No. 5,388,408 to Lawrence, U.S. Pat. No. 3,070,187 to Deremer, U.S. Pat. Nos. 2,805,548 and 2,706,014 to Carroll.

Sporty-looking vehicles having a side exhaust system, e.g., "performance" vehicles, are desirable for the car or truck enthusiast who desires the beautiful appearance of a chrome coated side exhaust pipe, e.g., lake pipe, mounted on the exterior side of the vehicle just below the vehicle's doors. This location of the side exhaust pipe also advantageously places the deep booming sound of the exhaust system at a location on the outside of the vehicle allowing the driver to hear the pleasurable deep booming sound of the engine. The very desirable characteristic of placing the side exhaust pipes in the historic and aesthetically pleasing location on the sides of the vehicle just below the doors of the vehicle, unfortunately poses a heat safety hazard for persons and pets who might come in contact with the side exhaust pipe. Unfortunately these persons and pets may suffer burns to the legs and hands (or legs and paws for pets) from accidentally contacting the hot side exhaust pipe and/or shield. Also, the side exhaust pipe and muffler may be so hot as to ignite combustible materials located near the ground or suspended on vegetation which come into contact with the side exhaust pipe and/or the muffler.

Furthermore, due to the excessive heat build up in the side exhaust pipe, the attractive chrome coating of the side exhaust pipe becomes burnt giving a characteristic "blues-out" or "blued-out" appearance or "browned-out" appearance, as is known to those automobile hobbyists (enthusiasts). By "blues-out", "blued-out" or "browned-out", is meant that the chrome coating has a blue black tint to it, rather than a lustrous, shiny chrome appearance.

The excessive heat can also cause deterioration to a vehicle's exterior, discoloring the vehicle's paint and wrinkling plastic parts, such as plastic bumpers and plastic ground effects. In addition, due to excessive heating of the entire exhaust system in the vehicle, including mufflers, connecting pipes, clamps, brackets, emission equipment, as well as, the side exhaust pipe, passengers are sometimes inconvenienced, since the excessive heat sometimes creates hot floor pan areas and even hot passenger compartments in the vehicle.

In the past, the industry servicing the performance vehicle enthusiast, e.g., the "performance exhaust industry", has strived to solve the problem of better performance exhaust with increased horsepower, increased fuel economy, increased torque, increased acceleration and increased life of mechanical parts. The term "performance" means hereinthroughout, that the vehicle (automobile or truck) has less restrictive exhaust gas flow and volume as compared to conventional vehicles. In the art, a performance exhaust system is an exhaust system that provides for increased flow of exhaust gas as compared to typical exhaust system configurations and the performance exhaust system provides for increased sound production as compared to typical exhaust systems for vehicles in a same vehicle class. Also the performance exhaust system is typically constructed of superior materials as compared to typical original equipment in both appearance and durability. Furthermore, a performance system is at least one pipe size larger than the pipe installed at the factory on a given vehicle.

Presently the performance exhaust industry uses exhaust pipes having a tubing inner diameter or pipe diameter, e.g., "pipe size", of a minimum of 1 and ⅞ inches. The inlet tube and the outlet tube are stock sized to fit the exhaust pipe diameter. The entire performance exhaust industry has desired to use larger diameter exhaust pipes, e.g., 2.25 inch, 2.5 inch, 2.75 inch, 3 inch or greater diameter exhaust pipes, to create better sound and to create a better appearance, e.g., larger exhaust pipes, but has not been able to fully utilize the larger diameter side exhaust pipes because the larger inner diameter causes more exhaust gas heat to pass through to the side exhaust pipes, causing the entire exhaust gas system to become about as hot as the engine manifold itself, e.g., 900 degrees Fahrenheit to 1500 degrees Fahrenheit.

Some prior art, e.g., U.S. Pat. No. 2,096,260 to Pavillon has attempted to respond to some of the heat safety problems of placing elongate exhaust pipes alongside the sides of the vehicle, by utilizing heat shields and heat insulation pads to help avoid injuries.

Some prior art has attempted to respond to cooling of automotive engine part using fins for cooling, e.g., for mufflers, see U.S. Pat. No. 3,187,834 to Bryson et al, U.S. Pat. No. 1,671,829 to Ledwinka and for oil filters, see, U.S. Pat. No. 5,305,824 to Gasseling, U.S. Pat. No. 2,798,695 to Arleque. None of the prior art has responded with a simple to use cooling fin system retrofit which is easily assembled, which allows selection of cooling fins varying in fin base dimensions, fin spacing, fin height, selection of fin number, and which in the cooling fin design allows for air flow through a portion of the cooling fin itself.

Thus, notwithstanding the many known practical design problems for providing a cooler side exhaust pipe which when made of chrome or plated with chrome does not become burnt, which delivers engine sound to the driver at the driver's location, which does not result in hot floor pan areas and hot passenger compartments due to the exhaust system and which permits the use of larger diameter side exhaust pipes, the art has not adequately responded to date with the introduction of an exhaust gas cooling system for a vehicle utilizing a side exhaust pipe retrofit and/or a cooling fin system retrofit.

BRIEF SUMMARY OF THE INVENTION

The present invention provides an exhaust gas cooling system for vehicles and in particular, an exhaust gas exit pipe, a side exhaust pipe retrofit, a cooling fin, a cooling fin system retrofit, an exhaust gas cooling system kit, a side exhaust pipe retrofit kit and a cooling fin kit. The invention is particularly well-suited for easily retrofitting a side exhaust pipe to a vehicle using the vehicle's original catalytic converters, original Y pipe or H pipe, original headers and manifolds, and original placement of mufflers and also for easily retrofitting a cooling fin system to the vehicle's exhaust system, e.g., the vehicle's muffler, Y pipe or H pipe, inlet tube and outlet tube of the muffler, catalytic converter or engine parts, such as, but not limited to, manifold, oil pan, engine block and bell housing.

The present invention is advantageously safer for persons and pets who may accidentally contact the side exhaust pipe and/or shield because it is cooler than prior art side exhaust pipes and/or shields.

Another advantage of the present invention is that it is more efficient and economical to use because it preserves the entire exhaust system, including not only the mufflers, but also the connecting pipes, clamps, brackets and emission equipment, by reducing heat related stress caused by expansion and contraction of these mechanical parts.

Yet another advantage of the present invention is that the chrome coating/finish on the exhaust pipe does not get subjected to the usual temperatures of exhaust gas heat and therefor remains unaffected by the heat damage and remains unchanged as to its color, luster, shine, shape, appearance, e.g., it does not exhibit a blues-out or a browned-out appearance.

Still another advantage of the present invention is that any plastic body parts, chassis parts, or ground effects, e.g., ground moldings (which may extend around the entire perimeter of the vehicle to give the vehicle a low, slick, sweeping look), may be retrofit with the present invention preventing heat stress to the plastic body parts, chassis parts or ground effects themselves or to the exhaust gas exit areas from the excessive heat of the exhaust gas.

Yet still, another advantage of the present invention is that passenger comfort will increase in the vehicle due to the lack of excessive heating under the car, thus preventing hot floor pan areas, and hot passenger compartments due to the exhaust system.

A further advantage of the present invention is that the use of larger diameter exhaust pipes with their attractive performance characteristics are now available to the performance vehicle enthusiasts because the problem of excessive heating of the side exhaust pipe has been solved.

The foregoing, and other advantages of the present invention, are realized in one aspect thereof in an exhaust gas exit pipe comprising: a first portion, a second portion and a third portion. The first portion has a pair of first portion ends and a first portion pipe body extending between the pair of first portion ends. The pipe body has an outside wall, an inside diameter and a plurality of mixing portions. Each mixing portion of the plurality of mixing portions is configured to mix and cool exhaust gases from a muffler of a vehicle, but not to restrict the flow of the exhaust gases. The second portion has a base and an arm extending from the base. The base is fastened to one end of the pair of first portion ends. The third portion has a pair of opposing curved ends and an elongate exhaust pipe middle part extending between the pair of opposing curved ends. One of the pair of opposing curved ends is fastened to the arm of the second portion. The plurality of mixing portions is a plurality of bends with each bend of the plurality of bends bent at a bend angle. The plurality of mixing portions are a plurality of internal mixing fins disposed within the first portion.

Another aspect of the present invention is a side exhaust pipe retrofit for a vehicle comprising: an exhaust gas exit pipe, a first clamp, a mounting strap, a second clamp and a pair of rubber grommets. The exhaust gas exit pipe is as described above. The base of the second portion of the exhaust gas exit pipe is fastened to one end of the pair of opposed ends of the first portion ends at a point of fastening. The other end of the pair of opposed ends of the first portion is fastened to the muffler of the vehicle with the first clamp. The mounting clamp is fastened to both the point of fastening of the first portion and the second portion of the exhaust gas exit pipe and to the H pipe or the Y pipe of the vehicle. The pair of rubber grommets are mounted to the exterior side of the vehicle below a door of the vehicle and to the elongate middle portion of the third portion of the exhaust gas exit pipe with the second clamp. The third portion of the exhaust gas exit pipe includes a shield.

Yet another aspect of the present invention is a cooling fin comprising a base and a pair of upright arms extending from the base with one of the pair of upright arms having a lip. The base and pair of upright arms have portions therein forming clamp receiving apertures. The lip of the upright arm is dimensioned to engage with an upright arm of another cooling arm. Each clamp receiving aperture has an arm aperture portion penetrating one of the pair of upright arms and a base aperture portion penetrating the base. The arm aperture portion is dimensioned to permit air flow therethrough when a clamp is engaged through the pair of aligned clamp receiving apertures. The cooling fin further comprises a "U" shaped channel having a channel thickness and the base is a rectangular base with the pair of upright arms extending therefrom with the other upright arm of the pair of upright arms having an upper edge spaced from the base. The cooling fin has a pair of channel edges in the base and a pair of aligned clamp receiving apertures penetrating the base and the upright arms of the cooling fin and disposed on the channel edges.

Still another aspect of the present invention is a cooling fin system retrofit comprising: one or more cooling fins and one or more adjustable clamps. Each cooling fin has a base and a pair of upright arms extending from the base with one of the pair of upright arms having a lip. The base and pair of upright arms have portions therein forming a pair of clamp receiving apertures. Each adjustable clamp is dimensioned to engage within the pair of clamp receiving apertures. Each adjustable clamp either by itself or in combination with one or more adjustable clamps is dimensioned to extend around an object to be cooled.

Yet still another aspect of the present invention is an exhaust gas cooling system for a vehicle comprising a side exhaust pipe retrofit and a cooling fin system retrofit both used in a vehicle to cool exhaust gases generated by the vehicle. The side exhaust pipe retrofit and the cooling fin system retrofit are as described above.

A further aspect of the present invention is a cooling fin kit comprising one or more cooling fins, each cooling fin having a base with a pair of upright arms extending therefrom; one of the pair of upright arms having a lip, the base and pair of upright arm portions having clamp receiving apertures portions therein forming a pair of clamp receiving apertures. The cooling fin kit further comprises one or more adjustable clamps, each of the adjustable clamps dimensioned to engage within a pair of clamp receiving apertures of one or more of the cooling fins and each of the adjustable clamps either by itself or in combination with one or more of the adjustable clamps is dimensioned to extend around an object to be cooled.

A still further aspect of the present invention is a side exhaust pipe retrofit kit comprising: an exhaust gas exit pipe as described above, a first clamp, a mounting strap, a second clamp and a pair of rubber grommets. The base of the second portion of the exhaust gas exit pipe is fastened to one end of the pair of opposed ends of the first portion at a point of fastening. The other end of the pair of opposed ends of the first portion of the exhaust gas exit pipe is fastened to the muffler of the vehicle with the first clamp. The mounting clamp is fastened to both the point of fastening of the first portion and the second portion of the exhaust gas exit pipe and to the H pipe or the Y pipe of the vehicle. The pair or rubber grommets are mounted to the exterior side of the vehicle below the door of the vehicle and to the elongate middle portion of the third portion of the exhaust gas exit pipe with the second clamp. The third portion of the exhaust gas exit pipe includes a shield. The side exhaust pipe retrofit kit further comprises a muffler having an inlet tube and an outlet tube at a same end of the muffler.

A yet still further aspect of the present invention is an exhaust gas cooling system kit comprising: a cooling fin kit and a side exhaust pipe retrofit kit, each as described above. The third portion of the exhaust gas exit pipe of the exhaust gas cooling system kit includes a shield. The exhaust gas cooling system kit further comprises a muffler having an inlet tube and an outlet tube at a same end of the muffler. The cooling fin system kit of the exhaust gas cooling system kit further comprises one or more adjustable clamps, each of the adjustable clamps dimensioned to engage within a pair of clamp receiving apertures of one or more of the cooling fins and each of the adjustable clamps either by itself or in combination with one or more adjustable clamps dimensioned to extend around an object to be cooled.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWING(S)

The preferred exemplary embodiment of the present invention will hereinafter be described in conjunction with the appended drawing wherein like designations refer to like elements throughout and in which.

Figure 1:
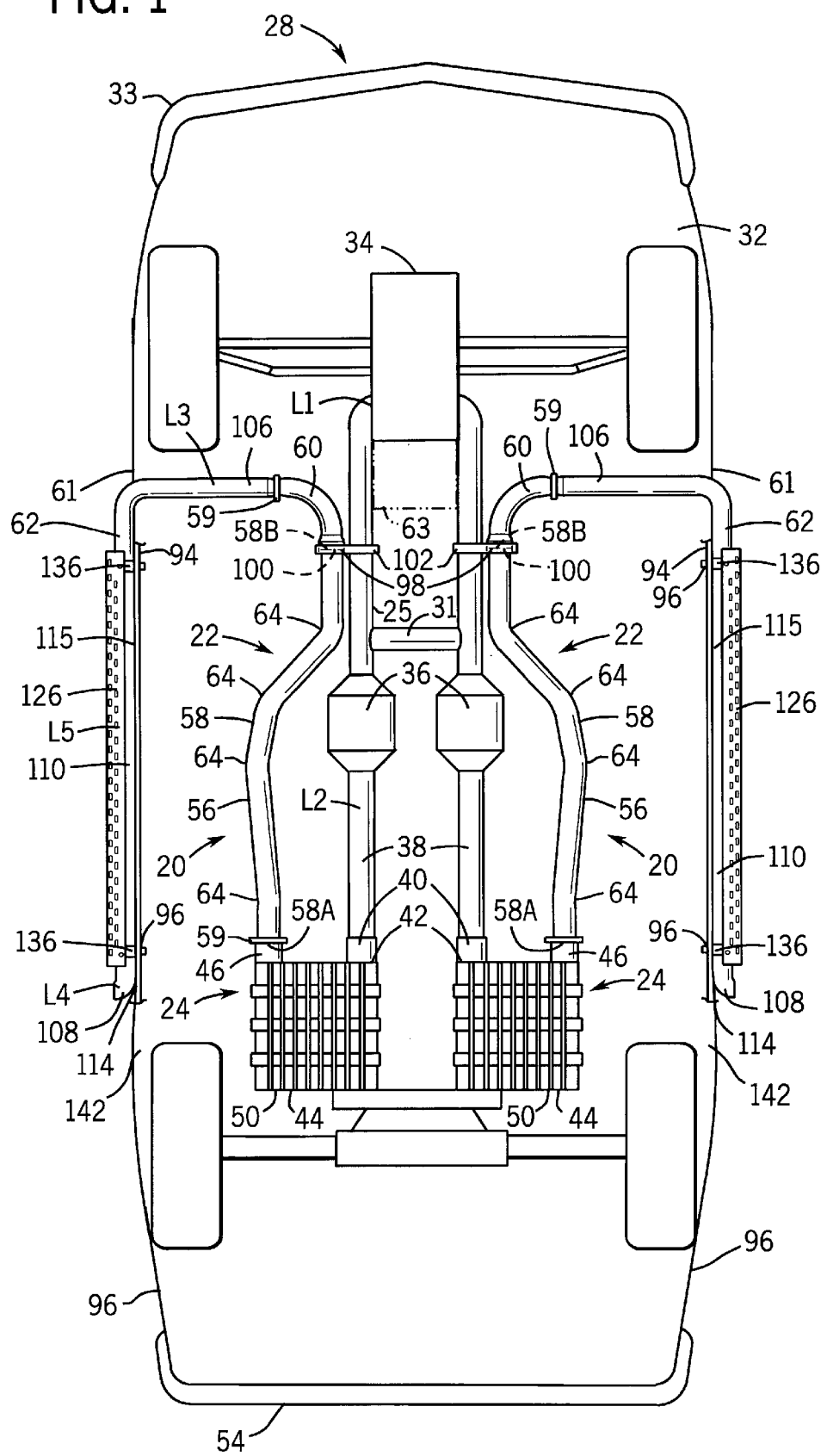
FIG. 1 is a view of an exhaust cooling system of the present invention, mounted in a vehicle, viewed from an underside of the vehicle, showing a first embodiment of a first portion of an exit pipe of a side exhaust pipe retrofit and showing a cooling fin system retrofit.
Figure 2:
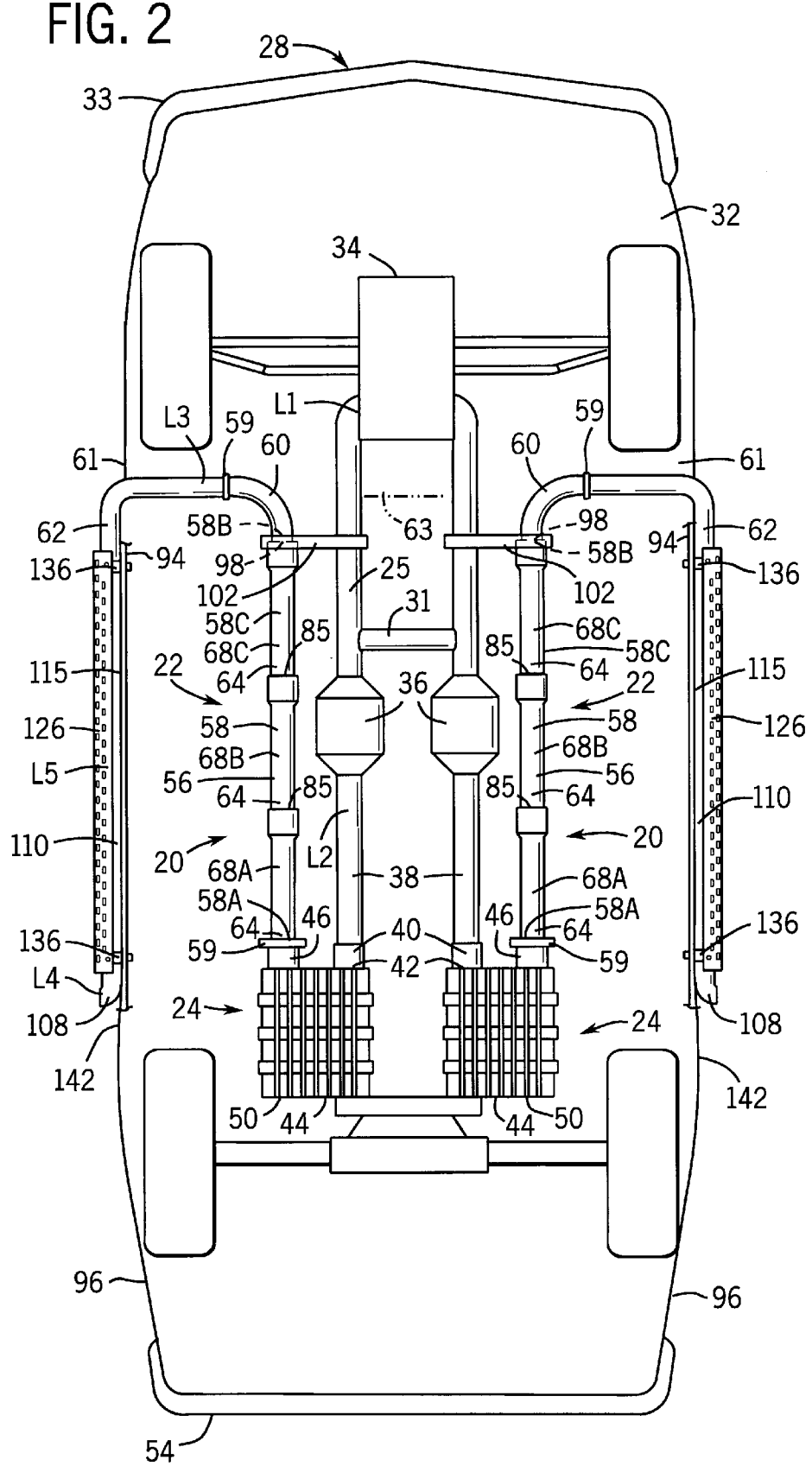
FIG. 2 is a view of an exhaust cooling system of the present invention, mounted in a vehicle, viewed from an underside of the vehicle, showing a second embodiment of the first portion of the exit pipe of the side exhaust pipe retrofit and showing a cooling fin system retrofit.
Figure 3:
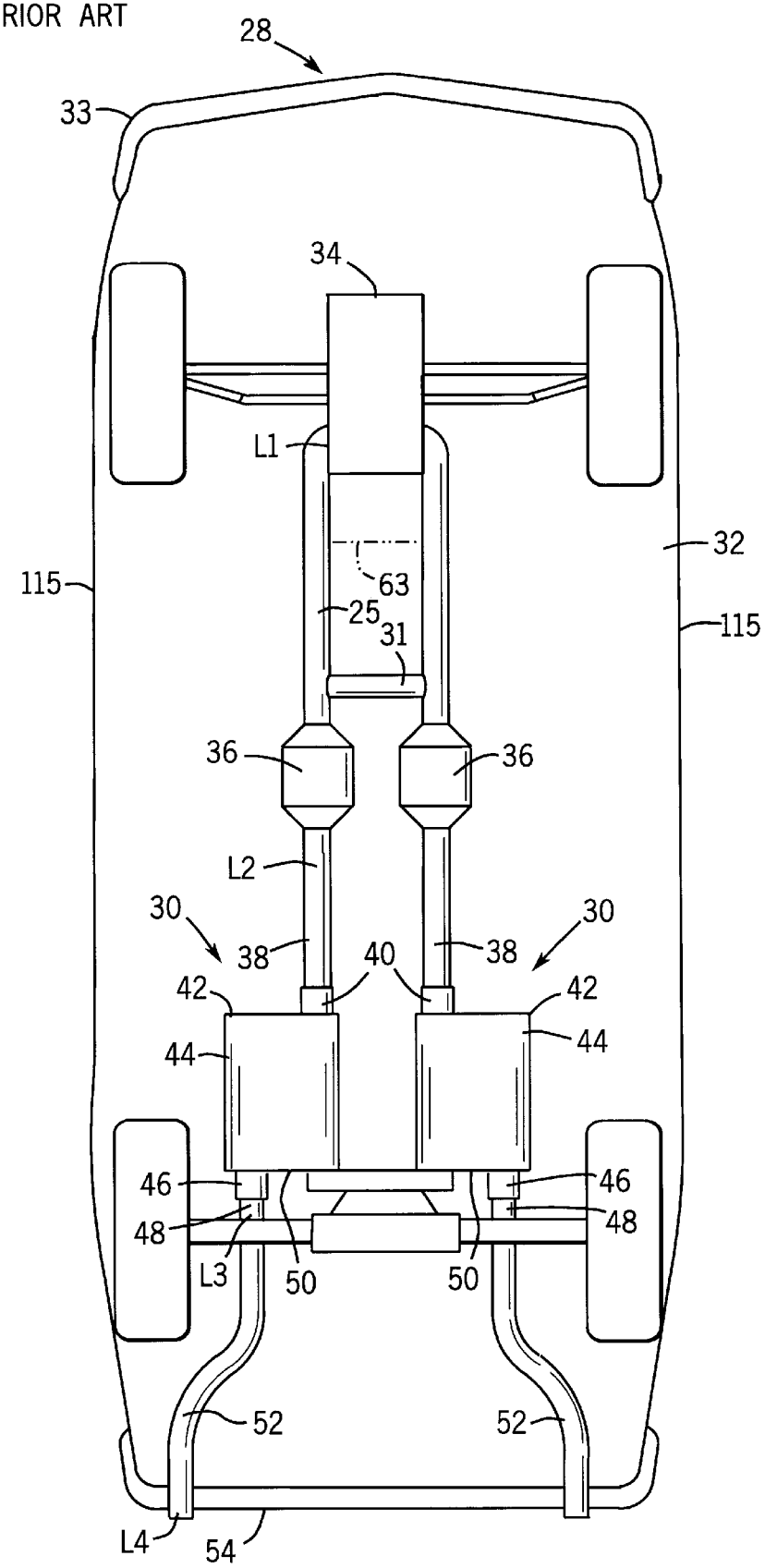
FIG. 3 is a view of a prior art exhaust system in a vehicle, viewed from an underside of the vehicle.
Figure 4A:
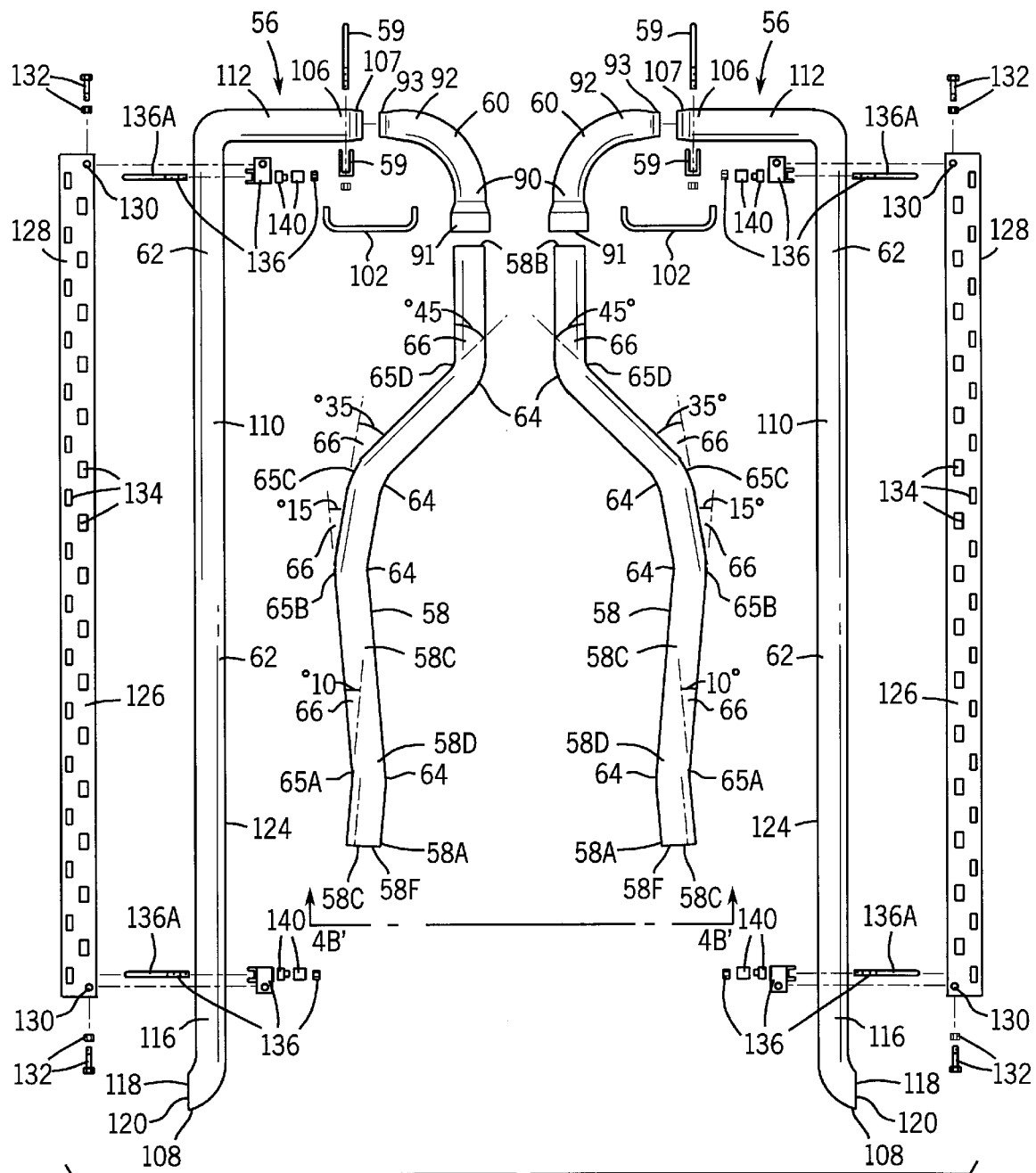
FIG. 4A is an exploded view of the first embodiment of the side exhaust pipe retrofit of the present invention, shown in FIG. 1, with the mixing portions of the pipe body of the first portion of the exit pipe being multiple bends, where the pipe body has four bends.
Figure 4B:
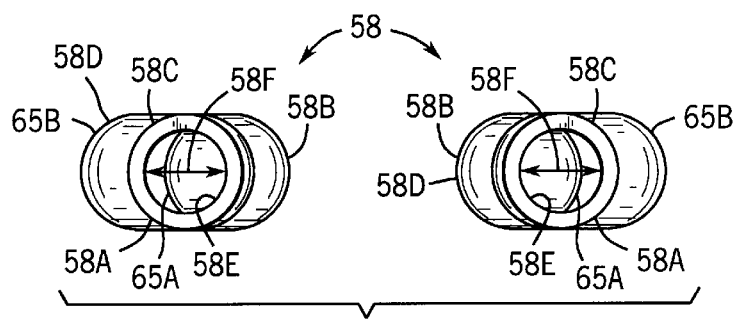
FIG. 4B is another exploded view of the first, second and third portions of the exit pipe of FIG. 4A.
Figure 4B:
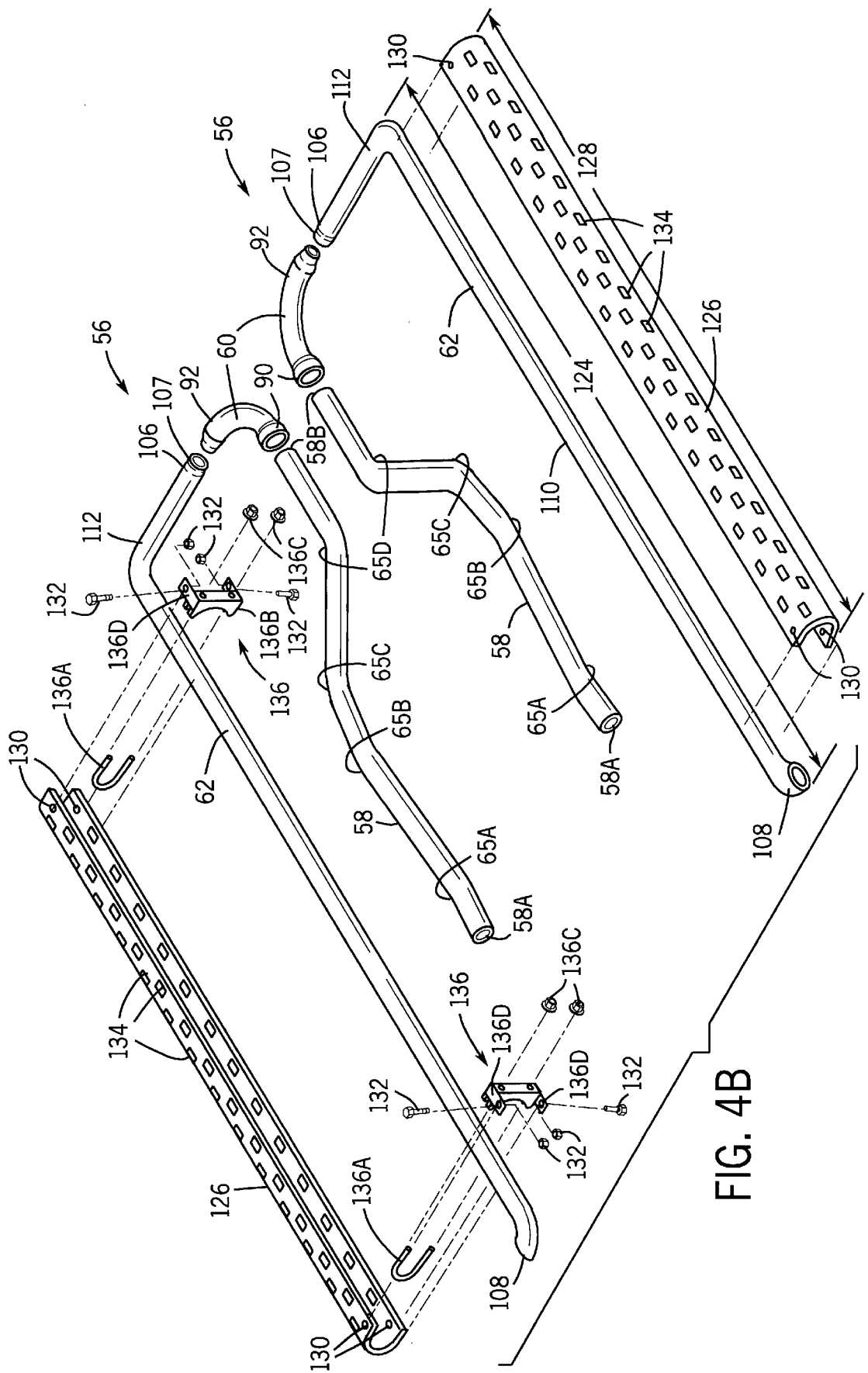
Figure 4C:
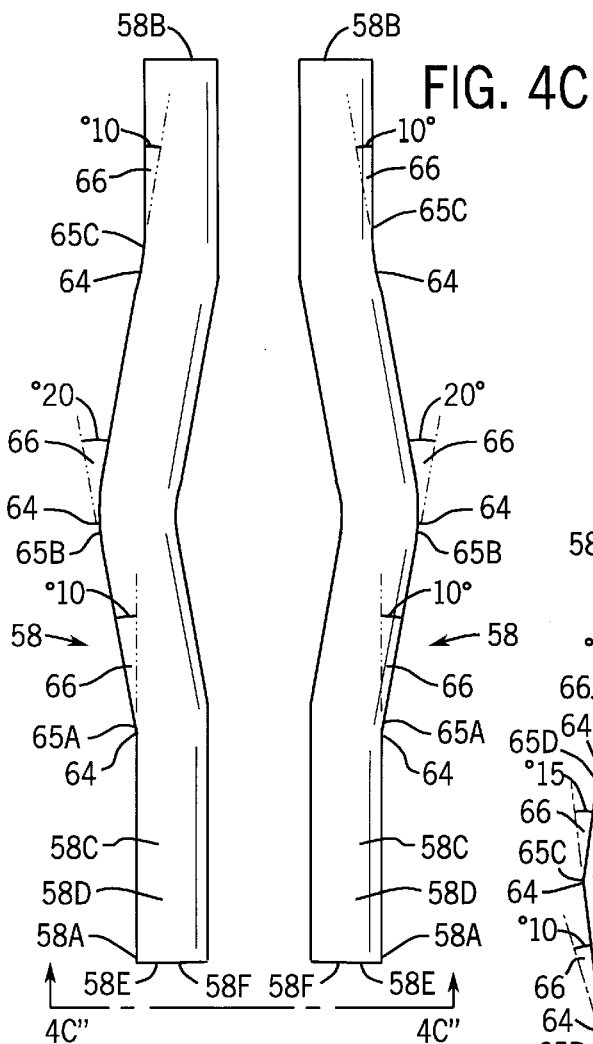
Figure 4D:
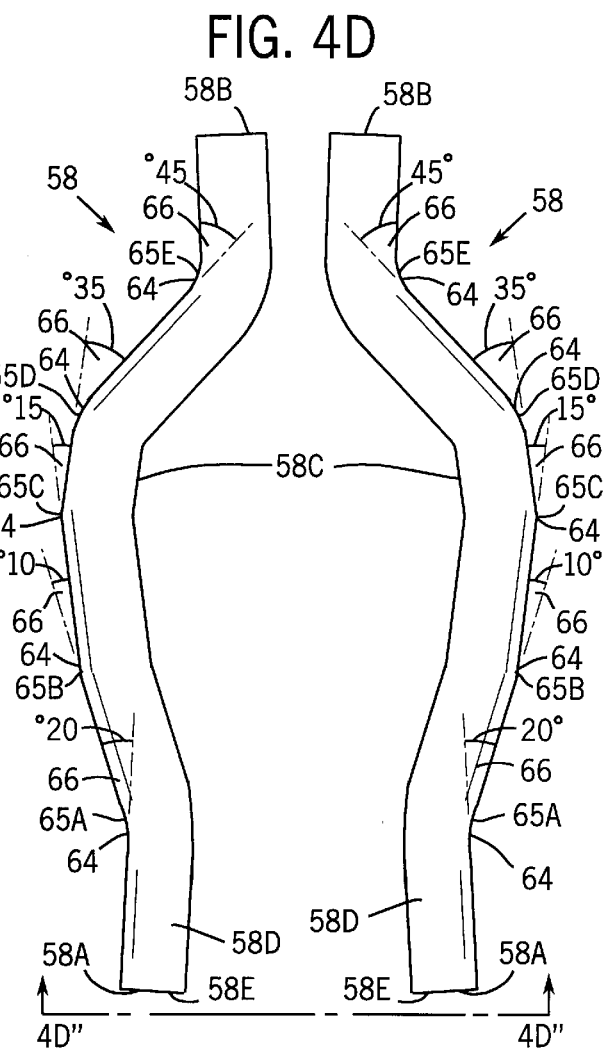
Figure 4C:
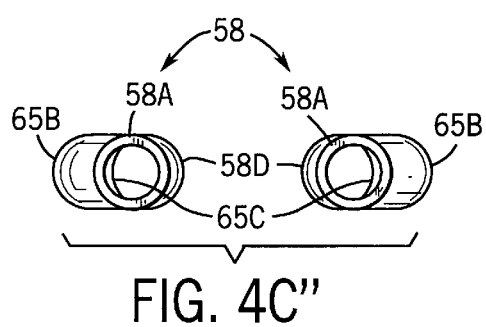
Figure 4D:
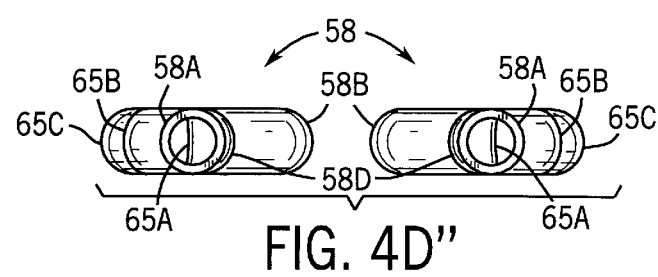
Figure 4C:
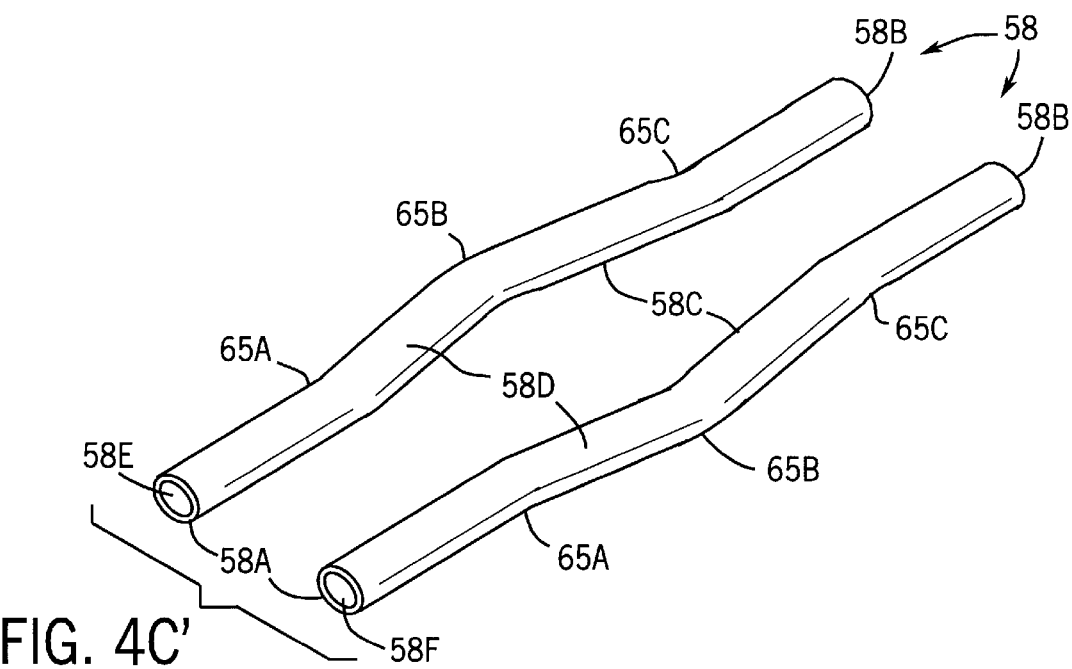
Figure 4D:
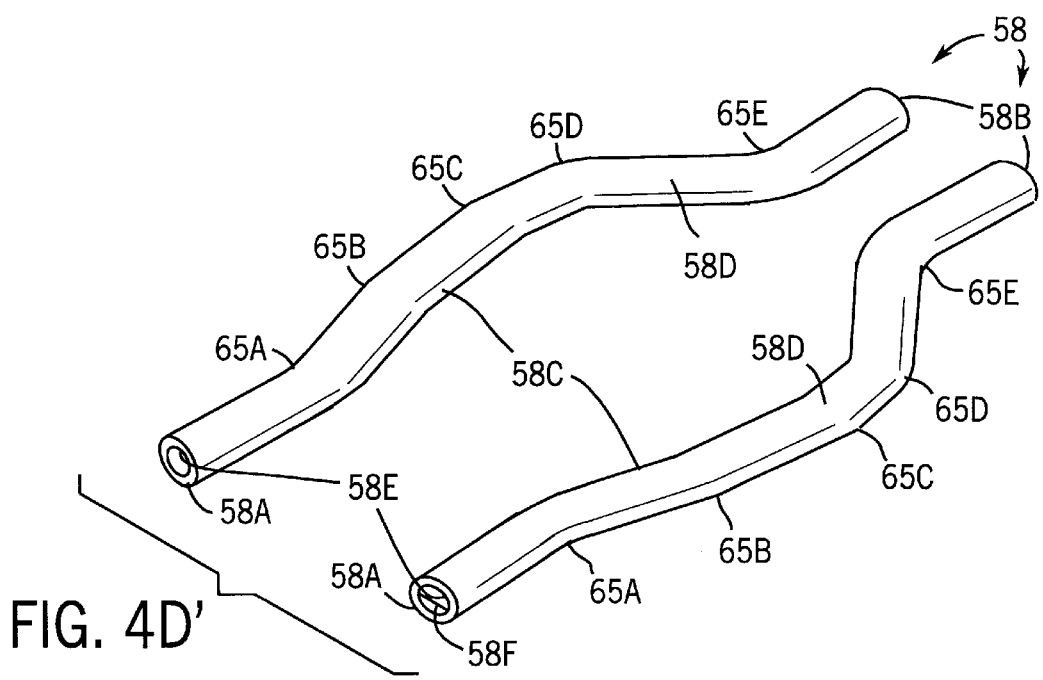
Figure 5A:
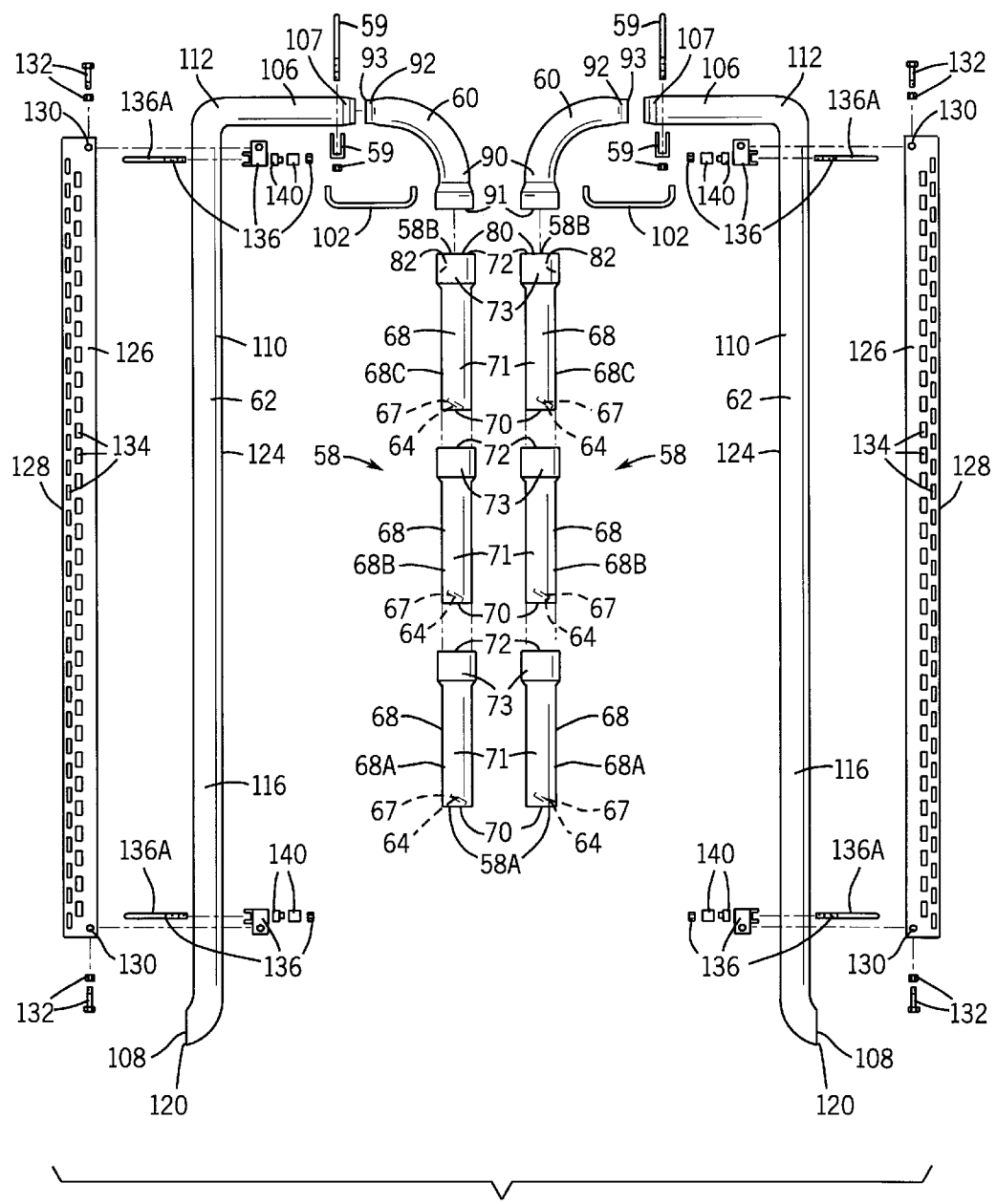
Figure 7:
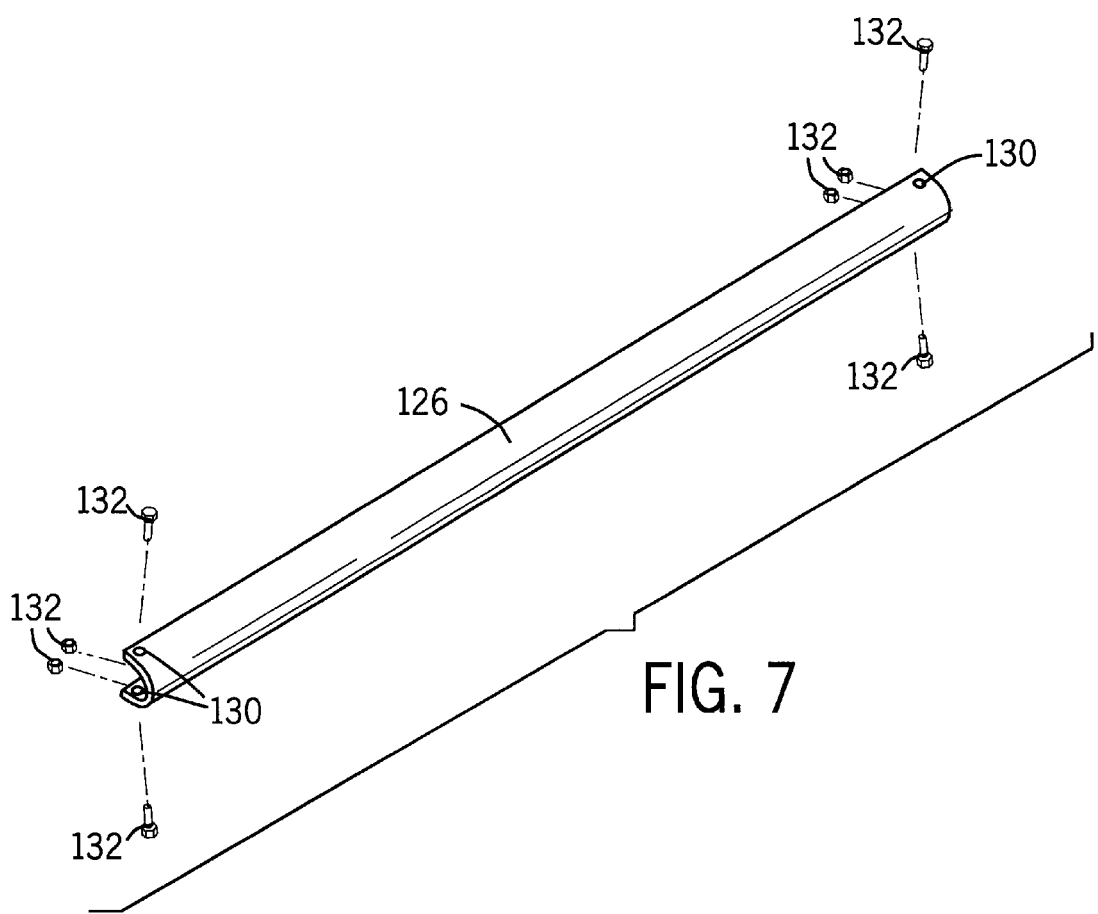
Figure 9:
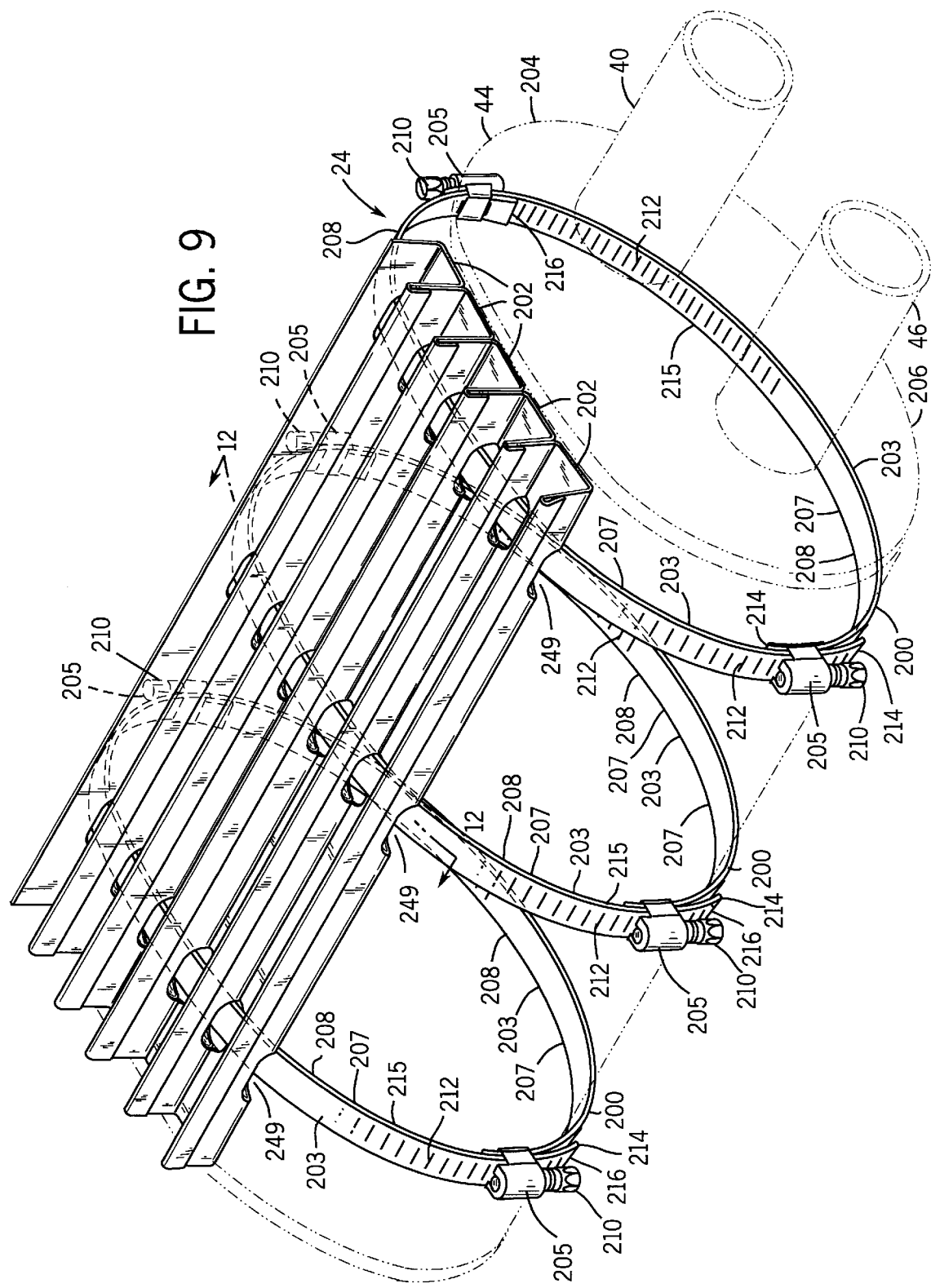
Figure 16:
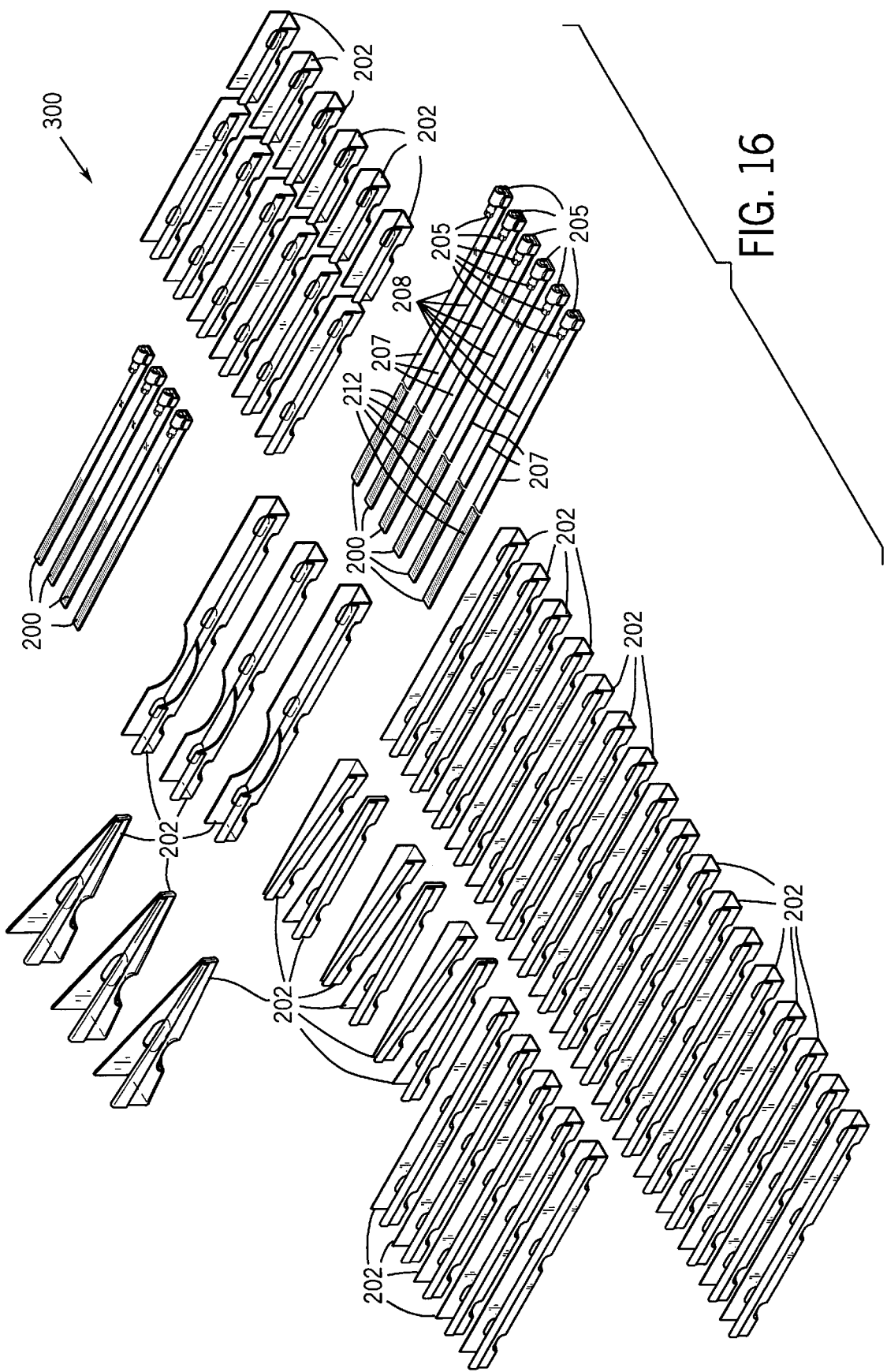
Figure 19A:
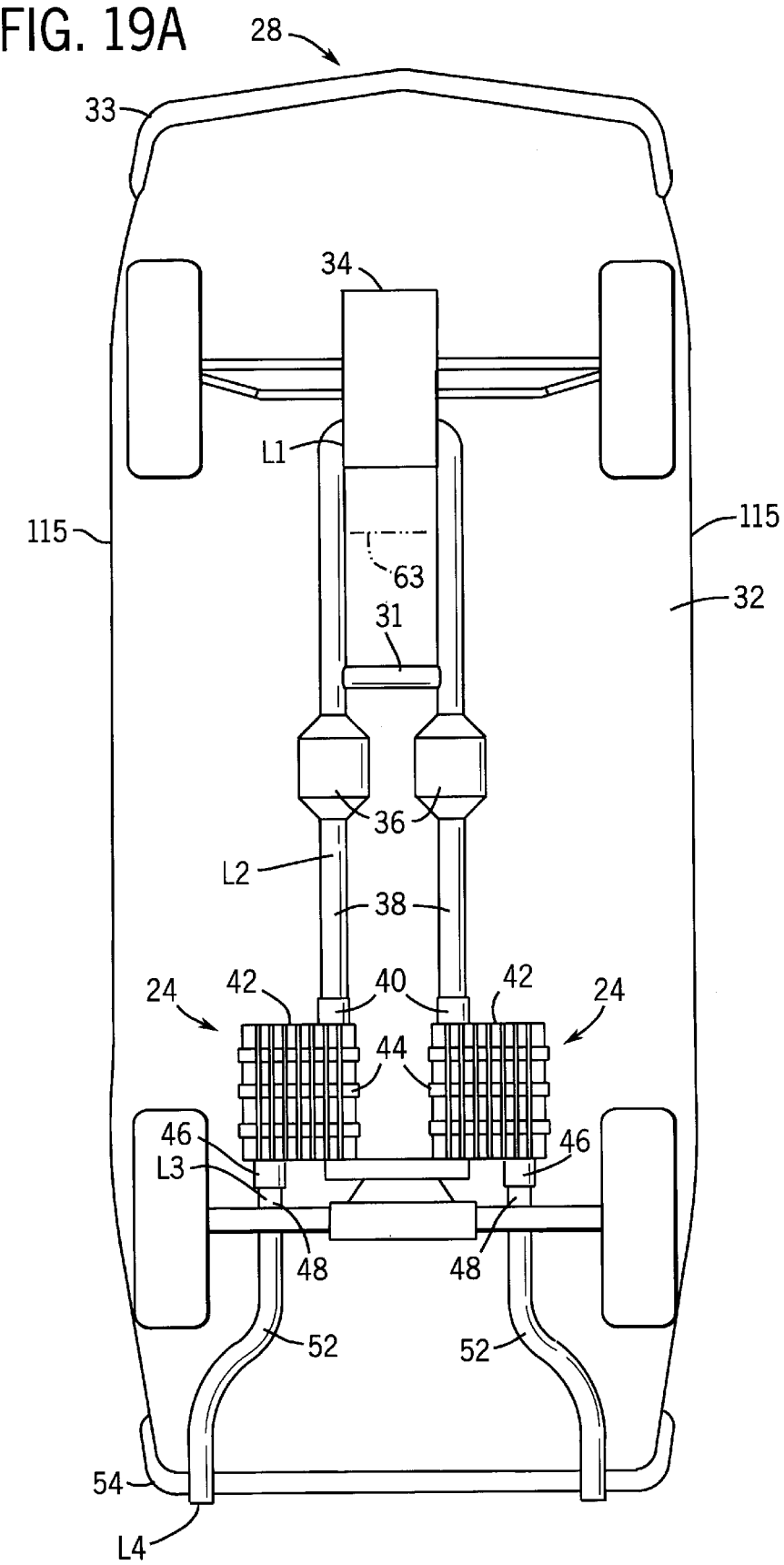
Figure 19B:
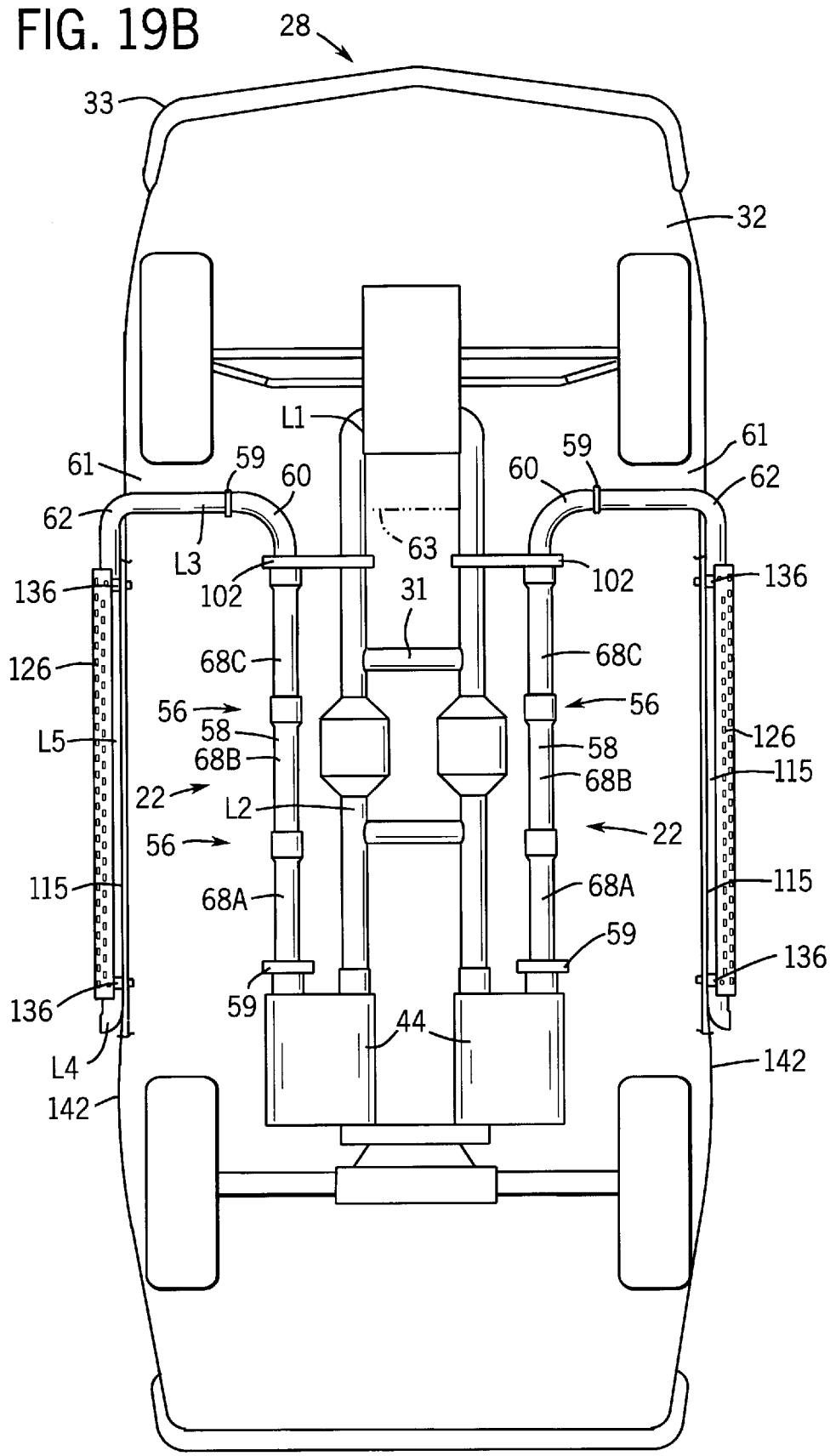
Figure 20:
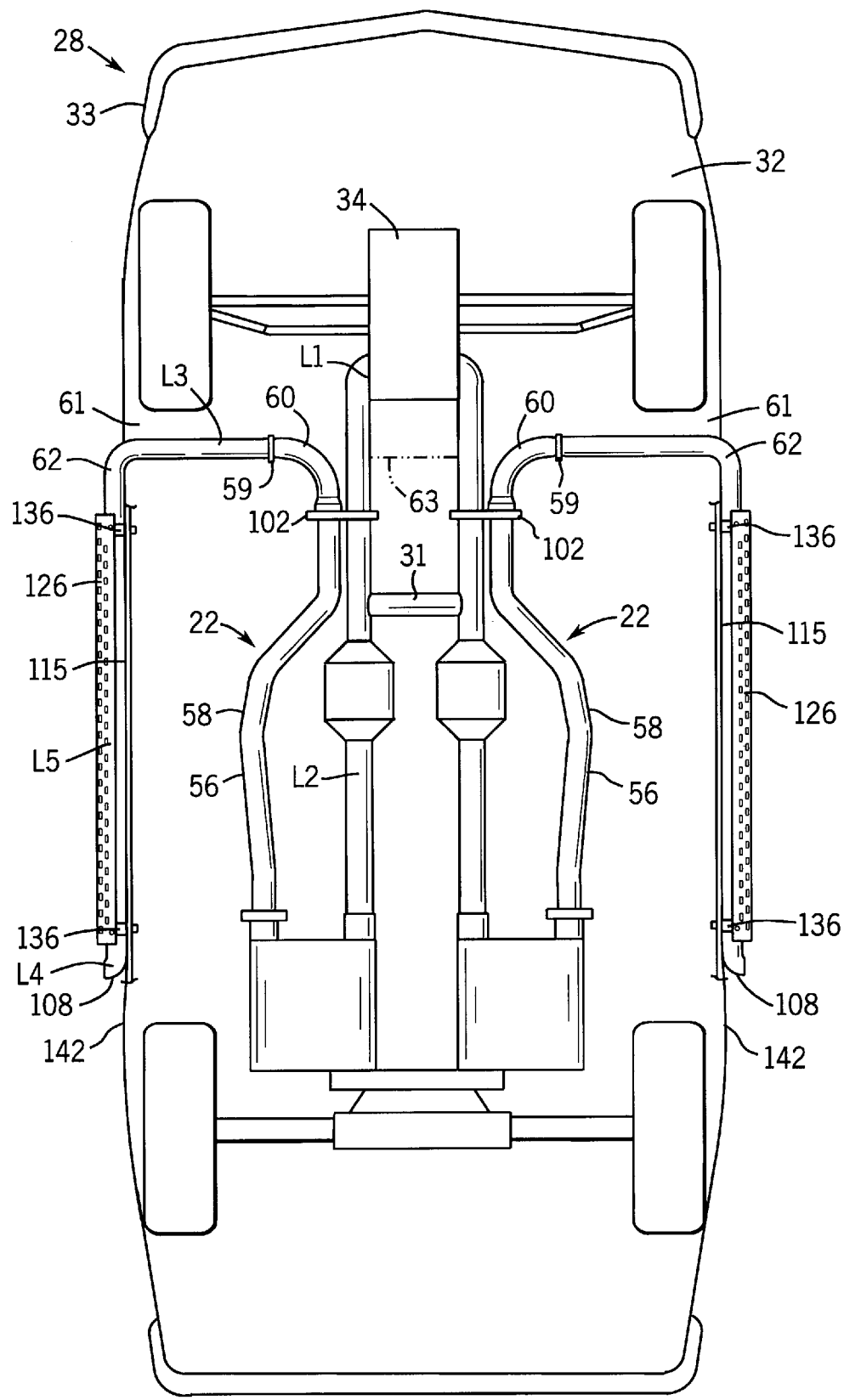
Figure 21:
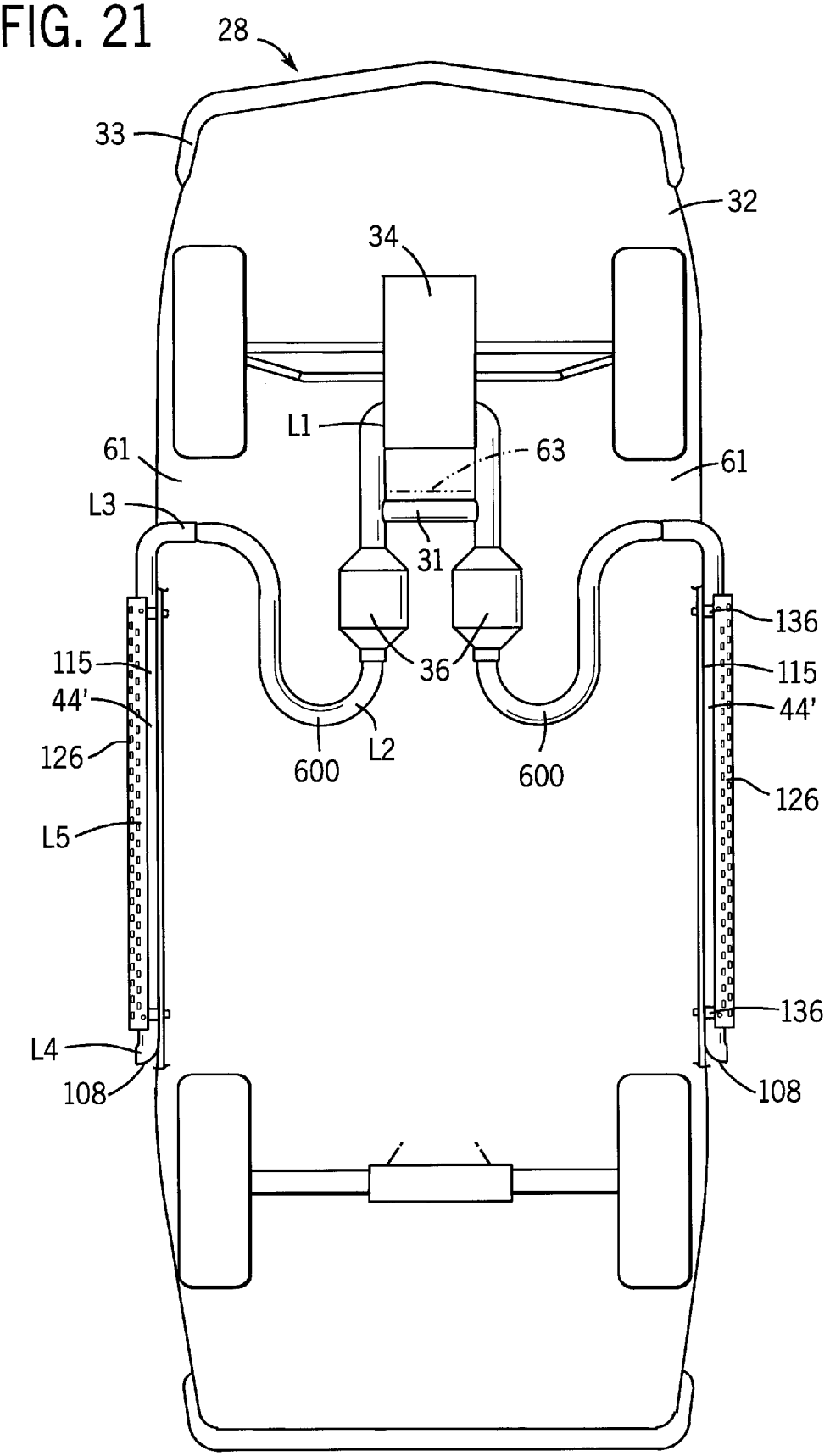

FIG. 4B' is an end view of the first portion of the exit pipe of FIG. 4A taken along 4B'—4B' of FIG. 4A;

FIG. 4C is an alternate aspect of the first portion of the first embodiment of the side exhaust pipe retrofit of FIG. 4A, where the pipe body has three bends;

FIG. 4C' is another view of the first portion of the first embodiment of FIG. 4C;

FIG. 4C" is an end view of the first portion of the exit pipe of FIG. 4C taken along 4C"—4C" of FIG. 4C;

FIG. 4D is an alternate aspect of the first portion of the first embodiment of the side exhaust pipe retrofit of FIG. 4A, where the pipe body has five bends;

FIG. 4D' is another view of the first potion of the first embodiment of FIG. 4D;

FIG. 4D" is an end view of the first portion of the exit pipe of FIG. 4D taken along 4D"—4D" of FIG. 4D;

FIG. 5A is an exploded view of the second embodiment of the side exhaust pipe retrofit of the present invention, shown in FIG. 2, with the mixing portions of pipe body of the first portion of the exit pipe being multiple internal mixing fins;

FIG. 5B is a view of the first portion of the exit pipe of FIG. 5A, with portions partially cut away showing the structure and alignment of the internal mixing fins; the second portion and third portion of the exit pipe shown in FIG. 5A having the having the same side view as that of the second portion and third portion of the exit pipe shown in FIG. 4B;

FIG. 5C is a partial end view of two adjacent segments of FIG. 5A, illustrating the orientation of the internal mixing fins in each segment prior to orientation of the segments and joining of the segments;

FIG. 5D is an end view of the first portion of the exit pipe of FIGS. 2 and 5B viewed along 5D—5D of FIG. 5B, an end of the first portion closest to the outlet tube of the muffler;

FIG. 6 is a view of a modification of the side exhaust pipe retrofit of the present invention for use with a muffler having an inlet tube and an outlet tube at opposite ends of the muffler, the side exhaust pipe having an additional "J"-shaped portion, and viewed mounted in a vehicle, viewed from an underside of the vehicle; and also showing a cooling fin system retrofit installed on the mufflers of the vehicle;

FIG. 7 is a view of an alternate heat shield made without ventillation holes used with the side exhaust pipe retrofit of the present invention;

FIG. 8A is a side view of the side exhaust pipe retrofit of the exhaust cooling system of FIGS. 1 and 2 mounted on the vehicle;

FIG. 8B is a partial cross sectional view of the attachment of the third portion of the exit pipe, including the shield, to the exterior side of the vehicle below the door, taken through section line 8B—8B in FIG. 8A;

FIG. 8C is a top view of the attachment of the third portion of the exit pipe to the exterior side of the vehicle below the door, with the shield in phantom;

FIG. 8D is an exploded view of the of the clamp and grommets for attaching the third portion of the exit pipe to the side of the vehicle below the door;

FIG. 9 is a perspective view of the cooling fin system retrofit of the present invention shown mounted around a muffler of a vehicle; with the muffler shown in phantom line;

FIG. 10 is a perspective view of a single cooling fin of the present invention;

FIG. 11 is a top view of the cooling fin of FIG. 10;

FIG. 12 is a partial cross sectional view of the cooling fin system retrofit of FIG. 9, taken through section line 12—12 of FIG. 9;

FIG. 13 is an end view of two cooling fins; illustrating how cooling fins of the present invention are joined to each other;

FIGS. 14 and 15A–15C are views of additional embodiments of the cooling fin of the present invention;

FIG. 16 is a view of a cooling fin retrofit kit of the present invention;

FIGS. 17A–17D are views of side exhaust pipe retrofit kits of the present invention;

FIGS. 18A–18D are views of cooling system retrofit kits of the present invention;

FIG. 19A is a view of the cooling fin system retrofit installed on the mufflers of the vehicle, shown in FIG. 3, as viewed from an underside of he vehicle, showing the locations on the vehicle where temperature readings were taken with a pyrometer as discussed in Example 8;

FIG. 19B is a view of the side exhaust system retrofit, including mufflers, installed on the vehicle, shown in FIG. 2, as viewed from an underside of the vehicle, showing the locations on the vehicle where temperature readings were taken with a pyrometer as discussed in Example 8;

FIG. 20 is a view of the side exhaust system retrofit, including mufflers, installed on the vehicle, shown in FIG. 1, as viewed from an underside of the vehicle, showing the locations on the vehicle where temperature readings were taken with a pyrometer as discussed in Example 8; and FIG. 21 is a view of the vehicle, shown in FIG. 3, as viewed from an underside of the vehicle, having been modified from that shown in FIG. 3 by directing the exhaust gases from the H pipe directly to the DYNAMAX™ exhaust systems installed on the sides of the vehicle as side exhaust pipes, and showing the locations on the vehicle where temperature readings were taken with a pyrometer as discussed in Example 8.

DETAILED DESCRIPTION OF THE INVENTION

The present invention relates broadly to exhaust gas cooling systems for vehicles and in particular, to an exhaust gas exit pipe, to a side exhaust pipe retrofit, to a cooling fin, to a cooling fin system retrofit, to an exhaust gas cooling system kit, to a side exhaust pipe retrofit kit and to a cooling fin kit. The invention is particularly well-suited for retrofitting a side exhaust pipe to a vehicle using the vehicle's original catalytic converters, original Y pipe or H pipe, original headers and manifolds and the original placement of mufflers and for retrofitting a cooling fin system to the vehicle's exhaust system, e.g., the vehicle's muffler, Y pipe or H pipe, inlet tube and outlet tube of the muffler, catalytic converter or engine parts, such as, but not limited to manifolds, oil pan, engine block, and bell housing.

Accordingly, the present invention will now be described in detail with respect to such endeavors; however, those skilled in the art will appreciate that such a description of the invention is meant to be exemplary only and should not be viewed as limitative on the full scope thereof.

The present invention provides an exhaust gas cooling system 20 for a vehicle. The exhaust gas cooling system 20 has a side exhaust pipe retrofit 22 and a cooling fin system retrofit 24 as shown in FIGS. 1, 2, and 6. The side exhaust pipe retrofit 22 as shown in FIGS. 1, 2, 4A–4D", 5A–5D and 6–8D may be used without the cooling fin system retrofit 24, as shown in FIG. 19B and 20. The cooling fin system retrofit 24, as shown in FIGS. 1, 2, 6, 9–15C, may be used without the side exhaust pipe retrofit 22, as shown in FIG. 19A.

For simplicity of illustration, FIGS. 1, 2, 3, 6, 19A, 19B, 20, and 21 are schematic views of the an underside 32 of a vehicle 28, illustrating the exhaust system, it is to be understood by those skilled in the art that all other components needed to make the vehicle function are present, but not necessarily shown.

Most advantageously, the side exhaust pipe retrofit 22 uses a vehicle's original catalytic converter, original Y pipe or H pipe, original headers and manifolds, and the original placement of mufflers, although not necessarily the original mufflers. The side exhaust pipe retrofit 22 itself contains no internal muffler 44'. As shown in FIG. 8A, the side exhaust pipe retrofit provides a decorative feature displaying a gorgeous chrome coated side exhaust pipe 62 alongside an outside of a vehicle 28, providing the look of a customized roadster, and providing deep booming engine sounds next to a driver (not shown) of the vehicle 28.

To best understand the advantages of the side exhaust pipe retrofit 22, in reducing excessive heating and in maintaining the fine luster, color and finish of the chrome, e.g., preventing blues-out or browned-out of the chrome plating/coating/finish of the side exhaust pipe 62, it is useful to understand a common prior art exhaust system 30.

FIG. 3 schematically illustrates a prior art exhaust system 30 for a 1990 Mustang GT vehicle, a typical rear wheel drive vehicle. In FIG. 3, the prior art exhaust system 30 is viewed from an underside 32 (hereinthroughout, also "underbody 32", or "under carriage 32") of a vehicle 28 having a front end 33. As best shown in FIG. 3, in most prior art exhaust systems 30, the exhaust gases from an engine manifold 34 pass through a pair of catalytic converters 36 and then are transported into mufflers 44 using a pipe 25. The pipe 25 used to convey the exhaust gases from the engine manifold 34 to the catalytic converters can either be an H-pipe 31 or a Y pipe, as is known in the art. In FIG. 3, an H pipe 31 is used to convey the exhaust gases from the engine manifold 34, so there are two catalytic converters 36 and two mufflers 44. If a Y pipe (not shown) were used to convey the exhaust gases from the engine manifold 34, there would be only one catalytic converter 36 and one muffler 44 in the vehicle 28, as is known in the art. The exhaust gases flow through entrance pipe 38 which is located in an inlet tube 40 at one end 42 of a muffler 44. The exhaust gases then flow through muffler 44 and exit through an outlet tube 46 into an exit pipe 48. Frequently, exit pipe 48 is located at an end 50 of the muffler 44 opposite end 42. The exhaust gases then travel through a tailpipe 52 to a rear end 54 of vehicle 28 and exit out of vehicle 28.

Yet another prior art exhaust system disclosed in U.S. Pat. No. 3,070,187 to Deremer, the disclosure of which is hereby incorporated by reference, uses a muffler having an inlet tube 40 and an outlet tube 46 disposed on the same end of the muffler 44.

As best shown in FIGS. 1, 2, and 6, the side exhaust pipe retrofit 22 of the present invention for use in vehicle 28, having two mufflers 44, preferably includes a pair of exhaust gas exit pipes 56 (also, "exit pipe(s) 56"), one per muffler 44. (If vehicle 28 only has one muffler 44, then only one exit pipe 56 is used for the side exhaust pipe retrofit 22.) In the side exhaust pipe retrofit 22 of the present invention, the exhaust gases from an engine manifold 34 pass into a pair of catalytic converters 36. The exhaust gases then proceed into a pair of mufflers 44 via a pair of entrance pipes 38, with one entrance pipe 38 per muffler 44. Entrance pipe 38 is located in an inlet tube 40 at one end 42 of muffler 44. The exhaust gases flow through each muffler 44 and exit at an outlet tube 46 of muffler 44 into exit pipe 56.

In the present invention, in muffler 44, preferably inlet tube 40 and outlet tube 46 of muffler 44 are at a same end 42 of muffler 44, thus entrance pipe 38 and exit pipe 56 for exhaust gas are preferably both at the same end 42, as best shown in FIGS. 1, 2, 19B and 20. However the present invention may be used with a muffler 44 having inlet tube 40 and outlet tube 46 at opposite ends 42, 50 of muffler 44, wherein entrance pipe 38 and exit pipe 56 are at opposite ends 42, 50 of the muffler 44, as shown in FIG. 6. Whether the muffler 44 has the inlet tube 40 and the outlet tube 46 at the opposite ends 42, 50 of the muffler 44 or at the same end 42 of the muffler, in the side exhaust pipe retrofit 22 of the present invention, each of the exit pipes 56, has three exit pipe portions, a first portion 58, a second portion 60 and a third portion 62.

As best shown in FIGS. 1, 2, 4A–4D", 5A–5B, and 6, first portion 58, herein throughout, also "forward extension" 58, has a pair of first portion ends 58A and 58B and a first portion pipe body 58C extending between ends 58A, 58B. The pipe body 58C also has an outside wall 58D, an opposite inside wall 58E and an inside diameter 58F. The first portion 58 is suitably dimensioned to extend from an outlet tube 46 of muffler 44 to a position behind a front wheel 61 and adjacent to a transmission 63 of a typical rear wheel drive vehicle 28. The first portion 58 extends from an end of muffler 44 forward to a front end 33 of the vehicle 28 and transports the hot exhaust gases out of muffler 44 forward to front end 33 of vehicle 28, hence the alternate term, forward extension 58.

First portion end 58A is fastened to outlet tube 46 of muffler 44 with a fastener, such as by clamping with a clamp 59 (hereinafter, also "first clamp 59") or by welding first portion end 58A to the outlet tube 46 with a weld, or by other ways known in the art of fastening. Clamp 59 is preferably a commercially available clamp, having a U-bolt, a saddle for accepting the U-bolt and a pair of fasteners for fastening the U-bolt to the saddle, known as a flatback style clamp with a U-Bolt, commercially available as HEAVY DUTY EXHAUST CLAMP™ clamp from P.A.P. Corp. of Livonia, Mich., U.S.A.

Pipe body 58C preferably has a plurality of mixing portions 64, preferably three to five mixing portions 64, most preferably three or four mixing portions 64. Each mixing portion 64 of the plurality of mixing portions 64 is configured to mix the exhaust gases, but not to restrict the exhaust gas flow through pipe body 58C. Each mixing portion 64 allows an unrestricted exhaust gas flow through pipe body 58C. Applicant has discovered that the use of a plurality of mixing portions 64 in pipe body 58C is sufficient to alter the speed of the exhaust gas, causing the exhaust gas to mix in a swirling fashion along the pipe body 58C, such that a cooler portion of the exhaust gases flow to outside wall 58D of the pipe body 58C.

Applicant has discovered the mixing portions 64 may be configured at least two ways, as shown in a first embodiment and a second embodiment of the first portion 58 of the present invention. The first embodiment uses multiple bends for mixing portions 64 and the second embodiment uses internal mixing fins for mixing portions 64.

The first embodiment of the first portion 58 is shown in FIGS. 1, 4A–4D" where the first portion 58 is configured to have a plurality of very shallow angled bends 65 in pipe body 58C. Each bend 65 corresponds to a mixing portion 64 and has a bend angle 66 of approximately 10 degrees to approximately 45 degrees. Each bend 65 is either "bent in" or "bent out". The term "bent out" means the bend 65 is bent toward an adjacent door 115 of vehicle 28 or toward the outside of the vehicle, e.g., away from a center of the vehicle 28. The term "bent in" means the bend 65 is bent toward the center of the vehicle 28, e.g., away from the adjacent door 115 of the vehicle 28. Preferably none of the bends 65 exceeds a bend angle 66 of approximately 45 degrees, plus or minus 5 degrees. The number of degrees per bend angle 66 may vary by plus or minus 5 degrees. When the bend angles 66 of the "in" and "out" bends are summed the net effect is to cancel, e.g., to approximate zero degrees plus or minus 5 degrees. As shown in end views in FIGS. 4B', 4C", and 4D", the mixing portions 64, bends 65, are not orientated up or down, but just in or out.

Preferably there are three to five bends 65 in first portion 58 of pipe body 58C which are separated from each other by at least six inches, but not more than eighteen inches. Most preferably the bends 65 are not more than 12 inches apart. The placement of the bends 65 is important to achieve the cooling of the exhaust gases. The aforementioned spacing advantageously maximizes the cooling of the exhaust gases as they swirl along portions of the pipe body 58C from mixing portion 64, e.g., bend 65 to mixing portion 64, e.g., bend 65.

Most preferably the first portion 58 has four mixing portions 64, e.g., bends 65A, 65B, 65C and 65D, as shown in FIGS. 1, 4A, 4B, 6 and 20. Bend 65A is the first bend; 65B is the second bend; 65C is the third bend; and 65D is the fourth bend.

The actual angulation and spacing of each of the bends 65 depends upon the vehicle 28 (e.g., the specific automobile or truck or motorcycle) for which the retrofit is being made. For the use with the vehicle 28 shown in FIG. 1, a 1990 Mustang GT automobile, most preferably the bend angle 66 for the bend 65A is approximately 10 degrees bent out; the bend angle 66 for bend 65B is approximately 15 degrees bent in; the bend angle 66 for bend 65C is approximately 35 degrees bent in; and the bend angle 66 for bend 65D is approximately 45 degrees bent out. These bend angles are best shown in FIG. 4A. For the aforementioned vehicle, the first of the multiple bends 65A is disposed slightly ahead of end 42 of muffler 44, e.g., within approximately 4 inches to 6 inches of the muffler inlet tube 40 of vehicle 28 and from end 58A. The first bend 65A starts mixing the hot exhaust gas and cooling it. The next bend 65B is preferably spaced approximately fifteen inches from the first bend 65A. Bends 65C and 65D are made to clear the catalytic converter 36. Bend 65C is spaced approximately 6 inches from bend 65B. Bend 65D is spaced preferably 10 inches from bend 65C. The spacing from bend 65D to end 58B is approximately 8 inches.

As best shown in FIGS. 4C, 4C' and 4C", an alternate aspect of the first embodiment of first portion 58 has three mixing portions 64 having bends 65A, 658 and 65C. For the aforementioned vehicle 28, preferably bend 65A is within about 9 inches of the muffler inlet tube 40 and about 9 inches from end 58A and bend 65A is bent at a bend angle 66 of approximately 10 degrees bent out. Preferably bend angle 65B is spaced approximately 9 inches from bend angle 65A and bend angle 65B is bent at a bend angle 66 of approximately 20 degrees bent in. Preferably bend 65C is spaced approximately 9 inches from bend 65B; bend 65C is bent at a bend angle 66 of approximately 10 degrees bent out and bend 65C is spaced about 7 inches from end 58B.

As best shown in FIGS. 4D, 4D' and 4D", yet another alternate aspect of the first embodiment of first portion 58 has five mixing portions 64, having bends 65A, 65B, 65C, 65D and 65E. The fifth bend is 65E. For the aforementioned vehicle 28, the first of the multiple bends 65A is disposed slightly ahead of end 42 of muffler 44, e.g., within approximately 4 inches to 6 inches of the muffler inlet tube 40 of vehicle 28 and from end 58A. The next bend 65B is preferably spaced approximately 6 inches from the first bend 65A. Bend 65C is spaced approximately 9 inches from bend 65B. Bend 65D is spaced preferably 6 inches from bend 65C and bend 65E is spaced approximately 10 inches from bend 65D and approximately 6 inches from end 58B. The bend angles 66 are preferably given as follows: at bend 65A, the bend angle 66 is 20 degrees bent out; at bend 65B, the bend angle 66 is 10 degrees bent in; at bend 65C, the bend angle 66 is approximately 15 degrees bent in; the bend angle 66 for bend 65D is approximately 35 degrees bent in; and the bend angle 66 for bend 65E is approximately 45 degrees bent out.

The second embodiment of first portion 58, best shown in FIGS. 2, 5A–5D, and 19B is configured with a plurality of internal mixing fins 67 disposed inside first portion 58 to mix the hot exhaust gases, but not to restrict the gas flow. The internal mixing fins 67 are the mixing portions 64 in the second embodiment. The internal mixing fins 67 are spaced and positioned within first portion 58 at locations on the pipe inside wall 58E such that the speed of the exhaust gases is altered, causing the exhaust gas to mix in a swirling fashion along the pipe body 58C, with the direction of the swirling being changed as the exhaust gases encounter each of the internal mixing fins. It is believed that the swirling or vortex of exhaust gases forces the cooler exhaust gases to the inside wall 58E of the first portion and the hotter exhaust gas to an inside of the pipe body 58C.

In the second embodiment, the first portion 58 is preferably made of a plurality of interconnectable segments 68, each segment having an internal mixing fin 67. Alternatively, the first portion is made of a single straight (nonbent) tubular member of uniform inner diameter, e.g., a pipe, having a plurality of internal mixing fins, as described throughout herein, disposed in the pipe, with the internal mixing fins in a spacing and an orientation with respect to each other as disclosed herein for the aspects of the present invention using interconnectable segments 68. The internal cooling fins are preferably separated at least approximately 6 inches apart, but not greater than 12 inches apart. Preferably 3 to 5 internal mixing fins are used in first portion 58.

As shown in FIGS. 5A and 5B, each segment 68 is tubular having a segment first end 70, a segment body portion 71, a segment receiving portion 73, and a segment second end 72. Extending through the segment body portion 71, segment first end 70 has a segment first end inner diameter 74, a segment first end outer diameter 76 and a segment first end inner wall 78. Segment second end 72 has a segment second end inner diameter 80 and a segment second end inside wall 82 extending through the segment receiving portion 73. The segment body portion 71 adjoins the segment receiving portion 73. The segment first end outer diameter 76 of a particular segment 68, e.g., a first segment, is suitably dimensioned to fit within the segment second end inner diameter 80 of the segment receiving portion 73 of another segment 68, e.g., a second segment, and to be limited in travel within segment receiving portion 73 of the second segment by the segment first end inner diameter 74 of the segment body portion 71 of the other (second) segment 68.

Preferably, one internal mixing fin 67 is disposed in each segment first end inner wall 78 and spaced from the segment first end 70. Each internal mixing fin 67 is planar having four sides 84A, 84B, 84C and 84D and a thickness 84E. Sides 84A and 84C are parallel to each other and perpendicular to side 84B. Side 84D is opposite side 84B and is suitably curved to fit within a portion of the segment first end inner wall 78. The curved side 84D is fastened to the segment first end inner wall 80 by welding with a weld 84F, soldering or using another suitable joining method, having curved side 84D oriented perpendicular to the segment first end inner wall 78 and angled with respect to the segment first end 70 at an angle 85A. The degree of angling of curved side 84D with respect to the segment first end is at an angle sufficient to cause a spinning or swirling of the exhaust gas as it passes around the fin 67. Preferably curved side 84D is angled at an orientation of either 45 degrees or 135 degrees from the segment first end 70, as shown in FIG. 5C. In addition, side 84A of internal mixing fin 67 is spaced from segment first end 70 forming a gap portion 86A. Side 84C is spaced from the segment first end inner wall 78 forming a gap portion 86B. The gap portions 86A, 86B are sufficiently dimensioned to allow the exhaust gases an unrestricted flow around the internal mixing fin 67, providing a mixing of the exhaust gases. The segments 68 are oriented having the internal mixing fins 67 alternate in position along pipe body 58C with adjacent pairs of internal mixing fins 67 having their respective sides 84B parallel to each other in opposite orientations, thereby providing a spinning or swirling of the exhaust gases in counter directions as the exhaust gases pass around each of the adjacent fins 67.

The segments 68 are interconnected by inserting a segment first end 70 of one segment into a segment receiving portion 73 of another segment 68, orienting the internal mixing fins as described above, until all desired segments are interconnected. The segments 68 of first portion 58 are welded to each other with a weld 85 or are fastened with clamps 59 to maintain a linear overall geometry. As best shown in FIGS. 5B and 5D, the resulting first portion 58 of the second embodiment is a "straight" pipe having a generally uniform inside diameter 58F generally equal to the segment first end inner diameter 74.

The second embodiment of first portion 58 is best illustrated in FIGS. 2, 5A–5D and 19B, where first portion 58 of exit pipe 56 is comprised of three segments 68A, 68B, 68C, providing a total assembled length of approximately 31.5 inches from end 58A to end 58B for a Mustang 1990 GT vehicle 28. Each segment 68A, 688, 68C is preferably 12 inches long from segment first end 70 to segment second end 72, with segment body portion 71 approximately 10 inches long and segment receiving portion 73 approximately 2 inches long. The segment first end inner diameter 74 is preferably approximately 2 and ⅜ inches. The segment first end outer diameter 76 is slightly less than approximately 2.5 inches. The segment second end inner diameter is approximately 2.5 inches to receive the segment first end 70. For this sized segment 68A, 68B, 68C an internal mixing fin 67 is suitably approximately 2 inches long by approximately 0.75 inches wide by approximately ⅛ inch thick. The segments 68A, 68B, 68C are made of metal, preferably steel piping and the internal mixing fins are made of metal, preferably steel plate. As shown in FIGS. 5B and 5D, two of the segments 68A, 68C are constructed identically with identical placement of the internal mixing fins, where the internal mixing fin 67 is positioned in each at approximately 135 degrees from the segment first end 70, having side 84A spaced from the end by approximately a ⅛ inch gap 86A, having side 84C spaced from segment first end inner wall 78 by approximately ⅛ inch gap 86B and having side 84D welded to segment first end inner wall 78 so that the fin 67 is perpendicular to the segment first end inner wall 78. As shown in FIGS. 5B and 5C, the third segment 68B is constructed identically to segments 68A, 68B and the same dimensioned internal mixing fin 67, but with the internal mixing fin 67 positioned at approximately 45 degrees from the segment first end 70, having side 84A spaced from the end 70 by approximately a ⅛ inch gap 86A, having side 84C spaced from segment first end inner wall 78 by approximately ⅛ inch gap 86B and having side 84D welded to segment first end inner wall 78 so that the fin 67 is perpendicular to the segment first end inner wall 78. As is appreciated by those in the art, the physical dimensions of the segments 68 and internal mixing fins 67 may be varied according to the specific model of vehicle 28.

In use, the segments 68A, 68B, 68C are oriented so that the internal cooling fins create a counter swirling or spinning of the exhaust gases at each internal mixing fin 67, advantageously causing the cooler exhaust gases to flow to the outside wall 58D of the pipe body 58C. As shown in FIG. 5D, the segments 68A, 68B, 68C are oriented so that the internal mixing fins 67 of segments 68A and 68B and the internal mixing fins of segments 68B and 68 have their respective sides 84B in parallel to each other in opposite orientations as viewed from end 58A of first portion 58. To do this, segment 68B is rotated 135 degrees counterclockwise to segment 68A. As shown in FIGS. 5B and 5D, the fins 67 in segments 68A and 68C are oriented parallel to each other. Thus the fin 67 in segment 68A is oriented with side 84D spaced from and opposite side 84D of the fin 67 in segment 68B causing the exhaust gases to swirl in a clockwise direction after fin 67 in segment 68A, then to swirl in a counter clockwise direction after passing around fin 67 in segment 68B. Since the fin 67 in segment 68C is oriented with side 84D spaced from and opposite side 84D of fin 67 in segment, as the exhaust gases pass around the fin 67 in the third segment 68C, the exhaust gases change direction again swirling in a clockwise direction, advantageously mixing and cooling the exhaust gases.

Other aspects of the second embodiment include the use of additional segments 68, for example, a fourth segment, or a fourth segment and a fifth segment may be added to a third segment 68C, wherein each additional segment 68 segment has a internal mixing fin 67 therein which is oriented as previously described herein to achieve the alternate swirling of the exhaust gases. The additional segments 68 and internal mixing fins 67 are constructed as previously described herein with the length of the segments adjusted appropriately to account for the total length from end 58A to end 58B of first portion 58 for the specific vehicle 28.

Either embodiment of first portion 58 may be modified in yet another way to accommodate a vehicle 28 where inlet tube 40 and outlet tube 46 are at opposite ends 42, 50 of muffler 44. In this additional aspect of the present invention, either embodiment of first portion 58 has at an additional "J"-shaped portion 87 disposed before the first mixing portion 64, e.g., first multiple bend 65A or first internal cooling fin 67 in a first segment 68A. The "J"-shaped portion 87 has an end 87A which is connected to the muffler outlet tube 46, a bend 87B and a forward directed portion 87C, extending between bend portion 87B and the first mixing portion 64. Portion 87C is "forward" directed to end 42 of muffler 44 and toward front end 33 of vehicle 28. Hot exhaust gases are transported through outlet tube 46 of muffler 44 into first portion 58 of exit pipe 56, e.g., moving through end 87A around bend 87B into forward directed portion 87C of pipe body 58C then traveling through mixing portions 64 where the exhaust gas is mixed and cooled as previously described. Additional cooling of exhaust gas is achieved in forward directed portion 87C. This aspect of the present invention is illustrated in FIG. 6, where "J"-shaped portion 87 is disposed before first mixing portion 64, first bend 65A. "J"-shaped portion 87 is constructed as unitary with the first mixing portion, e.g., unitary with first segment 68A, or unitary and disposed before the first bend 65A. The term "constructed as unitary" or "unitary" means that the respective portions are not separate from one another. Alternatively, the "J" shaped portion is constructed as a separate member and is joined to an end of the first portion near the first mixing portion of the exit pipe. The joining is done by clamping with a clamp 59, preferably an aforementioned flatback style clamp with a U-Bolt (which has a saddle, a U-bolt and fasteners) or by welding with a weld or by soldering with solder, or in other ways known in the art of fastening. This is best shown in FIG. 6, where the joining is done with a clamp 59.

In any of the aforemention embodiments and aspects of first portion 58 of exit pipe 56, as described herein throughout and also shown in FIGS. 1, 2, 6, 19B and 20, the second portion 60 of exit pipe 56 is generally "L" shaped having a base 90 and an arm 92 extending from base 90 at approximately 90 degrees to base 90. Preferably the 90 degree angulation is in a sweeping curvature to promote freer exhaust gas flow. Base 90 has base end 91. Arm 92 is dimensioned to extend laterally across an underbody 32 of vehicle 28 to near an interior 94 of a side 96 of the vehicle 28. Arm 92 has arm end 93. Base end 91 is preferably flared having an inner diameter which is suitably dimensioned for mating engagement with end 58B of first portion 58. Base end 91 of base 90 is fastened, e.g., joined, to end 58B of first portion 58 of exit pipe 56 with a fastener, such as by clamping with a clamp 59, preferably an aforementioned flatback style clamp with a U-Bolt (which has a saddle, a U-bolt and fasteners), or by welding with a weld, or by other ways known in the art of fastening.

Most preferably base end 91 of base 90 is welded to end 58B with a weld 98. At a point of fastening 100 (preferably either where clamp 59, weld 98, or the like, is located) of the first portion 58 to the second portion 60, a mounting strap 102 is used to fasten the assembled, e.g., fastened, first portion 58 and the second portion 60 to an H pipe 31 (or a Y pipe for a vehicle having only one muffler) of the vehicle 28.

Mounting strap 102, as best shown in FIGS. 4A and 5A, is a shallow "U" shaped metal member. Preferably mounting strap 102 is made of approximately 1.25 inch wide and 3/16 inch thick strap iron approximately 9.5 inches across and approximately 2.75 inches deep. Mounting strap 102 is welded to the H pipe 31 (or the Y pipe, for the vehicle having only one muffler) of vehicle 28 and to point of fastening 100.

The fastening of the exit pipe 56 to the H pipe 31 (or the Y pipe) of vehicle 28 with mounting strap 102 advantageously allows the exit pipe 56 to move with the vehicle's engine. This is especially advantageous because it provides for the exhaust system to float, e.g., suspend, as a single unit. If the mounting strap 102 is not fastened in the manner described, the vehicle's exhaust system experiences excessive vibration as the vehicle 28 is operated and the mounting strap 102 breaks off due to the mechanical stress caused by the vibrations.

The third portion 62 (hereinthroughout, also "side exhaust pipe 62") of exit pipe 56 has a backwards "S" shape with opposing curved ends 106, 108 and an elongate exhaust pipe middle part 110 (herein also elongate middle part 110) extending between curved ends 106, 108. Curved end 106 is preferably more elongate than curved end 108 having a lateral extension portion 112 with an approximately 90 degree bend between elongate middle part 110 and lateral extension portion 112. Curved end 106 has a distal portion 107 suitably dimensioned to engage in a mating fashion with arm end 93 of arm 92 of second portion 60. Arm end 93 of arm 92 of second portion 60 and distal portion 107 of third portion 62 are fastened with a fastener, preferably by a clamp 59, preferably an aforementioned flatback style clamp with a U-Bolt.

Curved end 108 is also bent approximately 90 degrees to elongate pipe middle part 110 in a direction opposite to curved end 106. Curved end 108 is preferably truncated and is dimensioned to be approximately flush with an exterior side 114 of vehicle 28. The cooled exhaust gas exits from vehicle 28 out of curved end 108.

Elongate middle part 110 of third portion 62 has a pipe outer circumference 116, a pipe outer radius of curvature 118, a pipe interior 120, a pipe inside diameter 122 and a pipe length 124. There is no internal muffler within third portion 62.

Side exhaust pipe 62 also has a shield 126 which is generally arc-shaped having an inner radius of curvature greater than pipe outer radius of curvature 118 and a shield length 128 suitably shorter than pipe length 124. Shield 126 has apertures 130 for accepting fasteners 132, suitably screws and bolts. The shield 126 of side exhaust pipe 62 may be perforated by a plurality of ventillation holes 134 as shown in FIGS. 1, 2, 4A, 4B, 5A, 6, 19B, 20 or may be without ventilation holes 134, e.g., imperforate of ventilation holes 134, as shown in FIG. 7. As shown in FIGS. 1, 2, 6, 8A, 8B, 8C, 19B, and 20, shield 126 is fastened to middle part 110 with a pair of clamps 136 and is spaced from the pipe outer circumference 116. Shield 126 extends partially around the pipe outer circumference 116. Shield 126 extends partially along the pipe length 124 of elongate middle part 110.

As best shown in FIGS. 4A, 5A, 8B, 8C and 8D, clamps 136 are preferably of a commercially available flatback style with a "U" bolt, also known as, a clamp having U-bolt and saddle construction, similar to clamp 59 but with the addition of "ears". Preferably, each clamp 136 has a U-bolt 136A, a saddle 136B for accepting the U-bolt 136A and fastening hardware 136C, e.g., bolts for fastening the U-bolt 136A to the saddle 1368. U-Bolt 136A is suitably dimensioned to extend around pipe circumference 116 and is engaged in locking fashion with saddle 136B, using the fastening hardware 136C. Each saddle 136B has a pair of ears 136D extending from the saddle 136B for accepting fasteners 132 of shield 126.

Clamps 136 are fastened to the vehicle 28 using rubber grommets 140, commercially available as ISOMOUNT™ grommets from P.A.P. Corp. of Livonia, Mich., U.S.A. A grommet accepting opening 141 is drilled into the exterior 114 of a side 96 of the vehicle 28, below a door 115. Opening 141 is drilled through the side 96 of the vehicle 28 for each grommet 140. The rubber grommets 140 are inserted into the grommet accepting openings 141, as shown in FIGS. 8B–8D. The U-Bolt threads through the rubber grommets 140 being fastened with fastening hardware 136C. The fastening of the clamps 136 to the vehicle 28 is best shown in FIG. 8B. The rubber grommets 140 isolate the vibrating metal parts of the saddle 136B and U-bolt 136A, holding the side exhaust pipe 62 from the side 96 of the vehicle 28.

Elongate middle part 110 of side exhaust pipe 62 extends, along the exterior side 114 of one side 96 of the vehicle 28, from the front end 33 to the rear end 54 of vehicle 28. As shown in FIG. 8A, the overall appearance of the elongate side exhaust pipe 62 is most preferably that of a straight pipe from just behind the front wheel 61 to a rear wheel well 142 of vehicle 28 below the door 115 of the vehicle 28.

The exit pipe 56 is made of metal piping. First portion 58 (including "J" shaped portion 87, if present) and second portion 60 are preferably steel. Third portion 62, including shield 126, are preferably chrome plated metal.

In yet another embodiment of the side exhaust pipe retrofit 22, the second and third portions 60, 62 are constructed as unitary for a particular model of vehicle. In yet another embodiment of the side exhaust pipe retrofit 22, the first and second portions 58, 60 are constructed as unitary for a particular model of vehicle. In still yet another embodiment of the side exhaust pipe retrofit 22, the first, second and third portions 58, 60, 62 are constructed as unitary for a particular model of vehicle. The term "constructed as unitary" means that the respective portions 60, 62 or 64 are not separate from one another but are continuous with each other.

Advantageously, the plurality of mixing portions 64, the laterally extended arm 90, the lateral extension portion 112 of curved end 106 and extended length of the elongate middle part 110 of side exhaust pipe 62 of exit pipe 56 allow the exhaust gases exiting from vehicle 28 to cool significantly compared to the prior art exhaust systems 30. This is best demonstrated in Example 8, which will be discussed later. As best shown in FIG. 8A, the positioning of the elongate middle part 112 of elongate side exhaust pipe 62 along exterior side 114 of vehicle 28 also puts the exhaust sound along the side 96 of the vehicle 28 where a driver of the vehicle 28 can best appreciate it, as well as giving the aesthetically beautiful appearance of a chrome coated side exhaust pipe mounted on the exterior side 114 of vehicle 28 just below the door 115 of the vehicle 28.

The exhaust gas cooling system 20 of the side exhaust pipe retrofit 22 is used in combination with a cooling fin system retrofit 24 used on an object 204 of the exhaust gas system to be cooled. The cooling fin system retrofit 24 may be used without using the side exhaust pipe retrofit 22. The side exhaust pipe retrofit 22 may be used without the cooling fin retrofit 24.

As best shown in FIGS. 1, 2, 6, 9–15C and 19A, the cooling fin system retrofit 24 of the present invention includes one or more adjustable clamps 200 and one or more cooling fin 202. One or more cooling fins 202 are mounted on one or more adjustable clamp(s) 200. Each adjustable clamp 200 has an object encompassing portion 203 and a locking portion 205. Object encompassing portion 203 is suitably dimensioned for fastening snugly around the object 204, e.g., muffler 44, H pipe 31 or Y pipe, inlet tube 40 and outlet tube 46 of the muffler 44, catalytic converter 36 or other engine part, of the exhaust gas system to be cooled. The number of adjustable clamps 200 used depends on a size of a perimeter 206 of the object 204 to which the cooling fin system retrofit 24 is to be attached and a size of the object encompassing portion 203 of adjustable clamp 200.

Adjustable clamp 200 is preferably a standard stainless steel heavy duty screw clamp 207, often called a hose clamp, which is commercially available at automotive supply stores. Each of the screw clamps 207 has an object encompassing portion 203, preferably a belt-like portion 208, hereinafter, "belt 208", and a locking portion 205. Belt 208 has a perforated track 212, a belt thickness 214, a belt length 215 and a belt width 216. Locking portion 205 of screw clamp 207 is preferably an adjustment screw 210 which moves along perforated track 212 in the belt 208. Adjustment screw 210 is easily moved using a screwdriver.

In FIGS. 9 and 12, an example cooling fin system retrofit 24, using only five cooling fins 202, is shown attached to muffler 44 using two adjustable screw clamps 207 joined to each other. The two screw clamps 207 are joined in the conventional manner by moving adjustment screw 210 on one adjustable screw clamp 207 along the perforated track 212 of the belt 208 of the other. By suitable adjustment of the adjustment screws 210, the belt lengths 215 are adjusted in size to fit around perimeter 206 of the object 204, in FIGS. 9 and 12, muffler 44.

Alternatively, a single adjustable screw clamp 207 having a belt length 215 sufficiently dimensioned to fasten snugly around perimeter 206 of the object 204 is used. Yet, alternatively, more than two screw clamps 207 may be joined each to each other to be fastened snugly around perimeter 206 of the object 204 to be cooled. Choice of the number and belt size of screw clamps 207 used are within the discretion of the user, since the choice may be determined by local availability of the screw clamp 207, the cost, and the convenience of not having to order special sized screw clamps 207.

As best shown in FIGS. 9–15C, each cooling fin 202 is preferably made of a metal, most preferably a 20 gauge galvanized sheet metal. Each cooling fin 202 has a base 202A with a pair of upright arms 202B, 202C extending from the base 202A. One of the arms 202B has a lip 202D depending from it. The arms 202B, 202C are suitably dimensioned so that a portion of arm 202C of one cooling fin 202 may be engaged with lip 202D of arm 202B of another cooling fin 202, thus joining one cooling fin 202 to another cooling fin 202. Each cooling fin 202 has a plurality of clamp receiving apertures 246 penetrating the base 202A and the upstanding arms 202B, 202C. Clamp receiving apertures 246 are dimensioned to accept the object encompassing portion 203 of adjustable clamp 200 and to have an air clearance portion 253 to permit air flow around the object 204 which is being cooled. Each cooling fin 202 has one or more sets 249 of spaced aligned pairs 247 of clamp receiving apertures 246. The number of sets 249 of aligned pairs 247 of clamp receiving apertures 246 on a cooling fin 202 depends on dimensions of the base 202A of the cooling fin 202, dimensions of the clamp receiving apertures 246 and a length dimension of the object 204 to be cooled.

The base 202A of cooling fin 202 may have any geometric shape, such as, but not limited to, a rectangular shape, a square shape, a triangular shape, a polygonal shape or a curved shape, provided that the base 202A of the cooling fin 202 that is attached is at least partially complimentary in shape so that portions of the two fin bases 202A will abut one another. Cooling fin 202 has a length extending from an end of the base 202A to an opposite end of the base 202A.

The upright arms 202B, 202C may have any geometric shape, such as, but not limited to, a rectangular shape, a square shape, a triangular shape, a polygonal shape or a curved shape, and portions of the upright arms may 202B, 202C be removed.

In a preferred embodiment, shown in FIGS. 9–14, cooling fin 202 is a "U" shaped channel 217 having a channel thickness 220 and base 202A. Preferably channel thickness 220 is the thickness of the sheet metal used, here most preferably 20 gauge. Base 202A is of a rectangular shape with a channel base length 218 and a channel base width 219. Extending from base 202A along the channel base length 218 is a pair of upright arms 202B, 202C. Base 202A has a pair of opposite ends 222 spaced by channel base length 218 and a pair of opposite sides 224 spaced by channel base width 219. Upright arms 202B, 202C are generally parallel to each other and are spaced from each other by channel base width 219. Upright arms 202B, and 202C extend from opposite sides 224 and are generally perpendicular to base 202A.

Each upright arm 202B, 202C is preferably a generally rectangular shape having an upper edge 226A, 226B, respectively, and an opposite generally parallel lower edge 228, an exterior surface 230 and an opposite interior surface 232. Lower edge 228 is preferably continuous with opposite side 224, and in the preferred embodiment is a fold line of the sheet metal forming a channel edge 233. Alternatively, lower edge 228 is joined by welding, soldering or other joining methods to opposite side 224 to form channel edge 233 of channel 217.

A portion 234 of upper edge 226A of upright arm 202B is folded against exterior surface 230 and forming lip 202D and a fold edge 240. Upright arm 202B has a channel arm height 242A from channel edge 233 to fold edge 240. Upright arm 202C has a channel arm height 242B from channel edge 233 to upper edge 226B. Preferably channel arm height 242A is higher than channel arm height 242B by channel thickness 220.

Each cooling fin 202 has a plurality of clamp receiving apertures 246 disposed in spaced aligned pairs 247 penetrating channel edges 233. Each cooling fin 202 has one or more sets 249 of spaced aligned pairs 247 of clamp receiving apertures 246. The number of sets 249 of aligned pairs 247 of clamp receiving apertures 246 on a cooling fin 202 depends on the channel base length 218 of the cooling fin 202, dimensions of the clamp receiving apertures 246 and the length dimension of the object 204 to be cooled. Preferably there is one set 249 of aligned pairs 247 per every 4 inches to 6 inches of channel base length 218 (or length of cooling fin). The cooling fin 202 preferably extends the length of the object 204 to be cooled.

Each clamp receiving aperture 246 has an arm aperture portion 248 adjoined to a base aperture portion 250. Arm aperture portion 248 penetrates upright arms 202B, 202C; base aperture portion 250 penetrates base 202A. Clamp receiving apertures 246 are preferably generally rectangular in shape or elliptical in shape and are dimensioned to accept object encompassing portion 203 of adjustable clamp 200, and most preferably dimensioned to accept belt thickness 214 and belt width 218 of belt 208 of screw clamp 207.

Between pairs of base aperture portions 250 of aligned pairs 247 of clamp receiving apertures 246 is a base portion 251. In use, object encompassing portion 203 of adjustable clamp 200 is threaded through arm aperture portion 248 of cooling fin 202 and object encompassing portion 203 of adjustable clamp 200 overlays base portion 251.

Arm aperture portion 248 of clamp receiving aperture 246 is suitably dimensioned to have an air clearance portion 253 which allows air flow through the arm aperture portions 248 and around the object 204 being cooled when the object encompassing portion 203 of adjustable clamp 200 is engaged in clamp receiving apertures 246 of cooling fin 202 and mounted around perimeter 206 of object 204 to be cooled.

As best shown in FIGS. 12 and 13, a plurality of cooling fins 202 are fastened one to another by sliding upper edge 226B of upright arm 202C under lip 202D of upright arm 202B of another cooling fin 202. When a plurality of cooling fins 202 are selected to be assembled into the cooling fin system retrofit 24 of the present invention, the cooling fins 202 are adjoined to allow one or more sets 249 of aligned pairs 247 of clamp receiving apertures 246 to form adjoining set of spaced aligned pairs 247 of clamp receiving apertures 246. This allows for arm aperture portions 248 to be aligned in adjoined cooling fins 202.

If only a single cooling fin 202 is used, or if a plurality of cooling fins 202 are used to assemble the cooling fin system retrofit 24, the object encompassing portion 203 of adjustable clamp 200 is suitably threaded through an adjoining set 249 of spaced aligned pairs 247 of clamp receiving apertures 246 of cooling fin(s) 202, as shown in FIGS. 1, 2, 6, 9, 12, and 19A.

In use, the user suitably selects the number of cooling fins 202 to be assembled together and placed on the adjustable clamp 200 to make the cooling fin system retrofit 24. Because different automotive objects 204 differ in physical dimension, e.g. length, height, depth, and perimeter 206, the spacing of individual cooling fins 202, the number of cooling fins 202 joined together, the channel base 202A (e.g., in the preferred embodiment, the channel base width 219 and the channel base length 218), the upright arms 202B, 202C (e.g., in the preferred embodiment, the channel arm heights 242A, 242B), the number of sets 249 of aligned pairs 247, and the spacing between sets 249 of aligned pairs 247 of clamp receiving apertures 246 are variable. Preferably the cooling fins 202 will extend around the entire perimeter of the object to be cooled as shown in FIGS. 1, 2, and 6.

Figure 15A:
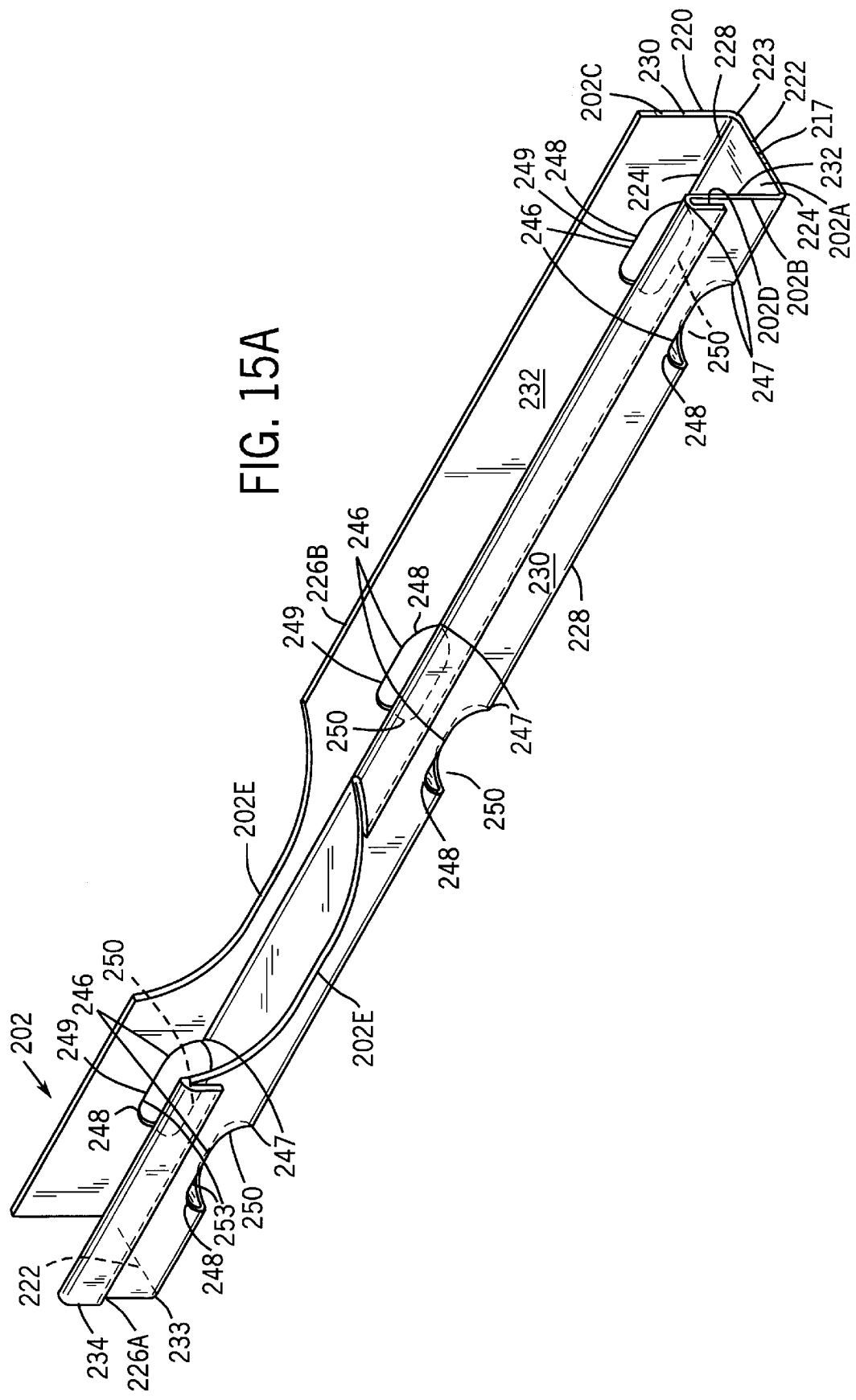
Figure 15B:
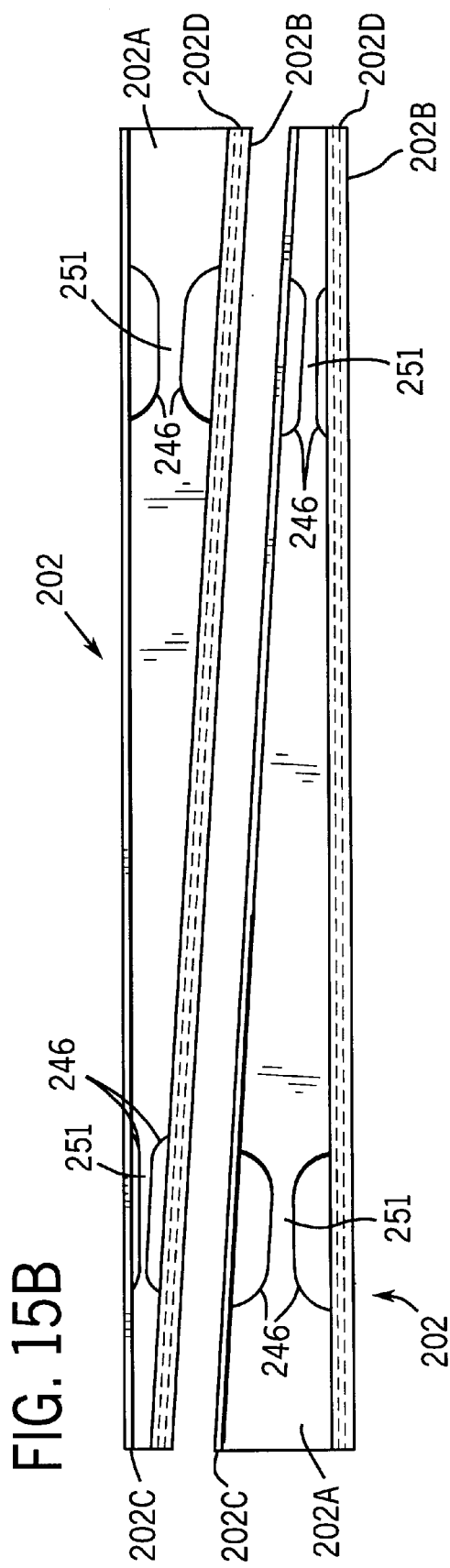
Figure 15C:
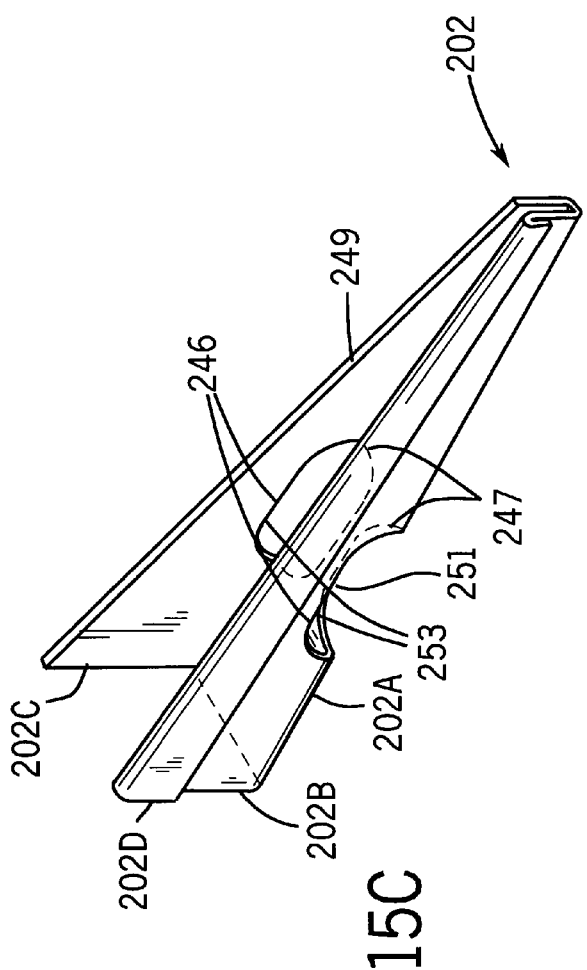

FIGS. 14 and 15A–15C show cooling fins 202 having different channel base length 218 (or length of cooling fin), different numbers of sets 249 of aligned pairs of clamp receiving apertures 246, different shape bases and different shape upright arms 202B, 202C. FIG. 14 shows two cooling fins 202 constructed like those in FIG. 10, having a rectangular shape base 202A and rectangular shape upright arms 202B, 202C, but with each cooling fin 202 having different channel base length 218 and differing numbers of sets 249 of aligned pairs 247. FIG. 15A shows a cooling fin 202 as in FIG. 10, but having portions of the upright arms 202B, 202C removed, thereby providing each upright arms 202B and 202C with a portion 202E having a partially curved shape. However the portion of the upright arm which is removed may be any shape as is understood by those skilled in the art. FIG. 15B shows a pair of cooling fins 202, each cooling fin having a base 202A which is a triangular shape and each having a pair of upright arms 202B, 202C, which are rectangular shape, constructed like the upright arms 202B, 202C of the cooling fin 202 shown in FIG. 10. The view in FIG. 15B is a top view of a pair of cooling fins 202, with the cooling fins 202 aligned, having apertures 246 aligned, prior to engaging upright arm 202C of one cooling fin 202 with lip 202D of the other cooling fin 202. FIG. 15C shows a cooling fin 202 where base 202A is triangular shape and where each of the upright arms 202B, 203C are triangular shape.

In any of the embodiments of the cooling fin 202 of the present invention, the number of pairs of clamp receiving apertures 246 per cooling fin 202 is variable depending upon the base 202A and dimension of the clamp receiving apertures 246. The dimensions of the clamp receiving apertures 246 are variable depending on the dimensions of the object encompassing portion 203 of the adjustable clamp 200 used, the air clearance portion 253 and the length of the cooling fin.

The user can advantageously customize the cooling fin system retrofit 24, to the object 204 of the vehicle 28 the user desires to cool, by estimating the removal of heat from the object 204 to be cooled with the cooling fins 202 of the present invention. Most advantageously, the user selects the number of cooling fins 202, and their location on the perimeter 206 of the object 204 to be cooled. The user simply calculates the estimated heat to be removed and thereby selects cooling fins 202 to make this match. The user can accordingly select the number of cooling fins 202 and size of the cooling fins 202 needed. An estimated removal of heat from a single cooling fin 202 is estimated at 0.25 degrees Fahrenheit per square inch of upright arm surface. A surface area (in square inches) of each upright arm is multiplied by 0.25 degrees Fahrenheit per square inch. Where two upright arms 202B, 202C are adjoined to each other, it is counted as one upright arm for the estimated removal of heat. An example of this calculation of estimated heat removal for the cooling fin system retrofit 24 as shown in FIG. 9 is provided in Example 2.

The cooling fins 202 can be made any size to cover the object 204, of the exhaust system of the vehicle 28 totally or partially. For example, the cooling fins 202 cover muffler 44 totally around the perimeter 206, as shown in FIGS. 1, 2, 6 and 19A, or partially on muffler top only, or on top, sides and bottom of muffler 44. As shown in FIG. 9, the cooling fins cover muffler 44 partially on the perimeter 206 of the muffler 44 and extend a length of the muffler 44.

The present invention includes a cooling fin kit 300 as best shown in FIG. 16, a side exhaust pipe retrofit kit 400 as best shown in FIGS. 17A–17D and an exhaust gas cooling system kit 500 as shown in FIGS. 18A–18D.

Cooling fin kit 300 includes a plurality of cooling fins 202, as previously disclosed and shown in FIGS. 9–15, and FIGS. 1, 2, 6, 19A, the disclosures of which are hereby incorporated by reference. Each of the cooling fins 202 may be identically dimensioned as shown in FIG. 9 or may be of differing dimensions, as shown in FIG. 14, or have portions 202E of the upright arms 202B, 202C removed, as shown in FIG. 15A, or may have different base shapes, as shown in FIGS. 15B and 15C, and/or different upright arm 202B, 202C shapes, to allow the user to customize the cooling of the object 204 of the exhaust system of the vehicle 28, the user desires to cool. Cooling fin 202, may have one set 249 of aligned pairs 247 of clamp receiving apertures 246 per cooling fin 202 or a plurality of sets 249 of aligned pairs 247 of clamp receiving apertures 246 per cooling fin 202. The cooling fin kit 300 also may include one or more adjustable clamps 200 for use with the cooling fins 202. The adjustable clamp 200 is as previously disclosed hereinthroughout, the disclosure of which is hereby incorporated by reference. Most preferably, adjustable clamp 200 is a screw clamp 207 having a belt 208 with a perforated track 212 and a locking portion 205 having an adjustment screw 210.

Figure 17B:
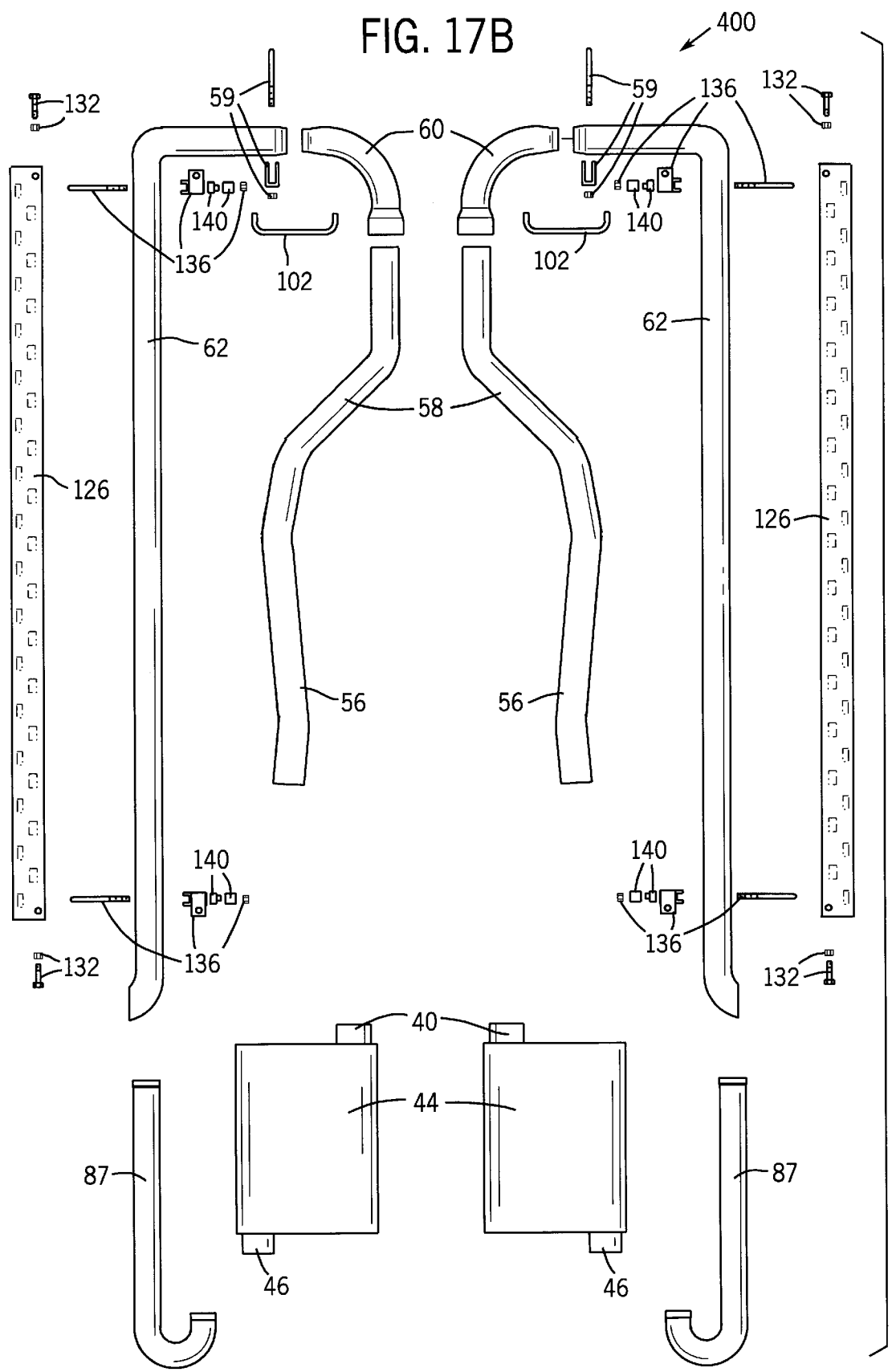
Figure 17C:
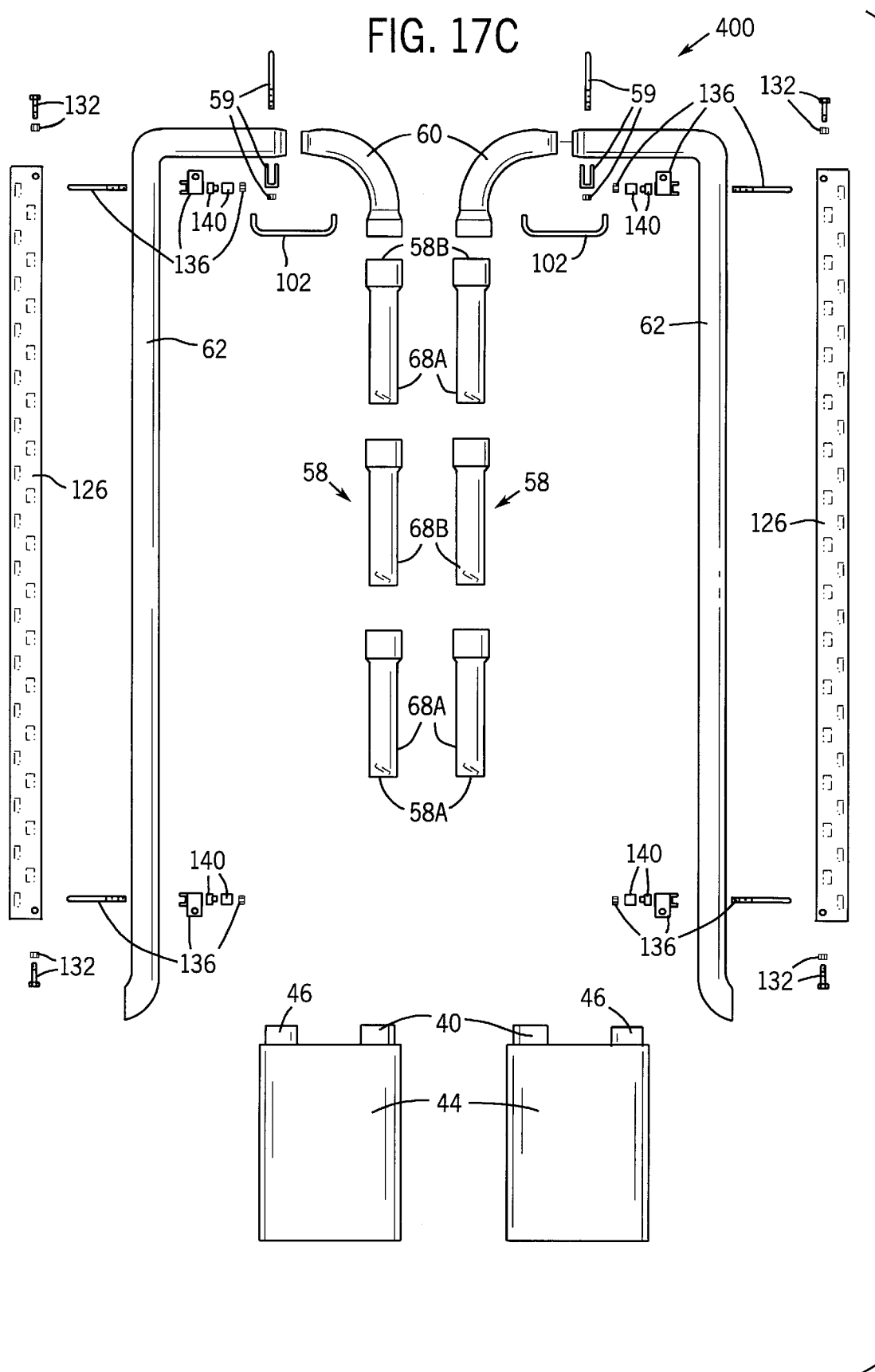
Figure 17D:
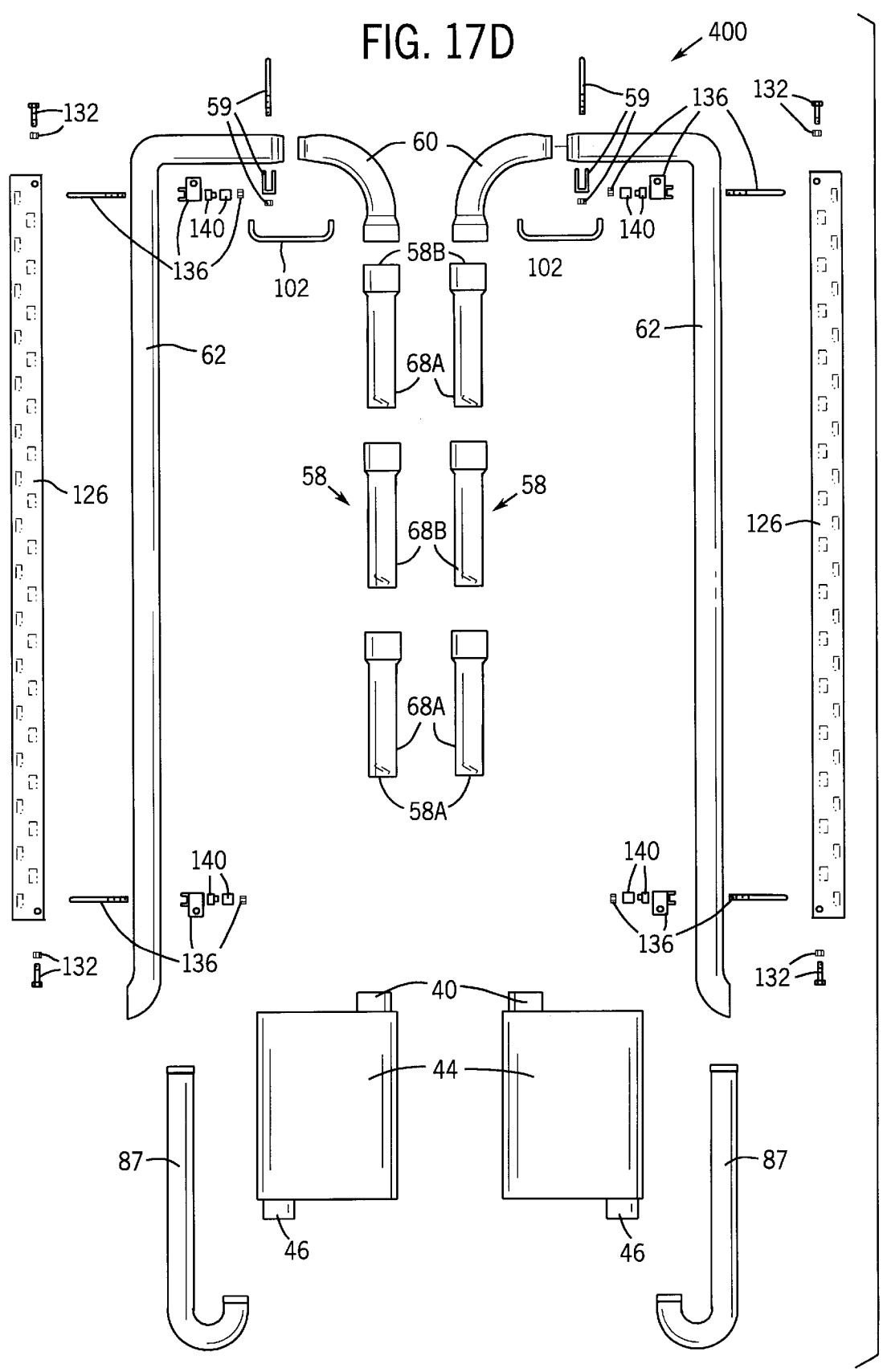

Side exhaust pipe retrofit kit 400 includes an exit pipe 56 having a first portion 58, a second portion 60 and a third portion 62 (including heat shield 126), as previously disclosed herein throughout out and shown in FIGS. 1, 2, 4A–4D", 5A–5D, 6–8, 19B and 20, the disclosures of which are hereby incorporated by reference. FIGS. 17A and 17B show the side exhaust pipe retrofit kit having the first embodiment of the first portion 58 of the exit pipe 56. FIGS. 17C and 17D show the side exhaust pipe retrofit kit having the second embodiment of the first portion 58 of the exit pipe 56. The side exhaust pipe retrofit kit 400 may also include clamps 59, mounting strap(s) 102, as well as, heat shield 126, rubber grommets 140, clamps 136, and fasteners 132 as previously disclosed herein throughout, the disclosures of which are hereby incorporated by reference. Heat shield 126 is perforated by ventilation holes 134 or may not be perforated by ventilation holes 134. Yet alternatively, the side exhaust pipe retrofit kit 400 may also include a muffler 44. The muffler 44 includes an inlet tube 40 and an outlet tube 46 disposed on a same end 42 of muffler 44 as shown in FIGS. 17A and 17C. Alternatively, the muffler 44 includes an inlet tube 40 and an outlet tube 46 disposed on opposite ends 42, 50 of muffler 44, as shown in FIGS. 17B, 17D. Either embodiment of muffler 44 is external to the exhaust gas exit pipe 56, e.g., the muffler 44 is not within the exit pipe 56, it is not an internal muffler. The kit may also include a "J" shaped portion 87 as shown in FIGS. 17B and 17D.

Figure 18A:
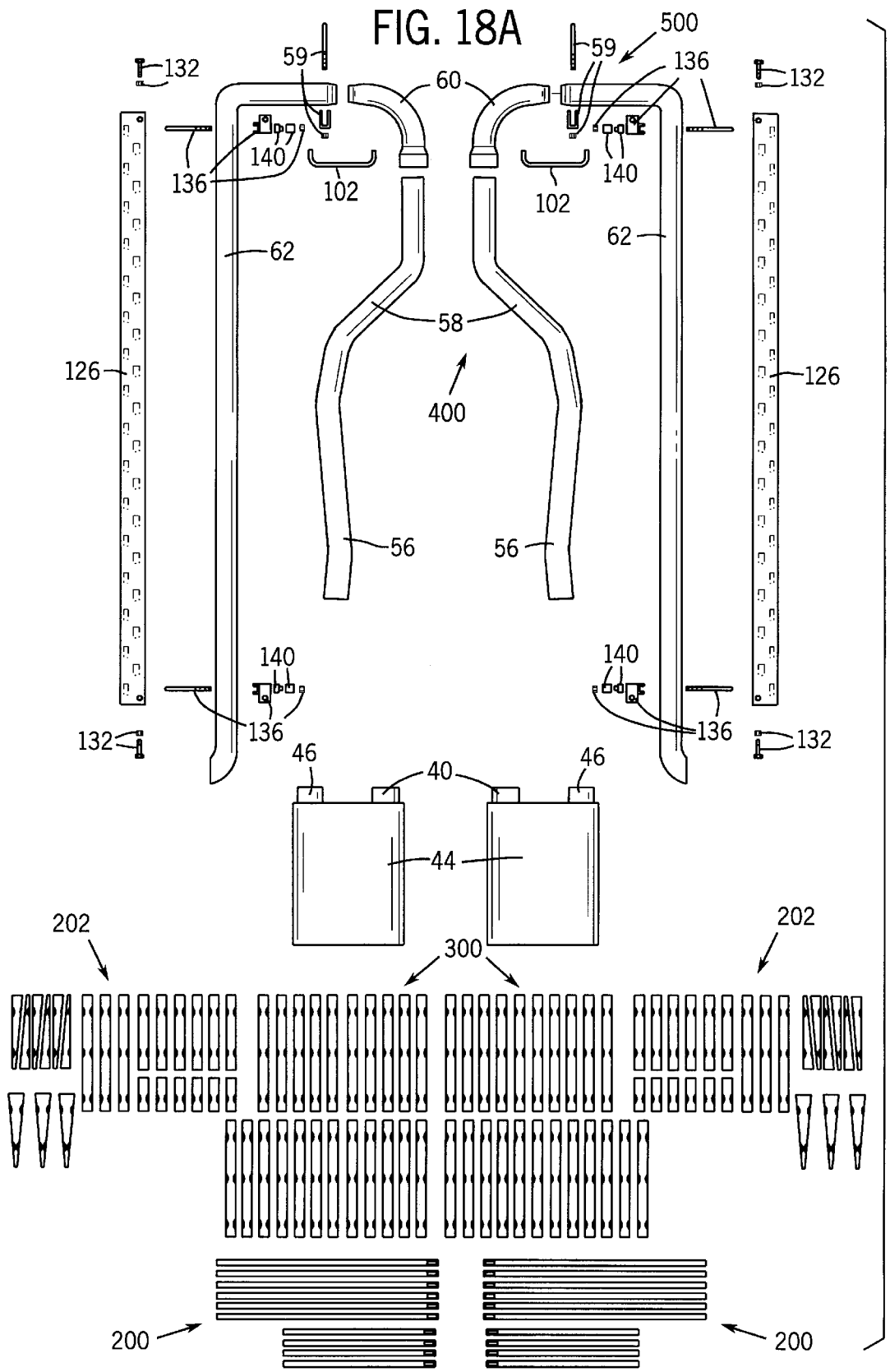
Figure 18B:
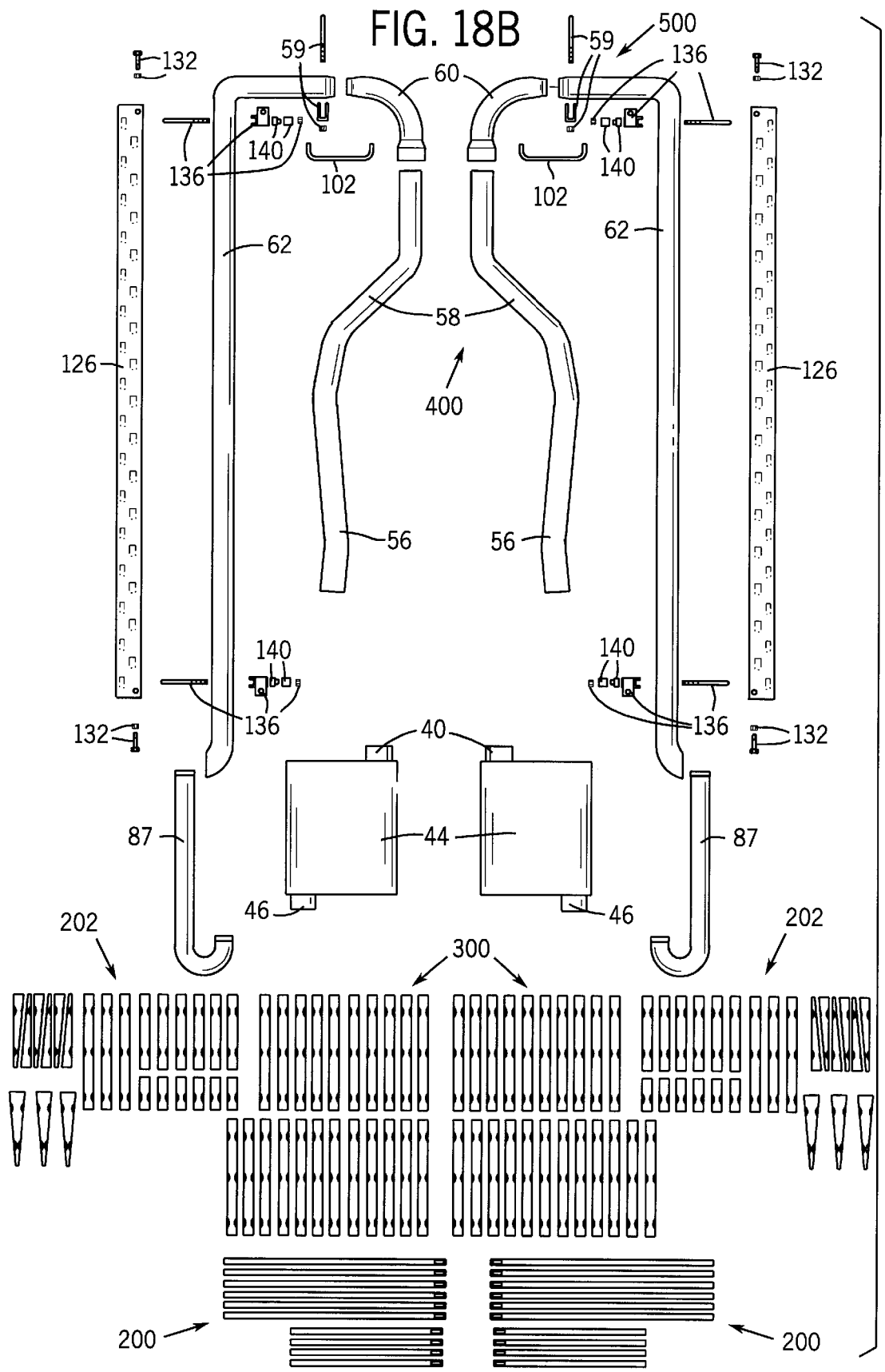
Figure 18D:
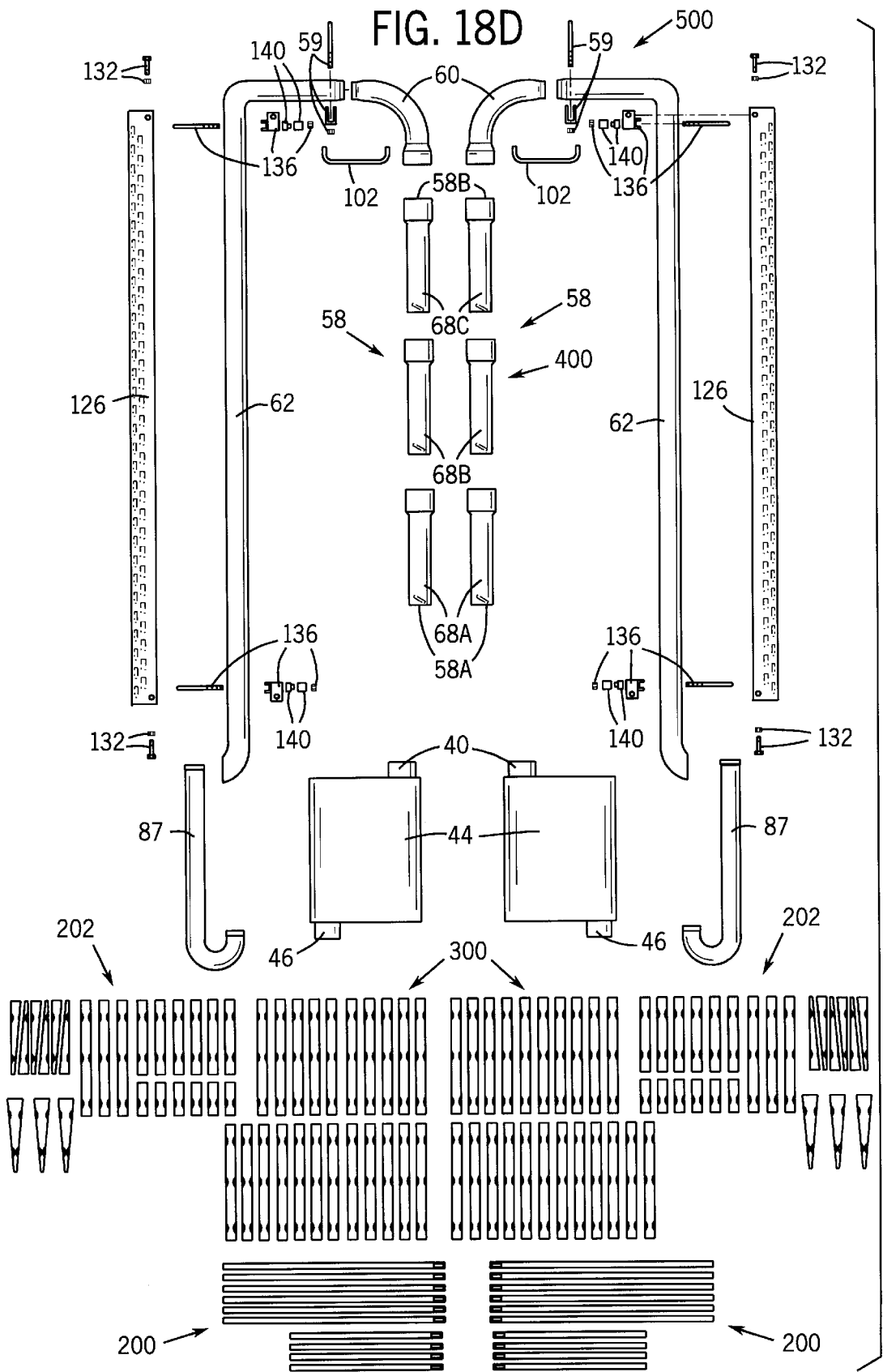

Exhaust system retrofit kit 500 includes the cooling fin kit 300 and the side exhaust pipe retrofit kit 400 which are previously disclosed herein, the disclosures of which are hereby incorporated by reference. FIGS. 18A and 18C show the exhaust system retrofit kit where the side exhaust pipe retrofit kit has the first embodiment of the first portion 58 of the exit pipe 56. FIGS. 18B and 18D show the exhaust system retrofit kit where the side exhaust pipe retrofit kit has the second embodiment of the first portion 58 of the exit pipe 56.

The cooling fin(s) 202 and adjustable clamp(s) 200 of cooling fin retrofit kit 300 are assembled according to the disclosure herein throughout for assembling the cooling fins and attaching the cooling fin(s) 202 to the object 204 to be cooled with the adjustable clamp(s) 200.

The exit pipe 56 of the side exhaust pipe retrofit kit 400 is assembled according to the disclosure herein throughout for assembling the exit pipe 56 and attaching it to the vehicle 28. Replacement of muffler 44 is known by those skilled in the art.

The exhaust system retrofit kit 500 is assembled according to the disclosure herein throughout for assembling the cooling fin retrofit kit 300 and for assembling the side exhaust pipe retrofit kit 400.

The present invention is further explained by the following examples which should not be construed by way of limiting the scope of the present invention.

EXAMPLE 1

Exhaust Exit Pipe and Side Exhaust Pipe Retrofit
(Multiple Bend First Portion)

A side exhaust pipe 56 and a side exhaust pipe retrofit 22 according to the present invention were made and installed according to the following methods for use with a vehicle 28, a 1990 Mustang GT automobile, without ground effects. This vehicle 28 had two mufflers 44, thus two exit pipes 56 were made.

The pair of existing mufflers 44 and the pair of tail pipes 52 were removed prior to installation of the side exhaust system retrofit 22 on the vehicle 28. A new pair of mufflers 44 having an inlet tube 40 and an outlet tube 46 on the same end 42 of the muffler 44 were installed on the vehicle 28 prior to the installation of the side exhaust pipe retrofit 22 on the vehicle 28.

A pair of exit pipes 56 were made as herein throughout described for the first embodiment of first portion 58. The first portion 58 of each exit pipe 56 was made of an approximately 2.5 inch inside diameter, approximately 12 inch length of steel pipe. This pipe is commercially sold under the trade name Marremont and is manufactured by Arvin Products of 100 Westwood Place, Brentwood, Tenn., 37027, U.S.A. The first portions 58 of each of the exit pipes 56 having multiple bends therein is a mirror image of the other. The first portions 56 were made identically as described below, then one of them was rotated 180 degrees to the mirror image orientation.

Each steel pipe was bent at a bend angle of approximately 10 degrees bent out approximately 6 inches from one end 58A, forming a first bend 65A, a first mixing portion. A second bend 65B was made at an approximately 15-degree bend angle and bent in. Second bend 65B was made approximately 15 inches from bend 65A. A third bend 65C was made at a bend angle of approximately 35 degrees and bent in. Third bend 65C was made approximately 6 inches from bend 65B. A fourth bend 65D was made at a bend angle of approximately 45 degrees and bent out. Bend 65D was made approximately 10 inches from bend 65C. The distance from end 56B to bend 65D was approximately 6 inches.

The second portion 60 of exit pipe 56 was made of a commercially available 2.5 inch inner diameter steel pipe sold under the trade name Marremont and manufactured by Arvin Products located at 100 Westwood Place, Brentwood, Tenn., 37027, U.S.A. (Other metal product tubing material equivalent to the Marremont steel pipe may be used.) A length of pipe approximately 16 inches long was bent at approximately 90 degrees creating an approximately 7-inch base 90 and an approximately 7-inch arm 92.

The third portion 62 of exit pipe 56 was purchased as a DYNOMAX™ performance exhaust system, model number 89300 from DYNOMAX Performance Exhaust Company, of Racine, Wis., U.S.A. This exhaust system is chrome coated, e.g., chrome finished/chrome plated. It includes a backwards "S"-shaped exhaust pipe having curved ends 106, 108, an elongate middle part 110 extending between curved ends, 106, 108, an internal muffler 44' inserted within elongate middle part 110, a shield 126, a pair of clamps 136 having a U-bolt 136A and saddle 136B design, including a pair of ears for mounting shield 98 to elongate middle part 110 of the DYNOMAX™ exhaust system, fasteners for fastening the U-bolt in the saddle 136B and sheet metal screws and bolts (fasteners 132) for fastening the shield to the pair of clamps 136.

The curved end 106 was approximately 10 inches long; curved end 108 was approximately 10 inches long. The elongate middle part 110 was approximately 36 inches long. The DYNOMAX™ exhaust system internal muffler 44' installed in the elongate middle part 110 was removed. The present invention does not use an internal muffler 44' in the exit pipe 56. The side exhaust pipe 62 was cleaned by honing out the interior with a common cylindrical hone. The ears of the clamps 136 of the DYNOMAX™ exhaust system were modified and an approximately 1.5 inch by approximately 1 inch rectangular piece of approximately 0.25 inch thick sheet metal plate was welded across the saddle 136B on each side to make a new pair of ears 136D.

Shield 126 was fastened to elongate middle part 110 of third portion 62 with pair of clamps 136. The U-bolt 136A of each clamp 106 was engaged around circumference of elongate middle part 110. Each U-bolt was then engaged in the saddle 136B of the clamp 136. Shield 126 was attached to ear 136D of each saddle 136B with one of the sheet metal screws.

The side exhaust pipe retrofit 22 was made by assembling each exit pipe 56 and fastening one assembled exit pipe 56 to one of the pair of mufflers 44 and to the undercarriage 32 of vehicle 28, then fastening the other assembled exit pipe 56 to the other of the pair of mufflers 44 and to the undercarriage 32 of vehicle 28.

Each of the exit pipes 56 was assembled as follows. The end 58B of first portion 58 adjacent bend 65D was joined, e.g., fastened, to base 90 of second portion 60 by welding, creating point of fastening 100 with a weld 98. Arm 92 of second portion 60 was clamped to curved end 106 of third portion 62 with clamp 59. Clamp 59 was an HEAVY DUTY EXHAUST CLAMP™ heavy duty flatback style clamp with U-Bolt, part number 08068, commercially available from P.A.P. Corp. Livonia, Mich., U.S.A. This completed the assembly of the exit pipe 56.

Each exit pipe 56 was then mounted onto the undercarriage 32 vehicle 28. One of each exit pipes 56 was mounted to one of the pair of mufflers 44 of vehicle 28. End 58A of first portion 58 (end 58A was adjacent the first mixing portion) was clamped to outlet tube 40 of muffler 44 with another aforementioned heavy duty flatback style clamp 59. Weld 98, e.g., the point of fastening 100 of the first portion 58 to the second portion 60, was fastened to the H pipe 31 of the vehicle 28 with mounting strap 102. Rubber grommets 140 commercially available as ISOMOUNT™ grommets from P.A.P. Corp. Livonia, Mich., U.S.A. were used to attach the third portion to the vehicle 28. Grommet accepting openings 141 were drilled into the exterior 114 of a side 96 of the vehicle 28, below door 115 for each rubber grommet 140. A rubber grommet 140 was inserted into each grommet accepting opening 141. The ends of the U-bolt 136 were threaded through the rubber grommets 140 (each of which has an opening therethrough). Fastening hardware 136C were then fastened to the U-bolt 136B. The rubber grommets 140 isolated the vibrating metal parts of the saddle 136B and U-bolt 136A holding the side exhaust pipe 62 from the side 96 of the vehicle 28. The elongate middle part 110 of third portion 62 of exit pipe 48 extended on the exterior side 114 of the side 96 of the vehicle 28 below the door 115 from just behind the front wheel 61 to the rear wheel well 142.

The vehicle 28 was driven over 10,000 miles after installation under highway driving conditions, e.g., speeds of 55 MPH and greater, without discoloration of the chrome plating in the third portion 62. Temperature measurement were taken under specific driving conditions at specific locations (shown in FIG. 20) on the vehicle using a pyrometer. The temperature measurements and driving conditions are discussed in Example 8.

EXAMPLE 2

Cooling Fin and Cooling Fin System Retrofit

A cooling fin 202 and a cooling fin system retrofit 24 according to the present invention were made and installed on a vehicle according to the following methods. A cooling fin 202 was made from a sheet of 20 gauge galvanized steel having approximate dimensions of 3 and ⅜ inches by 13 inches. This sheet was bent into a cooling fin 202 forming a "U" shaped channel having a rectangular shaped base 202A with channel edges 233. The cooling fin 202 was shaped to have rectangular shaped upright arms 202B, 202C. A lip 202D depended from upright arm 202B. The channel base 202A had a channel base length 218 of approximately 13 inches, a channel base width 219 of approximately 1 inches. Lip 202D was approximately ⅜ inches, and channel arm heights were approximately 1 inch each. Three sets 249 of aligned pairs 247 of clamp receiving apertures 246 were cut into the cooling fin 202 along channel edges 233. One set 249 of aligned pair 24 of clamp receiving apertures 246 centered on the channel base length 218. Each of the other two sets 249 of aligned pairs 247 of clamp receiving apertures 246 were spaced approximately a quarter of the channel base length 219 from each end 222 of base 202A. The clamp receiving apertures 246 were generally rectangular shaped with curved corners. Each clamp receiving aperture 246 was approximately 0.25 inches high by approximately 0.25 inches wide by approximately 1 inch long. Air clearance portion 253 was approximately 1 inch long by approximately 0.25 inches. Twenty-two identically dimensioned cooling fins 202 were constructed for use around a muffler 44. This permitted the cooling fins to cover the perimeter 206 of the muffler 44. The cooling fins 202 extended the length of the muffler 44.

The estimated removal of heat from a single cooling fin with the aforementioned dimensions was estimated at 6.5 degrees Fahrenheit. This estimate is based on the surface area (in square inches) of each upright arm multiplied by 0.25 degrees Fahrenheit per square inch. For a single cooling fin with two upright arms made according to the aforementioned dimensions, this is approximately 2×13 square inches×0.25 degrees Fahrenheit per square inch (the calculation is uncorrected for the air clearance portion in the upright arms 202B, 202C.

For the cooling fin system retrofit 24 illustrated in FIG. 9 where five cooling fins 202 (having the aforementioned dimensions) are adjoined, the estimated heat removal is approximately 19.5 degrees Fahrenheit (6 upright arms multiplied by approximately 13 square inch surface area per upright arm multiplied by 0.25 degrees per square inch of surface area—where two upright arms are adjoined to each other, it is counted as one upright arm for the estimated removal of heat).

Two standard commercially available stainless steel heavy duty adjustable screw clamps 207, model number 56 (54–100 mm) having the trade name IDEAL HOSE CLAMPS manufactured by Stant Corporation of St. Augustine, Fla., U.S.A. were used. Each screw clamp 207 had a belt 208 which measured approximately 13.25 inches in length with a perforated track 212 measuring approximately 6.75 inches in length. Belt 208 had a belt thickness 214 of approximately 0.5 mm and a belt width 116 of approximately 9/16 inches.

In use, the cooling fin system retrofit 24 for use on muffler 44 was assembled in the following manner. The user selected twenty-two identically dimensioned cooling fins 202 made as previously described herein this Example. This number of cooling fins was suitable to extend around the perimeter 206 of the muffler 44. The cooling fins 202 were adjoined one to another by sliding the edge 226B of arm 202C of one cooling fin 202 under the lip 202D of upright arm 202B of another cooling fin 202 until all the selected cooling fins 202 were adjoined. When all the selected cooling fins 202 were adjoined, the sets 249 of aligned pairs 247 of clamp receiving apertures 246 aligned forming adjoining sets 252 of spaced aligned pairs 247. Three adjustable clamps 200 were used in the cooling fin system retrofit 24, since there were three adjoining sets 252 of spaced aligned pairs 247 of clamp receiving apertures for the adjoined cooling fins 202. One adjustable clamp 200 was threaded through one adjoined set 249 of clamp receiving apertures 246 on the adjoined cooling fins 202.

Each of the three adjustable clamps 200 was made of two of the aforementioned screw clamps 207 fastened one to the other. The belt 208 of one of the two screw clamps was threaded through arm aperture portions 248 of an adjoined set 249 of clamp receiving apertures 246 of adjoined cooling fins 202.

The assembled cooling fin system retrofit 24 was fastened around a perimeter 206 of muffler 44 by adjusting the object encompassing portion 203, e.g., belts 208, of the adjustable clamp 200 and then locking the locking portion 205, e.g., adjustment screw 210, of the adjustable clamp 200. This suitably fastened the cooling fins 202 around the perimeter 206 of muffler 44.

EXAMPLE 3

Exhaust Gas Cooling System

An exhaust gas cooling system 20 of the present invention having a side exhaust pipe retrofit 22 and a cooling fin system retrofit 24 was made and installed according to the following methods for use with the vehicle of Example 1. The side exhaust pipe retrofit 22 was made and installed according to Example 1, the disclosure of which is hereby incorporated by reference. The cooling fin system retrofit 24 was made and installed according to Example 2, the disclosure of which is hereby incorporated by reference, on the mufflers 44 of the vehicle of Example 1.

Temperature measurement were taken under specific driving conditions at specific locations (shown in FIG. 20) on the vehicle using a pyrometer. The temperature measurements and driving conditions are discussed in Example 8.

EXAMPLE 4

Cooling Fin and Cooling Fin System Retrofit

A cooling fin 202 and a cooling fin system retrofit 24 was made and installed according to Example 2, the disclosure of which is hereby incorporated by reference, for use around an existing muffler 44 in a vehicle, a 1990 Mustang GT automobile with ground effects, as shown in FIG. 19A.

Temperature measurement were taken under specific driving conditions at specific locations (shown in FIG. 19A) on the vehicle using a pyrometer. The temperature measurements and driving conditions are discussed in Example 8.

EXAMPLE 5

Exhaust Exit Pipe and Side Exhaust Pipe Retrofit
(Internal Mixing Fins First Portion)

A side exhaust pipe 56 and a side exhaust pipe retrofit 22 according to the present invention were made and installed according to the following methods for use with the vehicle 28 of Example 4, a 1990 Mustang GT automobile, with ground effects. This vehicle 28 had two mufflers 44, thus two exit pipes 56 were made.

The pair of existing mufflers 44 and the pair of tail pipes 52 were removed prior to installation of the side exhaust system retrofit 22 on the vehicle 28. A new pair of mufflers 44 having an inlet tube 40 and an outlet tube 46 on the same end 42 of the muffler 44 were installed on the vehicle 28 prior to the installation of the side exhaust pipe retrofit 22 on the vehicle 28.

A pair of exit pipes 56 were made as herein throughout described for the second embodiment of first portion 58. The first portion 58 of exit pipe 56 was made of an approximately 36-inch length of steel pipe. This pipe is commercially sold under the trade name Marremont and is manufactured by Arvin Products of Brentwood, Tenn. U.S.A. The steel pipe was cut into three identical length segments, each an approximately 12 inch long segment, for making three identically dimensioned segments 68A, 68B, 68C. Thus each segment 68A, 68B, 68C was approximately 12 inches long from segment first end 70 to segment second end 72, with segment body portion 71 approximately 10 inches long and segment receiving portion 73 approximately 2 inches long. The segment first end inner diameter 74 was preferably approximately 2 and $\frac{3}{8}$ inches. The segment first end outer diameter 76 was slightly less than 2.5 inches. The segment second end forming the segment receiving portion 73 was enlarged in inner diameter to be approximately 2.5 inches and in outer diameter to be approximately 2 and $\frac{11}{16}$ inches. The enlarging was done by using a common pipe expander in the conventional manner.

Three internal mixing fins 67 were constructed of steel plate, each internal mixing fin was approximately 2 inches long by approximately 0.75 inches wide by approximately $\frac{1}{8}$ inch thick. Sides 84A and 84C were each approximately 0.75 inches. Sides 86B and 86D were approximately 2 inches each. Side 86D was curved and sides 84A, 84B and 84C were straight. Sides 84A and 84C were generally perpendicular to side 84B. The curved side 86D was shaped to abut perpendicularly against the segment first end inner wall 78 at a specified angulation to and spaced from the segment first end 70.

Two of the segments 68A, 68C were constructed with the internal mixing fin 67 identically positioned in each at approximately 135 degrees (specified angulation) from the segment first end 70, having side 84A spaced from the end by approximately a $\frac{1}{8}$ inch gap 86A, having side 84C spaced from segment first end inner wall 78 by approximately $\frac{1}{8}$ inch gap 86B and having side 84D welded with weld 84F to segment first end inner wall 78 so that the fin 67 was perpendicular to the segment first end inner wall 78.

The third segment 68B was constructed with the internal mixing fin 67 positioned at approximately 45 degrees (specified angulation) from the segment first end 70, having side 84A spaced from the end by approximately a $\frac{1}{8}$ inch gap 86A, having side 84C spaced from segment first end inner wall 78 by approximately $\frac{1}{8}$ inch gap 86B and having side 84D welded to segment first end inner wall 78 with weld 84F so that the fin 67 was perpendicular to the segment first end inner wall 78.

In use, the segments 68A, 68B, 68C were joined to each other so that segment second end inner diameter 80 received the segment first end 70. The segments 68A, 68B, 68C were oriented so that the internal mixing fins 67 of segments 68A and 68B and the internal mixing fins of segments 68B and 68 had their respective sides 84B in parallel to each other in opposite orientations as viewed from end 58A of first portion 58. The fins 67 in segments 68A and 68C were oriented parallel to each other. Thus the fin 67 in segment 68A was oriented with side 84D spaced from and opposite side 84D of the fin 67 in segment 68B causing the exhaust gases to swirl in a clockwise direction after fin 67 in segment 68A, then to swirl in a counter clockwise direction after passing around fin 67 in segment 68B. Since the fin 67 in segment 68C was oriented with side 84D spaced from and opposite side 84D of fin 67 in segment, after the exhaust gases passed around the fin 67 in the third segment 68C, the exhaust gases changed direction again swirling in a clockwise direction, advantageously mixing and cooling the exhaust gases. The fin 67 in segment 68A functioned as a first mixing portion 64.

The segments 68A, 688, and 68C, were assembled by welding segment 68A to segment 68B which was welded to segment 68C with welds 85. When the three segments 68A, 68B, 68C were assembled, the first portion 58 was approximately 31.5 inches long from end 58A to end 58B.

The second and third portions were made and assembled to the first portion and to the vehicle as described in Example 1, which disclosure is incorporated by reference.

Temperature measurement were taken under specific driving conditions at specific locations (shown in FIG. 19B) on the vehicle using a pyrometer. The temperature measurements and driving conditions are discussed in Example 8.

EXAMPLE 6

Cooling Fin and Cooling Fin System Retrofit

A cooling fin 202 and a cooling fin system retrofit 24 were made and installed according to Example 2, the disclosure of which is hereby incorporated by reference, on the new pair of mufflers 44 of the vehicle 28 of Example 5, as shown in FIG. 2.

EXAMPLE 7

Exhaust Gas Cooling System

An exhaust gas cooling system 20 having a side exhaust pipe retrofit 22 and a cooling fin system retrofit 24 was made and installed according to the following methods for use with the vehicle of Example 5. The side exhaust pipe retrofit 22 was made and installed according to Example 5, the disclosure of which is hereby incorporated by reference. The cooling fin system retrofit 24 was made and installed on the new pair of mufflers 44 according to Example 6, the disclosure of which is hereby incorporated by reference. The exhaust gas cooling system retrofit is best shown in FIG. 2.

Temperature measurement were taken under specific driving conditions at specific locations (shown in FIG. 19B) on the vehicle using a pyrometer. The temperature measurements and driving conditions are discussed in Example 8.

EXAMPLE 8

Results of the Temperature Measurements

Temperature measurements were made on the exhaust gas system of a 1990 Mustang GT automobile, with ground effects (Vehicle 1), and on a 1990 Mustang GT automobile, without ground effects (Vehicle 2) under varying test conditions using a ISSPRO™ pyrometer, model number R624, commercially available from ISSPRO, of Portland, Oreg. The pyrometer was installed according to an instruction sheet accompanying the device. The temperature was measured at locations on the vehicles as shown in FIGS. 19A, 19B, 20 and 21. The test was conducted under the following test conditions for same vehicle operating condition:

Test Condition 1, Vehicle 1, as shown in FIG. 3 without the exhaust gas cooling system of the present invention (no side exhaust pipe retrofit 22 and no cooling fin system retrofit 24);

Test Condition 2, Vehicle 1, as shown in FIG. 19A, with only the cooling fin system retrofit 24 installed around the muffler 44 only, as described in Example 4;

Test Condition 3, Vehicle 1, as shown in FIG. 19B, with only the side exhaust pipe retrofit 22 installed as described in Example 5;

Test Condition 4, Vehicle 1, as shown in FIG. 2, with the exhaust gas cooling system 20 as described in Example 7, e.g., both the cooling fin system retrofit 24 installed around the muffler 44, as in Example 6 and with the side exhaust pipe retrofit 22, installed as in Example 5;

Test Condition 5, Vehicle 2, with a DYNOMAX™ exhaust system installed on the side of the vehicle as shown in FIG. 21. The DYNOMAX™ exhaust system was not modified. The internal muffler 44' was kept inside the elongate middle part of the DYNOMAX™ exhaust system. The exhaust gases from the H pipe were directly diverted, using a flexible tubing (piping) 600, to the DYNOMAX™ exhaust system which was mounted on the side of the vehicle below the door 115. This is not recommended as the original vehicle mufflers are not used. This type of conversion is frequently done by hobbyists to provide the look of the side exhaust pipe and the pleasurable sound of the engine near the driver;

Test condition 6, Vehicle 2, as shown in FIG. 20, with only the side exhaust pipe retrofit 22 installed as described in Example 1;

Test Condition 7, Vehicle 2, as shown in FIG. 1, with the exhaust gas cooling system 20 as described in Example 3, e.g., both the cooling fin system retrofit 24 installed around the muffler 44, as in Example 2 and with the side exhaust pipe retrofit 22, installed as in Example 1.

The temperature was measured at the following locations on the vehicles:

Location 1 (L1) was the engine manifold 34.

Location 2 (L2) was between the catalytic converter 36 and the muffler 44.

Location 3 (L3) was behind the muffler outlet tube 46 and just before the axles in Vehicle 1, FIGS. 3 and 19A. Location 3 (L3) was on curved end 106 of third portion 62, on Vehicle 1, FIG. 19B and in Vehicle 2, FIGS. 1, 2, and 20, and on a similar location on the DYNOMAX™ exhaust system in FIG. 21.

Location 4 (L4) was at the end of the tail pipe 52 or at the end 108 of the side exhaust pipe 62, depending upon the Test Condition.

Location 5 (L5) was on the shield 126 of the side exhaust pipe 62.

The vehicles 1, 2 were operated under identical driving conditions, e.g., vehicle operating conditions. For each Test Condition 1–7, the respective vehicle was driven at highway speeds of 55 to 65 M.P.H. for 1 hour's time. The typical motor revolutions per minute (RPM) was maintained between 1750–2000 RPM. Temperature measurements were taken during daylight driving condition. The temperature measurements were recorded in degrees Fahrenheit and are within approximately plus or minus 20 degrees Fahrenheit. The temperature measurements are not corrected for outdoor ambient temperature. The outdoor ambient temperature ranged between 65 degrees to 80 degrees Fahrenheit.

The results of the temperature measurements at the pertinent locations 1–5 on vehicle 28 for Test Conditions 1–7 are summarized in Table 1

TABLE 1

Results of Temperature Measurements at Varying Locations on the Vehicle Under Seven Test Conditions

| TEST CONDITION | Temp. at L1 | Temp. at L2 | Temp. at L3 | Temp. at L4 | Temp. at L5 |
| --- | --- | --- | --- | --- | --- |
| 1. | 900° F. | 1100° F. | 700° F. | 400° F. | n.a. |
| 2. | 990° F. | 1100° F. | 250° F. | 150° F. | n.a. |
| 3. | 900° F. | 1100° F. | 400° F. | 200° F. | 90° F. |
| 4. | 900° F. | 1100° F. | 200° F. | 150° F. | 80° F. |
| 5. | 900° F. | 1100° F. | 1100° F. | 900° F. | 300° F.–500° F. |
| 6. | 900° F. | 1100° F. | 400° F. | 200° F. | 90° F. |
| 7. | 900° F. | 1100° F. | 200° F. | 150° F. | 80° F. |

(n.a.=not applicable)

The results of the pyrometer measurements clearly demonstrate the advantages of the present invention in removing excessive heat build up in the vehicle's exhaust gas system.

Comparing the temperature measurements at locations 3 and 4 (L3, L4) for Test Conditions 1 and 2 clearly demonstrates that merely using the cooling fin retrofit around the existing mufflers of a vehicle having ground effects significantly reduces the excessive heating to the location behind the muffler outlet tube 46 and at the end of the tail pipe 42. This significant reduction in heat build-up translates into lessened deterioration of the vehicle's exterior, lessened discoloring of the vehicle's paint, lessened wrinkling of the plastic parts, e.g., plastic bumpers and plastic ground effects. It also translates into better passenger comfort because there are cooler floor pan areas and passenger compartments. Furthermore, the ignition problem of combustible materials near the muffler and tail pipe is lessened.

Comparing the temperature measurements of Test Conditions 3 and 6 with Test Condition 5 at locations 4 and 5 (L4, L5) clearly shows the advantages of using each of the two embodiments of the side exhaust pipe retrofit of the present invention as compared to a convention method of using the unmodified DYNOMAX™ exhaust system as a side exhaust pipe. Test Conditions 3, 6 and 5 are important because in these test conditions the side exhaust pipe is located on the side of the vehicle just below the vehicle door. This location of the side pipe provides the pleasurable sound of the engine near the driver and also provides the beautiful appearance of the chrome coated side exhaust pipe, both very important features for the car or truck enthusiast. The temperature reductions at locations 4 and 5 using the present invention are a surprisingly large and unexpectedly advantageous cooling effect. While preserving the pleasurable engine sounds and the beautiful look sought by the enthusiast, the present invention is safer for persons and pets who contact the side exhaust pipe 62 or the shield 126 when entering and exiting from the vehicle 28 after the vehicle 28 has been operating. Advantageously, the chrome coating of the side exhaust pipe 62 is not subject to blues-out or browning-out in the side exhaust pipe retrofit of the present invention; the chrome coating remains unchanged as to its luster, shine shape and appearance. Furthermore, the decrease in heat build up provides lessened deterioration of the vehicle's exterior, lessened discoloring of the vehicle's paint, lessened wrinkling of the plastic parts, e.g., plastic bumpers and plastic ground effects. It also provides better passenger comfort because the floor pan areas and passenger compartments are cooler. Also, the ignition problem of combustible materials near the muffler and tail pipe is lessened.

Comparing the temperature measurements of Test Conditions 4 and 7 with Test Condition 5 at locations 4 and 5 (L4, L5) clearly shows the advantages of using each of the two embodiments of the exhaust gas cooling system 20 of the present invention as compared to a conventional method of using the unmodified DYNOMAX™ exhaust system as a side exhaust pipe. The advantages of this decrease in heat is similar to the advantages, the disclosure of which are hereby incorporated by reference, listed in the previous paragraph in the comparison of Test Conditions 3 and 6 to Test Condition 5 at locations 4 and 5 (L4, L5).

Comparing the temperature measurements of Test Conditions 4 and 7 (with the side exhaust pipe retrofit) with temperature measurements of Test Conditions 3 and 6 (with the side exhaust pipe retrofit and with the cooling fin system retrofit) also show a reduction in temperatures at locations 3, 4, and 5 (L3, L4, L5). This illustrates the advantage in using the exhaust gas cooling system over using just the side exhaust pipe retrofit. The exhaust gas cooling system retrofit, using both the side exhaust pipe retrofit and the cooling fin system retrofit of the present invention provides even greater cooling to the floor pan areas and the passenger compartment of the vehicle, preventing the heat stress of any plastic parts or ground effect or heat stress to the paint of the vehicle, while also increasing the cooling of the shield and the end of the side exhaust pipe and preserving the gorgeous chrome finish of the side exhaust pipe. This of course provides yet greater safety to pets or persons who may come into contact with these parts, as well as lessening the danger of ignition of combustible materials near these three locations (L3, L4, L5).

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

What is claimed is:

1. An exhaust gas exit pipe comprising:
    a first portion having a pair of first portion ends and a first portion pipe body extending between the pair of first portion ends, the pipe body having an outside wall, an inside diameter and a plurality of mixing portions, each mixing portion of the plurality of mixing portions configured to mix and cool exhaust gases from a muffler of a vehicle, but not to restrict the flow of the exhaust gases;
    a second portion having a base and an arm extending from the base, the base fastened to one end of the pair of first portion ends; and
    a third portion having a pair of opposing curved ends and an elongate exhaust pipe middle part extending between the pair of opposing curved ends, one of the pair of opposing curved ends fastened to the arm of the second portion.

2. The exhaust gas exit pipe of claim 1, where the plurality of mixing portions is a plurality of bends with each bend of the plurality of bends bent at a bend angle.

3. The exhaust gas exit pipe of claim 2, wherein each bend angle ranges between approximately 10 degrees to approximately 45 degrees.

4. The exhaust gas exit pipe of claim 2, wherein the plurality of bends is 3 bends to 5 bends.

5. The exhaust gas exit pipe of claim 2, wherein the plurality of bends is four bends.

6. The exhaust gas exit pipe of claim 5, wherein a first bend of the four bends has a bend angle of approximately 10 degrees, a second bend of the four bends has a bend angle of approximately 15 degrees, a third bend of the four bends has a bend angle of approximately 35 degrees and a fourth bend of the four bends has a bend angle of approximately 45 degrees, with the fourth bend disposed at the first portion end fastened to the base of the second portion.

7. The exhaust gas pipe of claim 1, wherein the plurality of mixing portions are a plurality of internal mixing fins disposed within the first portion.

8. The exhaust gas pipe of claim 7, wherein the plurality of internal mixing fins are oriented to create a counter swirling of the exhaust gases from one internal mixing fin to another internal mixing fin of the plurality of internal mixing fins.

9. The exhaust gas pipe of claim 1, wherein the pipe body comprises a plurality of connectable segments, search segment having one mixing portion of the plurality of mixing portions therein, each mixing portion of the plurality of mixing portions comprising an internal mixing fin.

10. The exhaust gas pipe of claim 9, wherein each segment has a segment first end and a segment second end, an first end inner wall, the internal mixing fin disposed within the segment and oriented spaced from the segment first end, perpendicular to the first end inner wall and angled with respect to the segment first end.

11. The exhaust gas pipe of claim 10, wherein the internal mixing fin is angled approximately 45 degrees or approximately 135 degrees to the segment first end.

12. The exhaust gas pipe of claim 9, wherein the internal mixing fin is disposed within a segment in an orientation to create a swirling of the exhaust gases.

13. The exhaust gas pipe of claim 9 wherein the plurality of connectable segments is 3 segments to 5 segments.

14. The exhaust gas pipe of claim 1, wherein the first portion is dimensioned to extend from the muffler of the vehicle forward to a position just behind a front wheel of the vehicle at a front end of the vehicle.

15. The exhaust gas pipe of claim 1, wherein the first portion further includes a "J" shaped portion disposed between one end of the pair of opposed ends and a first mixing portion of the plurality of mixing portions, the "J" shaped portion having a forward directed portion and a bend portion wherein the forward directed portion extends between bend portion and the first mixing portion.

16. The exhaust gas exit pipe of claim 1, the arm of the second portion when joined to one of the pair of opposing curved ends of the third portion is dimensioned to extend laterally across an underbody of the vehicle to an exterior side of the vehicle.

17. The exhaust gas pipe of claim 1, wherein the third portion includes a shield.

18. The exhaust gas pipe of claim 17, wherein the shield includes an arc-shaped portion.

19. The exhaust gas pipe of claim 18, wherein the arc-shaped portion of the shield has a plurality of ventilation holes therein.

20. The exhaust gas pipe of claim 1, wherein the elongate exhaust pipe middle part extends along an exterior side of the vehicle under a door of the vehicle.

21. A side exhaust pipe retrofit for a vehicle comprising:
   (a) an exhaust gas exit pipe;
   (b) a first clamp for fastening the exhaust gas exit pipe to a muffler of a vehicle;
   (c) a mounting strap for fastening the exhaust gas exit pipe to an H pipe or a Y pipe of the vehicle; and
   (d) a second clamp and a pair of rubber grommets for mounting the exhaust gas exit pipe to an exterior side of the vehicle below a door of the vehicle;
wherein the exhaust gas exit pipe comprises:
   a first portion having a pair of first portion ends and a first portion pipe body extending between the pair of first portion ends, the pipe body having an outside wall, an inside diameter, and a plurality of mixing portions, each mixing portion of the plurality of mixing portions configured to mix and cool exhaust gases from a muffler of a vehicle, but not to restrict the flow of the exhaust gases;
   a second portion having a base and an arm extending from the base, the base fastened to one end of the pair of first portion ends at a point of fastening; and
   a third portion having a pair of opposing curved ends and an elongate exhaust pipe middle part extending between the pair of opposing curved ends, one of the pair of opposing curved ends fastened to the arm of the second portion;
   wherein one end of the pair of opposed ends of the first portion of the exhaust gas exit pipe is fastened to the muffler of the vehicle with the first clamp;
   the mounting clamp is fastened to both the point of fastening of the first portion and the second portion of the exhaust gas exit pipe and to the H pipe or the Y pipe of the vehicle; and
   the pair of rubber grommets are mounted to the exterior side of the vehicle below the door of the vehicle and to the elongate middle portion of the third portion of the exhaust gas exit pipe with the second clamp.

22. The side exhaust pipe retrofit of claim 21, wherein the third portion of the exhaust gas exit pipe includes a shield.

23. A side exhaust pipe retrofit kit comprising:
   (a) an exhaust gas exit pipe;
   (b) a first clamp for fastening the exhaust gas exit pipe to a muffler of a vehicle;
   (c) a mounting strap for fastening the exhaust gas exit pipe to an H pipe or a Y pipe of the vehicle; and
   (d) a second clamp and a pair of rubber grommets for mounting the exhaust gas exit pipe to an exterior side of the vehicle below a door of the vehicle;
wherein the exhaust gas exit pipe comprises:
   a first portion having a pair of first portion ends and a first portion pipe body extending between the pair of first portion ends, the pipe body having a plurality of mixing portions, an outside wall and an inside diameter, each mixing portion of the plurality of the plurality of mixing portions configured to mix and cool exhaust gases from a muffler of a vehicle, but not to restrict the flow of the exhaust gases;
   a second portion having a base and an arm extending from the base, the base fastened to one end of the pair of first portion ends at a point of fastening; and
   a third portion having a pair of opposing curved ends and an elongate exhaust pipe middle part extending between the pair of opposing curved ends, one of the pair of opposing curved ends fastened to the arm of the second portion;

wherein one end of the pair of opposed ends of the first portion of the exhaust gas exit pipe is fastened to the muffler of the vehicle with the first clamp;

wherein the mounting clamp is fastened to both the point of fastening of the first portion and the second portion of the exhaust gas exit pipe and to the H pipe or the Y pipe of the vehicle; and wherein the pair or rubber grommets are mounted to the exterior side of the vehicle below the door of the vehicle and to the elongate middle portion of the third portion of the exhaust gas exit pipe with the second clamp.

24. The side exhaust pipe retrofit of claim 23, wherein the third portion of the exhaust gas exit pipe includes a shield.

25. The side exhaust pipe retrofit kit of claim 23, further comprising a muffler external to the exhaust gas exit pipe.

26. The side exhaust pipe retrofit kit of claim 23, wherein the first portion of the exhaust gas exit pipe includes a first mixing portion of the plurality of mixing portions and a "J" shaped portion, the "J" shaped portion disposed between the first portion end and the first mixing portion.

27. An exhaust gas cooling system kit comprising: a cooling fin kit and a side exhaust pipe retrofit kit;

wherein the cooling fin kit comprises one or more cooling fins, each cooling fin having a base with a pair of upright arms extending therefrom; one of the pair of upright arms having a lip, the base and pair of upright arm portions having clamp receiving apertures portions therein forming a pair of clamp receiving apertures; and wherein the side exhaust pipe retrofit kit comprises (a) an exhaust gas exit pipe;

(b) a first clamp for fastening the exhaust gas exit pipe to a muffler of a vehicle;

(c) a mounting strap for fastening the exhaust gas exit pipe to an H pipe or a Y pipe of the vehicle; and (d) a second clamp and a pair of rubber grommets for mounting the exhaust gas exit pipe to an exterior side of the vehicle below a door of the vehicle;

wherein the exhaust gas exit pipe comprises:

a first portion having a pair of first portion ends and a first portion pipe body extending between the pair of first portion ends, the pipe body having a plurality of mixing portions, an outside wall and an inside diameter, each mixing portion of the plurality of the plurality of mixing portions configured to mix and cool exhaust gases from a muffler of a vehicle, but not to restrict the flow of the exhaust gases;

a second portion having a base and an arm extending from the base, the base fastened to one end of the pair of first portion ends at a point of fastening; and a third portion having a pair of opposing curved ends and an elongate exhaust pipe middle part extending between the pair of opposing curved ends, one of the pair of opposing curved ends fastened to the arm of the second portion;

wherein one end of the pair of opposed ends of the first portion of the exhaust gas exit pipe is fastened to the muffler of the vehicle with the first clamp;

wherein the mounting clamp is fastened to both the point of fastening of the first portion and the second portion of the exhaust gas exit pipe and to the H pipe or the Y pipe of the vehicle; and wherein the pair or rubber grommets are mounted to the exterior side of the vehicle below the door of the vehicle and to the elongate middle portion of the third portion of the exhaust gas exit pipe with the second clamp.

28. The exhaust gas cooling system kit of claim 27, wherein the third portion of the exhaust gas exit pipe includes a shield.

29. The exhaust gas cooling system kit of claim 27, further comprising a muffler external to the exhaust gas exit pipe.

30. The exhaust gas cooling system kit of claim 27, wherein the first portion of the exhaust gas exit pipe includes a first mixing portion of the plurality of mixing portions and a "J" shaped portion, the "J" shaped portion disposed between the first portion end and the first mixing portion.

31. The exhaust gas cooling system kit of claim 27, wherein the cooling fin kit further comprises one or more adjustable clamps, each of the adjustable clamps dimensioned to engage within a pair of clamp receiving apertures of one or more of the cooling fins and each of the adjustable clamps either by itself or in combination with one or more adjustable clamps dimensioned to extend around an object to be cooled.

* * * * *